(12) United States Patent
Woytowitz et al.

(10) Patent No.: US 12,543,670 B2
(45) Date of Patent: Feb. 10, 2026

(54) AIMABLE SPRINKLER

(71) Applicant: Hunter Agriculture Incorporated, San Marcos, CA (US)

(72) Inventors: Peter John Woytowitz, San Diego, CA (US); Donald P. Simmons, Clermont, FL (US); Stephen D. Abernethy, Winter Park, FL (US); Gregory S. Burcham, Falkville, AL (US); Rolando A. Armas, Ocala, FL (US)

(73) Assignee: Hunter Agriculture Incorporated, San Marcos, CA (US)

( * ) Notice: Subject to any disclaimer, the term of this patent is extended or adjusted under 35 U.S.C. 154(b) by 528 days.

(21) Appl. No.: 18/061,940

(22) Filed: Dec. 5, 2022

(65) Prior Publication Data

US 2023/0180683 A1 Jun. 15, 2023

Related U.S. Application Data

(60) Provisional application No. 63/365,724, filed on Jun. 2, 2022, provisional application No. 63/288,136, filed on Dec. 10, 2021.

(51) Int. Cl.
*A01G 25/16* (2006.01)
*A01G 25/09* (2006.01)
*B05B 1/30* (2006.01)
*B05B 3/02* (2006.01)
*B05B 12/16* (2018.01)
*B05B 15/654* (2018.01)

(52) U.S. Cl.
CPC .............. *A01G 25/16* (2013.01); *A01G 25/09* (2013.01); *B05B 1/3026* (2013.01); *B05B 3/021* (2013.01); *B05B 12/16* (2018.02); *B05B 15/654* (2018.02)

(58) Field of Classification Search
CPC ........ A01G 25/16; A01G 25/09; B05B 12/16; B05B 15/654; B05B 1/3026; B05B 3/021; G01C 21/20
USPC ...................... 239/67–70, 247; 700/228–284
See application file for complete search history.

(56) References Cited

U.S. PATENT DOCUMENTS

| | | | | |
|---|---|---|---|---|
| 9,179,612 | B2 * | 11/2015 | Nelson | B05B 15/70 |
| 11,547,067 | B2 * | 1/2023 | Rempe | G01C 21/00 |
| 2004/0089735 | A1 * | 5/2004 | Drechsel | A01G 25/09 |
| | | | | 239/195 |

(Continued)

FOREIGN PATENT DOCUMENTS

WO WO 2014/110573 A1 7/2014

OTHER PUBLICATIONS

Automatic Lawn Treatment & Smart Sprinkler System | OtO Lawn—OtO Inc. (archive.org) saved on Dec. 5, 2022.

(Continued)

*Primary Examiner* — Steven M Cernoch
(74) *Attorney, Agent, or Firm* — Knobbe. Martens, Olson & Bear, LLP

(57) ABSTRACT

An aimable sprinkler is disclosed. The sprinkler can be mounting on an end of a traveling sprinkler system that moves in a linear direction or one that rotates about a center pivot tower. The sprinkler can include a base for connecting to the traveling sprinkler system and a turret coupled to the base so as to move in both yaw and pitch directions relative to the base. The sprinkler aims at discrete points within an irrigation area to achieve an even distribution of water.

20 Claims, 26 Drawing Sheets

(56) References Cited

U.S. PATENT DOCUMENTS

| | | |
|---|---|---|
| 2010/0147971 A1 | 6/2010 | Wiseman et al. |
| 2012/0123599 A1 | 5/2012 | Dreschsel |
| 2012/0169504 A1* | 7/2012 | Hillger ................ A01M 7/0089 340/603 |
| 2015/0306618 A1 | 10/2015 | Petter et al. |

OTHER PUBLICATIONS https://web.archive.org/web/20221206011353/https://www.youtube.com/watch?v=kb7RsHkyLAY saved on Dec. 5, 2022.
International Search Report dated Mar. 31, 2023 for International Application PCT/US2022/051869, 18 pages.

\* cited by examiner

AIMABLE SPRINKLER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present inventions relate to an apparatus for irrigating property (e.g., crops and farmland), and more particularly, to end-of-arm sprinklers used on traveling and pivot type irrigation apparatus having the capability to aim (e.g., rotate, elevate, lower) a nozzle for irrigating a specific portion of the property.

BACKGROUND

In many parts of the world, rainfall is insufficient and/or too irregular to keep farmland vegetation healthy and therefore irrigation systems are installed. Such systems typically include either a traveling sprinkler system or a pivot irrigation system each comprising a plurality of sprinklers connected to overhead pipes that are moved over the farmland by powered wheels. In many applications, long range sprinklers are installed at the end of the moving irrigation system. The long range sprinkler is typically installed at the end of a moving section to extend the reach of the moving sprinkler apparatus. One of the most popular types of long range sprinklers is an impact type sprinkler. In this type of sprinkler, a relatively large stream of water is ejected from a nozzle. A spoon intermittently interrupts the stream to break up the stream and supply water closer to the sprinkler while providing torque forces to rotationally change the direction water is being ejected by the sprinkler. A reversing mechanism is also normally mounted to the sprinkler with an arc adjustment mechanism.

SUMMARY

According to some embodiments, disclosed is an aimable sprinkler for irrigation. The sprinkler can be configured to aim at a pitch angle relative to a horizontal plane. The sprinkler includes a flow passage between an inlet and an outlet of the sprinkler, a valve disposed in the flow passage and having an orifice that is adjustable between at least a first cross-sectional flow area and a second cross-sectional flow area, the second cross-sectional flow area being different than the first cross-sectional flow area, and a horizontal aiming portion configured to pivot in a pitch direction so as to change both the pitch angle of the sprinkler and the first cross-sectional flow area to the second cross-sectional flow area.

A variation of the aspect above further comprises a radial aiming portion configured to rotate the horizontal aiming portion in a yaw direction.

A variation of the aspect above is, wherein the radial aiming portion comprises a yaw actuator operationally connected to a tubular structure, wherein the yaw actuator is configured to rotate the horizontal aiming portion in the yaw direction by rotating the tubular structure.

A variation of the aspect above is, wherein the tubular structure comprises a torque tube and an elbow, and wherein the elbow supports the horizontal aiming portion.

A variation of the aspect above is, wherein the yaw actuator comprises a plurality of chain sprockets and a drive chain configured to transfer torque between the plurality of chain sprockets.

A variation of the aspect above is, wherein the horizontal aiming portion comprises a pitch actuator connected to a nozzle assembly.

A variation of the aspect above is, wherein the pitch actuator comprises a motor and a push rod, and wherein extension or retraction of the push rod is configured to change the pitch angle.

According to some embodiments, disclosed is an aimable sprinkler for irrigation. The sprinkler can comprise a nozzle assembly comprising a ball joint, a tubular structure comprising a socket sized and shaped to receive a portion of the ball joint, a pitch actuator configured to articulate the nozzle assembly in a pitch direction, and a yaw actuator configured to move the nozzle assembly in a yaw direction.

A variation of the aspect above further comprises a valve having an orifice that is adjustable, wherein the pitch actuator is further configured to adjust the orifice when the pitch actuator articulates the nozzle assembly.

A variation of the aspect above is, wherein the ball joint comprises a stem and a cap, and wherein the portion of the ball joint received in the socket is the cap.

A variation of the aspect above further comprises a seal disposed between the cap and the socket, and wherein an outer surface of the cap abuts against an inner surface of the socket.

A variation of the aspect above further comprises a ball retaining plate secured to the tubular member and having an opening, wherein the opening is sized and shaped to receive the stem while preventing the cap from passing therethrough so as retain the cap in the socket.

A variation of the aspect above further comprises one or more fasteners and one or more springs for securing the ball retaining plate to the tubular member, the one or more springs being disposed relative to the one or more fasteners to maintain a predefined level of tension between bolt heads of the one or more fasteners and the tubular member.

A variation of the aspect above is, wherein the tubular structure comprises a torque tube and an elbow, and wherein the socket is disposed in the elbow.

A variation of the aspect above further comprises a stock, and wherein the pitch actuator comprises a tang configured to rotatably connect to the stock.

According to some embodiments, disclosed is an aimable sprinkler for mounting on an end of a traveling sprinkler system that rotates about a center pivot tower. The sprinkler includes a base configured to connect to the end of the traveling sprinkler system and a turret coupled to the base so as to move in both yaw and pitch directions relative to the base.

A variation of the aspect above further comprises a valve having an orifice that is adjustable, wherein movement of the turret in the pitch direction adjusts the orifice.

A variation of the aspect above further comprises a ball and socket joint, wherein movement of the turret in the pitch direction articulates the ball and socket joint.

A variation of the aspect above further comprises a tubular structure coupled to the base, wherein movement of the turret in the yaw direction rotates the tubular structure relative to the base.

A variation of the aspect above further comprises a pitch actuator configured to drive the turret in the pitch direction relative to the base, a yaw actuator configured to drive the turret in the yaw direction relative to the base, and a controller configured to control the pitch actuator and the yaw actuator.

According to some embodiments, an aimable sprinkler for mounting on an end of a traveling sprinkler system that rotates about a center pivot tower is disclosed. The sprinkler comprises a nozzle assembly comprising a ball joint; a pitch actuator configured to articulate the nozzle assembly in a pitch direction; a yaw actuator configured to move the nozzle assembly in a yaw direction; and a controller comprising a processor and memory storing instructions, that when executed by the processor, cause the sprinkler to receive GPS coordinates; determine, based at least in part on the GPS coordinates, a border of an irrigation area; determine, based at least in part on flow characteristics of the nozzle assembly, an intersection of an end of throw of water from the nozzle assembly to the determined border; determine, based at least in part on the GPS coordinates, a relative angle of the traveling sprinkler system relative to a first corner position of the irrigation area; determine, based at least in part on the relative angle and the intersection of the end of the throw of water to a point on the determined border, a desired angle; and control the yaw actuator and the pitch actuator to adjust the pitch direction and the yaw direction of the nozzle assemble to emit water at the desired angle.

In an aspect, the aimable sprinkler further comprises a valve having an orifice that is adjustable, wherein the pitch actuator is further configured to adjust the orifice when the pitch actuator articulates the nozzle assembly. In an aspect, the processor executing the instructions stored in the memory further causes the desired angle of the aimable sprinkler relative to the traveling sprinkler system to be constantly determined, as the traveling sprinkler system rotates around a center point to keep the aimable sprinkler pointed towards the first corner position. In an aspect, the processor executing the instructions stored in the memory further causes the desired angle of the aimable sprinkler relative to the traveling sprinkler system to be periodically determined, as the traveling sprinkler system rotates around a center point to keep the aimable sprinkler pointed towards the first corner position.

In an aspect, the aimable sprinkler further comprises communication circuitry configured to transmit and receive messages via the Internet. In an aspect, the controller further receives user-generated control information via the Internet. In an aspect, the user-generated control information comprises commands to control one or more of timing, positioning, throw distance, ON/OFF, and water trajectory.

According to some embodiments, a method of aiming an aimable sprinkler that comprises a controller, a base configured to mount to an end of a traveling sprinkler system, and a turret configured to move in a pitch direction and a yaw direction relative to the base is disclosed. The method comprises receiving GPS coordinates; determining, based at least in part on the GPS coordinates, a border of an irrigation area; determining, based at least in part on flow characteristics of the aimable sprinkler, an intersection of an end of throw of water from the turret to the determined border; determining, based at least in part on the GPS coordinates, a relative angle of the traveling sprinkler system relative to a first corner position of the irrigation area; determining, based at least in part on the relative angle and the intersection of the end of the throw of water to a point on the determined border, a desired angle; and controlling pitch and yaw of the turret to emit water at the desired angle.

In an aspect, the GPS coordinates identify corners of the irrigation area. In an aspect, the method further comprises receiving user-generated control information. In an aspect the user-generated control information includes commands to control one or more of timing, positioning, throw distance, ON/OFF, and water trajectory. In an aspect, the method further receiving, via the Internet, control information from a mobile device. In an aspect, the method further comprises transmitting, via the Internet, diagnostic information.

In an aspect, the method further comprises determining that the traveling sprinkler system has rotated the aimable sprinkler past a quadrant of the irrigation area associated with the first corner position. In an aspect, the method further comprises determining, based at least in part on the GPS coordinates, the relative angle of the traveling sprinkler system relative to a second corner position of the irrigation area when the traveling sprinkler system has rotated the aimable sprinkler past a quadrant of the irrigation area associated with the first corner position.

According to some embodiments, an aimable sprinkler for mounting on an end of a traveling sprinkler system that rotates about a center pivot tower is disclosed. The sprinkler comprises a base configured to connect to the end of the traveling sprinkler system; a turret coupled to the base so as to move in both yaw and pitch directions relative to the base; a pitch actuator configured to drive the turret in the pitch direction relative to the base; a yaw actuator configured to drive the turret in the yaw direction relative to the base; and a controller configured to control the pitch actuator and the yaw actuator by receiving location information; determining, based at least in part on the location information, an angle of the traveling sprinkler system relative to a corner on a border of the irrigation area; determining, based at least in part on flow characteristics, an intersection of an end of throw of water from the turret to the border of the irrigation area; determining, based at least in part on the relative angle and the intersection of the end of the throw of water to a point on the border, a desired angle; and adjusting the pitch direction of the pitch actuator and the yaw direction of the yaw actuator to emit water from the turret at the desired angle.

In an aspect, the location information includes GPS coordinates associated with the irrigation area. In an aspect, the location information includes data from a transponder located within the irrigation area. In an aspect, the aimable sprinkler further comprises an RFID reader that is configured to receive the location information from an RFID tag located within the irrigation area. In an aspect, the controller is further configured to receive user-generated control information via the Internet.

DETAILED DESCRIPTION

Powered moving irrigation systems can be used to distribute water to grasses, grains, vegetables, or other crops on a farm. A moving irrigation system can include overhead pipes with multiple sprinklers attached to them. Types of irrigations sprinklers attached along the length of the moving pipes include rotary, nutating, fixed sprays, and/or rotary stream types of sprinklers. In some applications, end of arm irrigation sprinklers can also be installed. End of arm irrigation sprinklers are typically used to extend the reach of the moving irrigation system. Types of end of arm irrigation sprinklers include rotary-stream and impact type sprinklers. In some applications, multiple irrigation sprinklers can be used to water a targeted area. One or more controllers (e.g., wireless and/or wired controllers) can be used to control the operation of one or more irrigation sprinklers. For example, one or more controllers can control when at least one of the sprinklers of the irrigation system transitions between an irrigating (e.g., ON) configuration and a non-irrigating (e.g., OFF) configuration. In some embodiments, the one or more controllers control the amount of time the sprinklers operate. In some instances, the controller can control the radial orientation of the sprinkler. In some configurations, the controller can control the pitch angle of the sprinkler relative to a horizontal plane.

Figure 1:
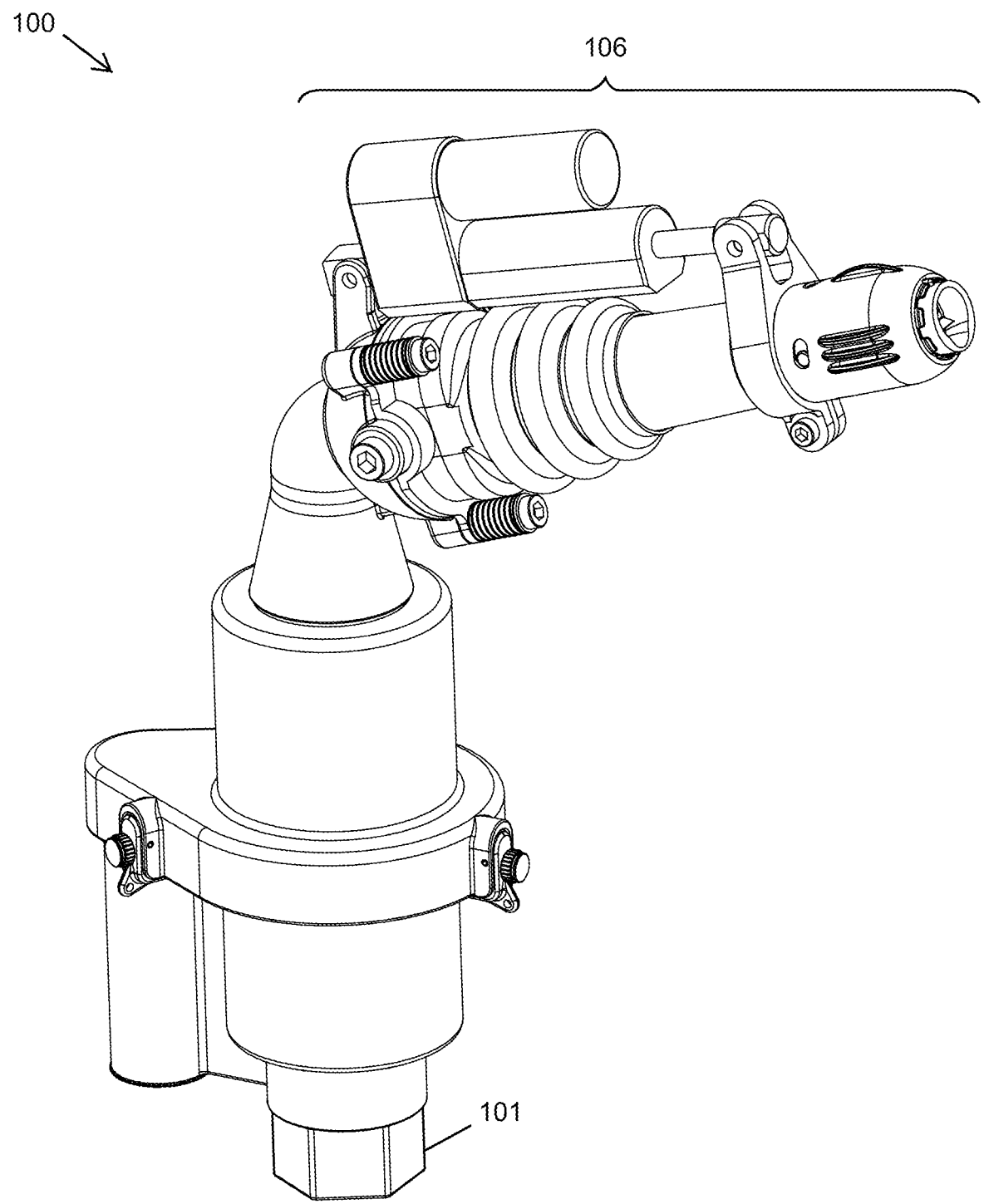
FIG. 1 is an isometric view of a sprinkler that is aimable according to a preferred embodiment of the present invention.
Figure 2:
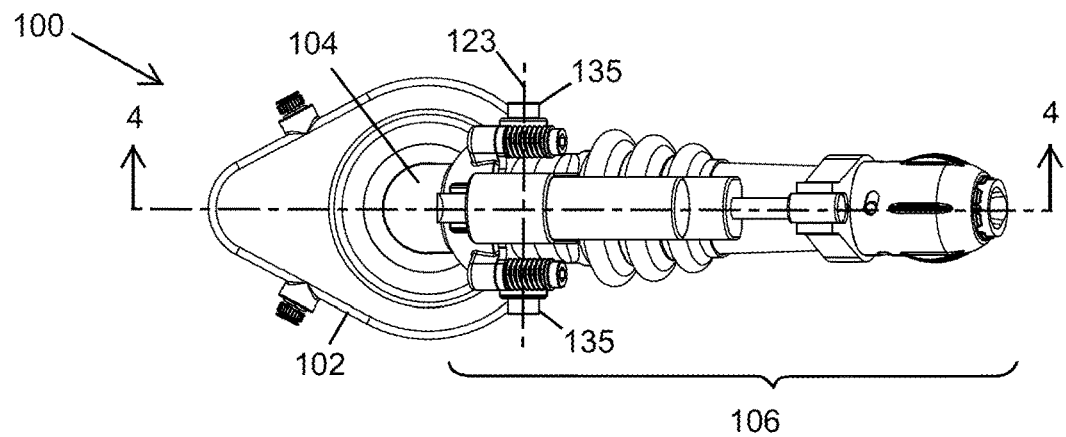
FIG. 2 is a top view of the sprinkler of FIG. 1 showing a turret of the sprinkler configured to move in both pitch and yaw directions relative to a base.

FIG. 1 is an isometric view of a sprinkler 100 that is aimable according to a preferred embodiment of the present invention. According to the present disclosure, as illustrated and described below, a portion (e.g., turret 106) of the sprinkler 100 can be moved in both yaw 116 and pitch 118 directions relative to a base 101 so as to aim water exiting the sprinkler 100 as shown in FIG. 2. In certain embodiments, the base 101 is a structure of the sprinkler 100 that couples the sprinkler 100 to an irrigation system. For example, in certain embodiments, the base 101 can be a connector pipe sized and shaped to connect to a complementary pipe of the irrigation system. In such an embodiment, a position of the base 101 portion of the sprinkler 100 can be fixed relative to the ground (e.g., the irrigation system) while at least a portion of the sprinkler 100 can be moved in both yaw and pitch directions relative to the base 101 to aim the water exiting the sprinkler 100.

In certain embodiments, the irrigation system itself is configured to move or roll across land so as to irrigate, for example, crops on a farm. In such an embodiment, the sprinkler 100 is still aimable in the yaw 116 and pitch 118 directions relative to the base 101. However, the base 101 (and the sprinkler 100) will also move with the moving irrigation system. In such embodiments, movements of the sprinkler 100 take into account the movement of the irrigation system relative to the ground, or lack thereof, and adjust the aim of the sprinkler 100 to achieve the desired watering pattern. In this way, a controller (not shown) can adjust the watering pattern based on characteristics of the irrigation system (movement speed, water flow rates, nozzle count and/or locations, etc.) and/or environment (land geometry, terrain, wind speed, wind direction, type of crop, weather and/or land sensor data, etc.) to optimize water coverage.

Figure 8:
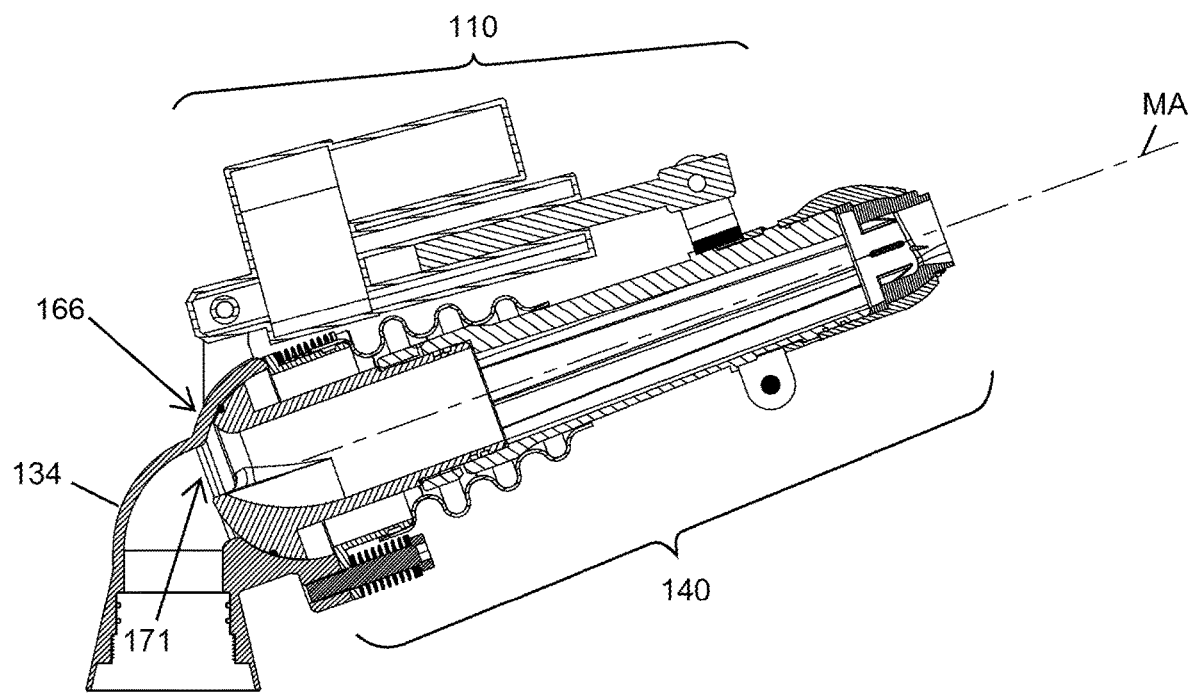
FIG. 8 is a section view through the elbow and the turret from the sprinkler of FIG. 4 showing the nozzle assembly positioned by the pitch actuator to be aligned with the MA.
Figure 9:
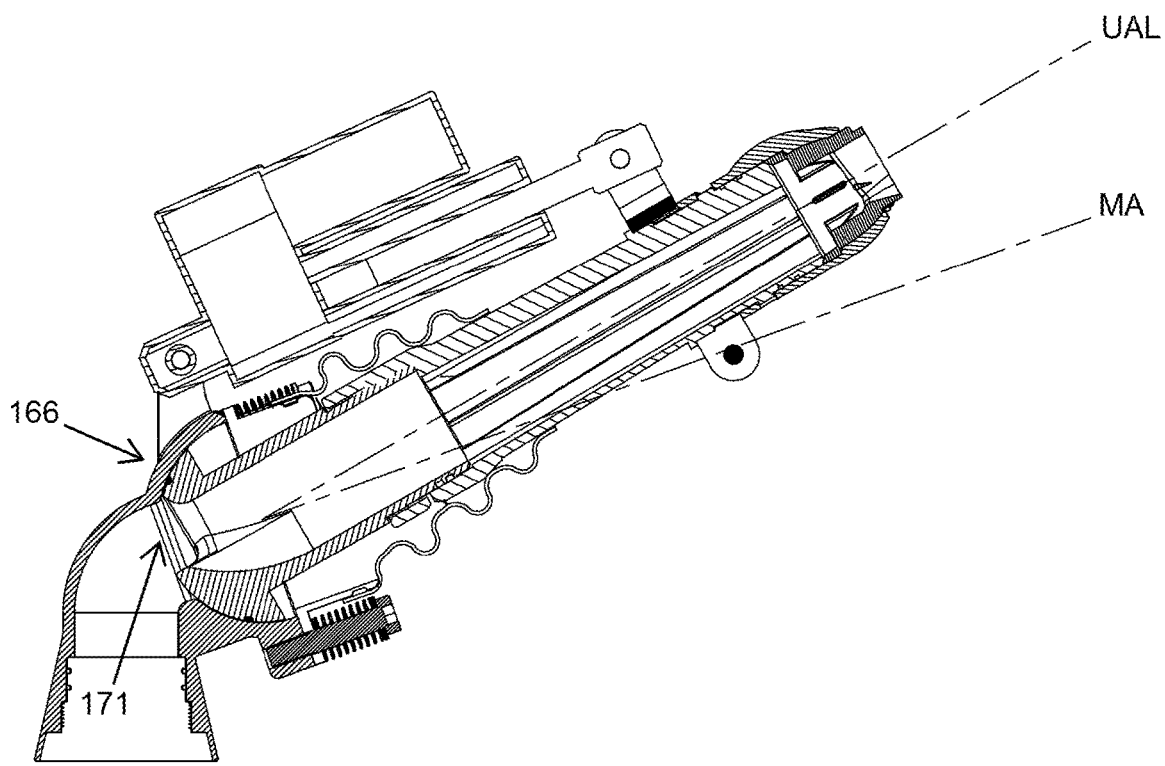
FIG. 9 is a view similar to FIG. 8 except the pitch actuator has elevated the nozzle assembly to the UAL above the MA.
Figure 10:
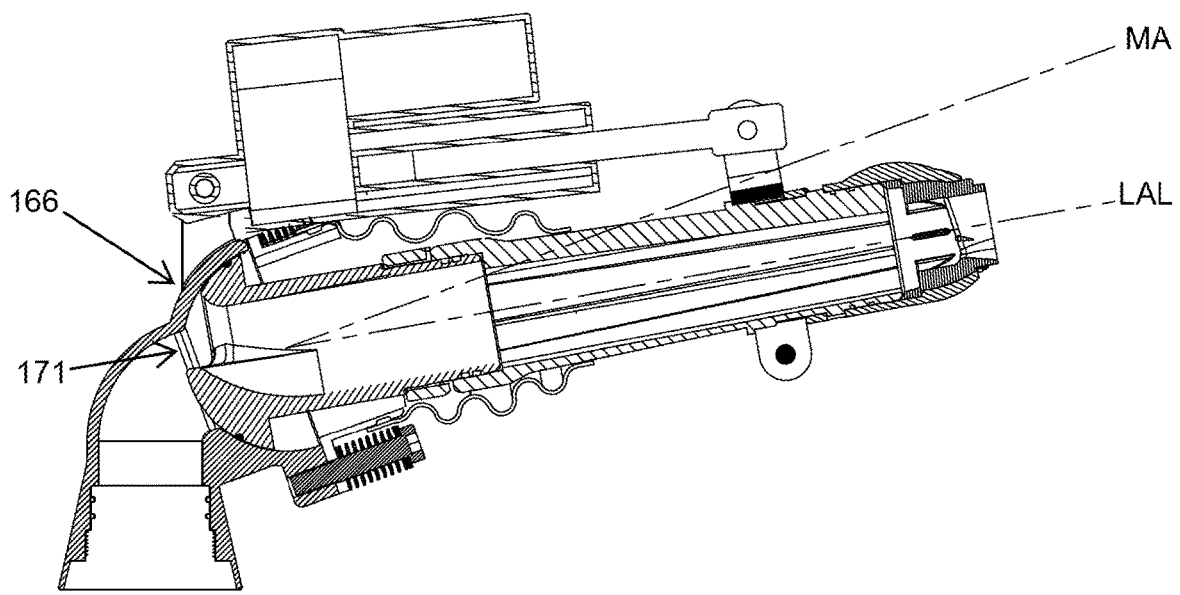
FIG. 10 is a view similar to FIG. 8 except the pitch actuator has lowered the nozzle assembly to the LAL below the MA.

FIG. 2 is a top view of the sprinkler 100 of FIG. 1 showing the turret 106 of the sprinkler 100 configured to move in both pitch 118 and yaw 116 directions relative to the base 101. In certain embodiments, the turret 106 supports one or more nozzles configured to spray water from the sprinkler 100. In certain embodiments, the turret 106 of the sprinkler 100 is configured to move in both pitch 118 and yaw 116 directions relative to an elbow 104. In certain embodiments, a flow rate and pressure of the water exiting the sprinkler 100 can be increased or decreased to improve the aim and water coverage of the sprinkler 100. For example, in certain embodiments, the sprinkler 100 can include a valve 166 as shown in FIG. 8 or other structure that can increase and decrease the flow rate and pressure of the water exiting the sprinkler 100. In certain embodiments, the valve 166 can have a variable flow cross-sectional shape. In certain embodiments, changing the flow rate through the valve 166 is achieved independent of other components of the sprinkler 100. In certain other embodiments, changing the flow rate through the valve 166 is driven by movement of other components of the sprinkler 100. For example, FIGS. 8-10 illustrate an embodiment of the valve 166 that is configured as an adjustable orifice 171 which is driven by movement of other components of the sprinkler 100. In certain embodiments, movement of the sprinkler 100 in the pitch 118 direction changes the size of the adjustable orifice 171 of the valve 166 to change the flow rate and the pressure of the water exiting the sprinkler 100.

Figure 3:
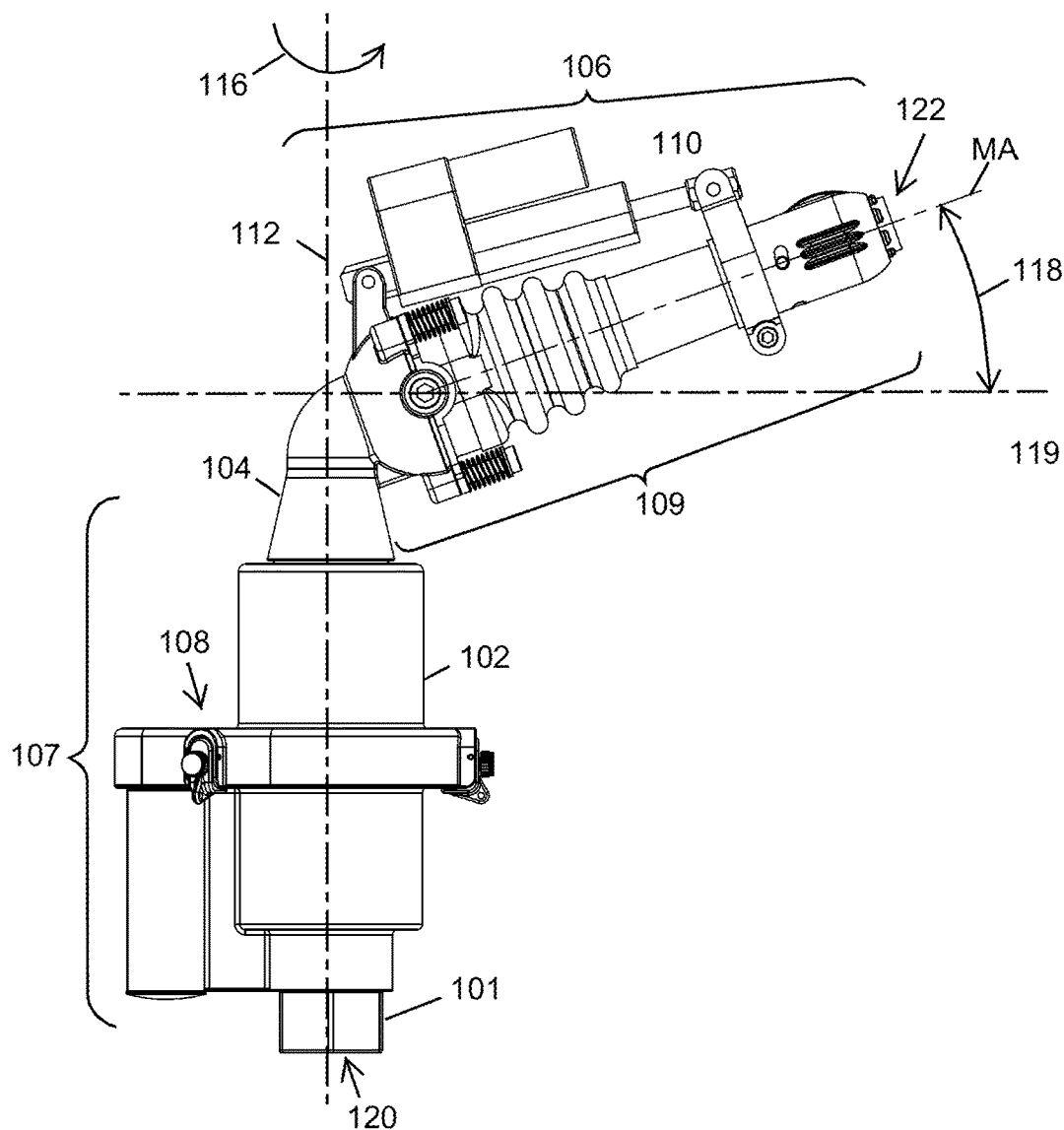
FIG. 3 is a front elevation view of the sprinkler of FIG. 1 showing a radial aiming portion and a horizontal aiming portion configured to rotate, elevate, and lower the turret relative to an outer body of the sprinkler, respectively. The turret is shown elevated to a mean angle measured from a horizontal plane.

FIG. 3 is a front elevation view of the sprinkler 100 of FIG. 1 showing a radial aiming portion 107 and a horizontal aiming portion 109 configured to rotate and raise/lower the turret 106 relative to the base 101 of the sprinkler 100, respectively. The turret 106 is shown in FIG. 3 elevated to a mean angle (MA) measured from a horizontal plane 119. In some embodiments, the mean angle may be approximately 20 degrees. Of course, the mean angle need not be 20 degrees and can instead be any other number of degrees. The mean angle is defined for ease of description. In certain embodiments, the radial aiming portion 107 and the horizontal aiming portion 109 move the turret 106 in yaw 116 and pitch 118 directions, respectively, relative to the base 101 so as to aim water exiting the sprinkler 100.

In certain embodiments, the radial aiming portion 107 comprises a yaw actuator 108. In certain embodiments, the yaw actuator 108 rotates the turret 106 in clockwise and/or counterclockwise directions about a yaw axis 112. In certain embodiments, the yaw actuator 108 is configured to rotate the turret 106 in only one direction (e.g., clockwise or counterclockwise). In certain embodiments, the yaw actuator 108 can rotate the turret 106 at fixed or variable rates of rotation.

In certain embodiments, the horizontal aiming portion 109 comprises a pitch actuator 110. In certain embodiments, the pitch actuator 110 moves or pivots the turret 106 in up and down directions relative to the horizontal plane 119. As is illustrated in FIGS. 2 and 3, the turret 106 pivots about a pivot axis 123 passing through pivot screws 135.

In certain embodiments, the pitch actuator 110 moves or pivots the turret 106 in up and down directions relative to the elbow 134. For example, in certain embodiments, the turret 106 and the elbow 134 form a ball-and-socket joint to allow the turret 106 to move or pivot in the up and down directions and swivel relative to the elbow 134. In certain embodiments, the elbow 134 and a ball retaining plate 168 (FIG. 5) are assembled to capture a portion of the turret 106 therebetween while still allowing the turret 106 106 to move or pivot in the up and down directions. In the illustrated embodiment, the turret 106 need not swivel relative to the elbow 134. In such an embodiment, the ball-and-socket joint formed between the turret 106 and the elbow 134 can include a pin (e.g., pivot screw 135) or other structure which prevents relative swivel motion while allowing up and down movement. In some embodiments, the pivot screw(s) 135 acts as an axle to allow the turret 106 to rotate about the pivot axis 123 of the pivot screw(s) 135.

In certain embodiments, the pitch actuator 110 can raise/lower the turret 106 at fixed or variable rates. In certain embodiments, the pitch actuator 110 elevates the turret 106 at a first rate and lowers the turret 106 at a second rate different from the first rate.

Figure 4:
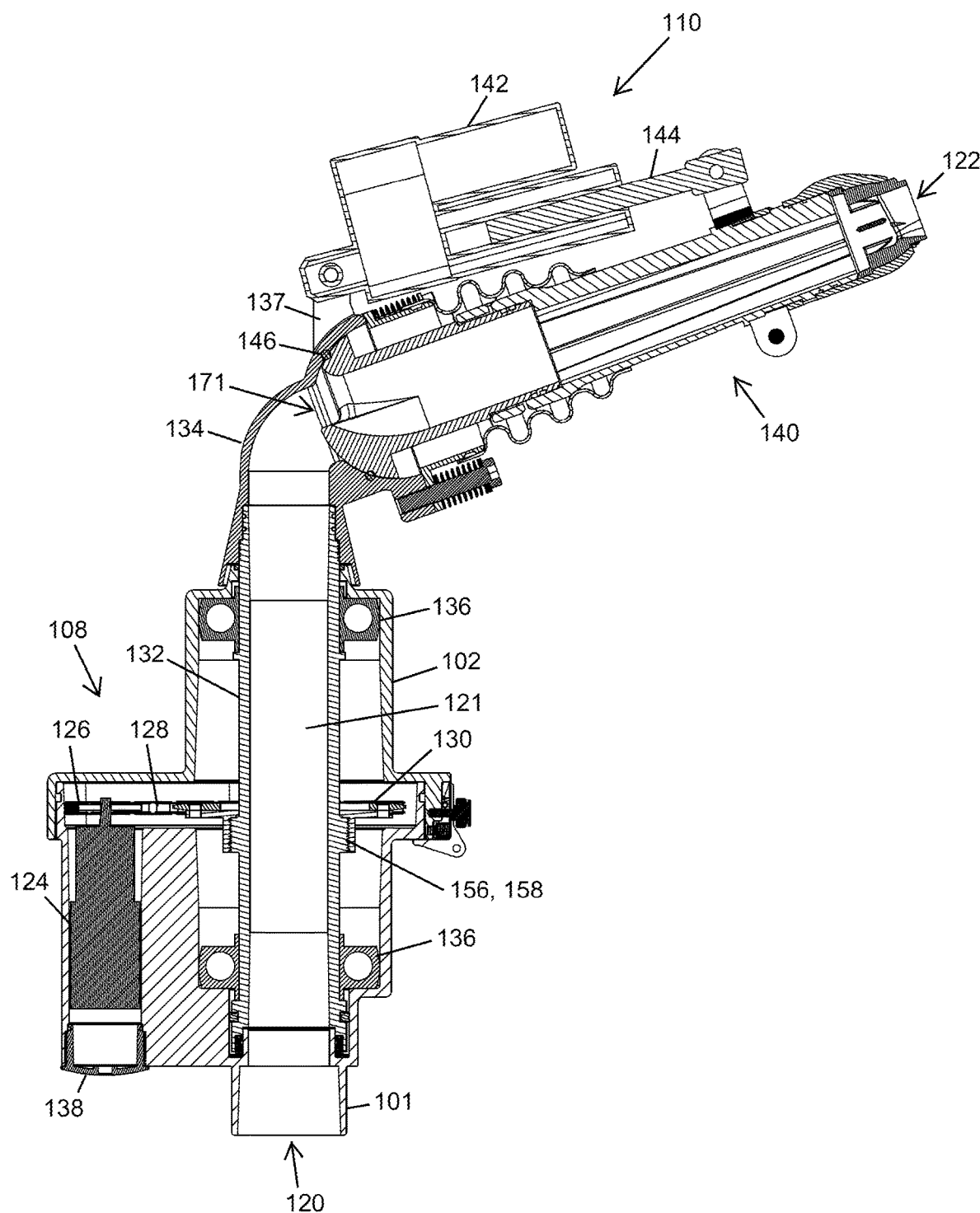
FIG. 4 is a section view of the sprinkler of FIG. 1 viewed from the cut line 4-4 of FIG. 2 showing a yaw actuator and a pitch actuator of the radial aiming portion and the horizontal aiming portion, respectively.

In certain embodiments, the sprinkler 100 comprises an outer body 102. In certain embodiments, the outer body 102 is sized and shaped so as to form one or more receptacles or enclosures for at least a portion of the yaw actuator 108. The outer body 102 can protect the yaw actuator 108 from the outdoor environment. In certain embodiments, the outer body 102 comprises a first receptacle for receiving the yaw actuator 108 and a second receptacle for receiving a tubular structure 104. For example, the tubular structure 104 can extend through at least a portion of the outer body 102 to form at least a portion of a flow passage 121 through the sprinkler 100 as shown in FIG. 4.

In certain embodiments, the tubular structure 104 forming a portion of the flow passage 121 comprises a torque tube 132 (FIG. 4) and the elbow 134. In certain embodiments, a first end of the torque tube 132 couples to the base 101 of the outer body 102. In certain embodiments, a first end of the torque tube 132 rotationally couples to the base 101 of the outer body 102. In certain embodiments, a second end of the torque tube 132 couples to the elbow 134. Of course the tubular structure 104 need not comprises two structures (e.g., the torque tube 132 and the elbow 134) and can instead be a single monolithic structure (e.g., a straight/curved tube) or more than two structures.

In certain embodiments, the sprinkler 100 comprises one or more seals 146 (FIG. 4) disposed between contact surfaces of the turret 106 and the elbow 134 to inhibit water from leaking from the flow passage 121 through the ball-and-socket joint while allowing the turret 106 to move relative to the elbow 134.

A lower portion of the outer body 102 can form the base 101. In certain embodiments, the base 101 is a structure of the sprinkler 100 that couples the sprinkler 100 to the irrigation system. For example, the base 101 can allow for the sprinkler 100 to be mounted to a traveling irrigation system. In certain embodiments, the base 101 comprises a threaded, slip-fit, seal, or other coupling structure for connecting to the irrigation system. The base 101 can form an inlet passage 120 through which water enters the flow passage 121 within the sprinkler 100. For example, the inlet passage 120 can accept water from the irrigation system that then flows through the flow passage 121 (e.g., base 101, tubular structure 104 (torque tube 132, elbow 134), and turret 106) and exits the sprinkler 100 at outlet 122.

In certain embodiments, the sprinkler 100 can contain a screen configured to filter the water entering the inlet 120. In certain embodiments, the screen is disposed in the tubular structure 104. In certain embodiments, the screen is disposed downstream of the inlet 120 to prevent some dirt, rocks, algae, and other materials from flowing with the water through the sprinkler 100.

FIG. 4 is a section view of the sprinkler 100 of FIG. 1 viewed from the cut line 4-4 of FIG. 2 showing the yaw actuator 108 and the pitch actuator 110 of the radial aiming portion 107 and the horizontal aiming portion 109, respectively. In certain embodiments, the yaw actuator 108 moves the radial orientation of the outlet 122 relative to the base 101. In certain embodiments, the yaw actuator 108 can be connected to the tubular structure 104 (e.g., torque tube 132) to rotate the outlet 122 through a desired arc at a desired speed to properly distribute water over an irrigated area.

The yaw actuator 108 can be operated by electric, pneumatic, hydraulic or any other source of power. In the illustrated embodiments, the yaw actuator 108 is driven by a motor 124. In certain embodiments, the motor 124 is secured within a receptacle of the outer body 102 to prevent a body of the motor 124 from rotating within the receptacle. In certain embodiments, a cap 138 covers an opening to the receptacle.

The yaw actuator 108 can be operationally connected to the torque tube 132 of the sprinkler 100 by gears, pulleys, belts or other connecting drive components. In some embodiments, a drive gear connected to the output shaft of the motor can mesh with a driven gear connected to the torque tube 132. In some embodiments, one or more idler gears can rotationally connect the drive gear to the driven gear. In the embodiment illustrated in FIG. 3, the motor 124 is connected to the torque tube 132 of the tubular structure 104 by a pair of chain sprockets (e.g., sprocket 126 and chain ring 130) and a drive chain 128. For example, an output shaft of the motor 124 can be coupled to the sprocket 126 so as to rotate teeth of the sprocket 126. The drive chain 128 can mesh with the teeth of the sprocket 126 and teeth of the chain ring 130. In certain embodiments, the chain ring 130 is fixed to the torque tube 132 so as to allow torque generated by the motor 124 to rotate the tubular structure 104. As the motor 124 rotates, the output shaft drives the torque tube 132 to rotationally aim the turret 106 of the sprinkler 100. In certain embodiments, the sizes of the sprocket 126 and the chain ring 130 can be selected to gear down or gear up so as to change a final drive ratio of the radial aiming portion 107.

In certain embodiments, the outer body 102 comprises one or more bearings 136. In certain embodiments, the one or more bearings 136 support and guide rotation of the tubular structure 104. For example, in the illustrated embodiment of FIG. 4, the outer body 102 comprises a first bearing 136 disposed near an upper end of the torque tube 132 and a second bearing disposed near a lower end of the torque tube 132. In certain embodiments, the one or more bearings 136 are ball bearings or any other type of bearing (e.g., roller bearing, plain bearing, etc.) known to a person having ordinary skill in the art.

In certain embodiments, the turret 106 comprises the pitch actuator 110 and a nozzle assembly 140. The pitch actuator 110 can be operationally connected to the nozzle assembly 140 by gears, pulleys, belts or other connecting drive components. In this way, the pitch actuator 110 can move the nozzle assembly 140 up and down relative to the horizontal plane 119 to facilitate the water exiting the flow passage 121 at the outlet 122 to reach a desired watering radius for properly distributing water over the irrigated area.

In certain embodiments, movements of the yaw actuator 108 and the pitch actuator 110 are coordinated to facilitate the water exiting the flow passage 121 at the outlet 122 to reach the desired watering radius as well as the desired rotational angle for properly distributing water over the irrigated area. In certain embodiments where the sprinkler 100 is attached to a moving irrigation system, the movements of the yaw actuator 108 and the pitch actuator 110 can take into account movements or changes in position of the irrigation system to achieve the desired watering patterns on the property.

In the illustrated embodiment, the pitch actuator 110 is disposed above the nozzle assembly 140. In other embodiments, the pitch actuator 110 is disposed below or to a side of the nozzle assembly 140. In other embodiments, the pitch actuator 110 is mounted on the elbow 134 while connecting to a portion of the nozzle assembly 140. In certain embodiments, the pitch actuator 110 is disposed in line with the nozzle assembly 140.

The pitch actuator 110 can be operated by electric, pneumatic, hydraulic or any other source of power. In the illustrated embodiments, the pitch actuator 110 is driven by a motor 142. In certain embodiments, the motor 142 is secured within a receptacle of the pitch actuator 110 to prevent a body of the motor 142 from rotating within the receptacle.

In the illustrated embodiment, activation of the motor 142 can extend or retract a push rod 144. For example, in certain embodiments, powering of the motor 142 turns one or more gears of the pitch actuator 110 depending on a desired level of torque and associated speed of the motor 142. In certain embodiments, the one or more gears turn a screw attached to the push rod 144. In this way, the push rod 144 can be moved in (e.g., retracted) or out (e.g., extended) depending on the direction (e.g., clockwise or counterclockwise) the motor 142 turns the screw.

In the illustrated embodiment, the pitch actuator 110 couples the elbow 134 to the nozzle assembly 140 so as to be able to change the pitch (e.g., up and down) 118 of the nozzle assembly 140 relative to the horizontal plane 119. In the illustrated embodiment, movement of the push rod 144 in (e.g., retracted) or out (e.g., extended) changes the pitch (e.g., up or down) 118 of the nozzle assembly 140 relative to the elbow 134. In certain embodiments, a first end of the pitch actuator 110 connects to a rotating portion of the sprinkler 100 (e.g., elbow 134) and a second end of the pitch actuator 110 connects to the nozzle assembly 140. In this way, the first and second ends of the pitch actuator 110 will rotate (e.g., yaw 116) in concert with the turret 106 while allowing the pitch actuator 110 to change the pitch (e.g., up and down) 118 of the nozzle assembly 140 by extending or retracting the push rod 144.

Figure 5:
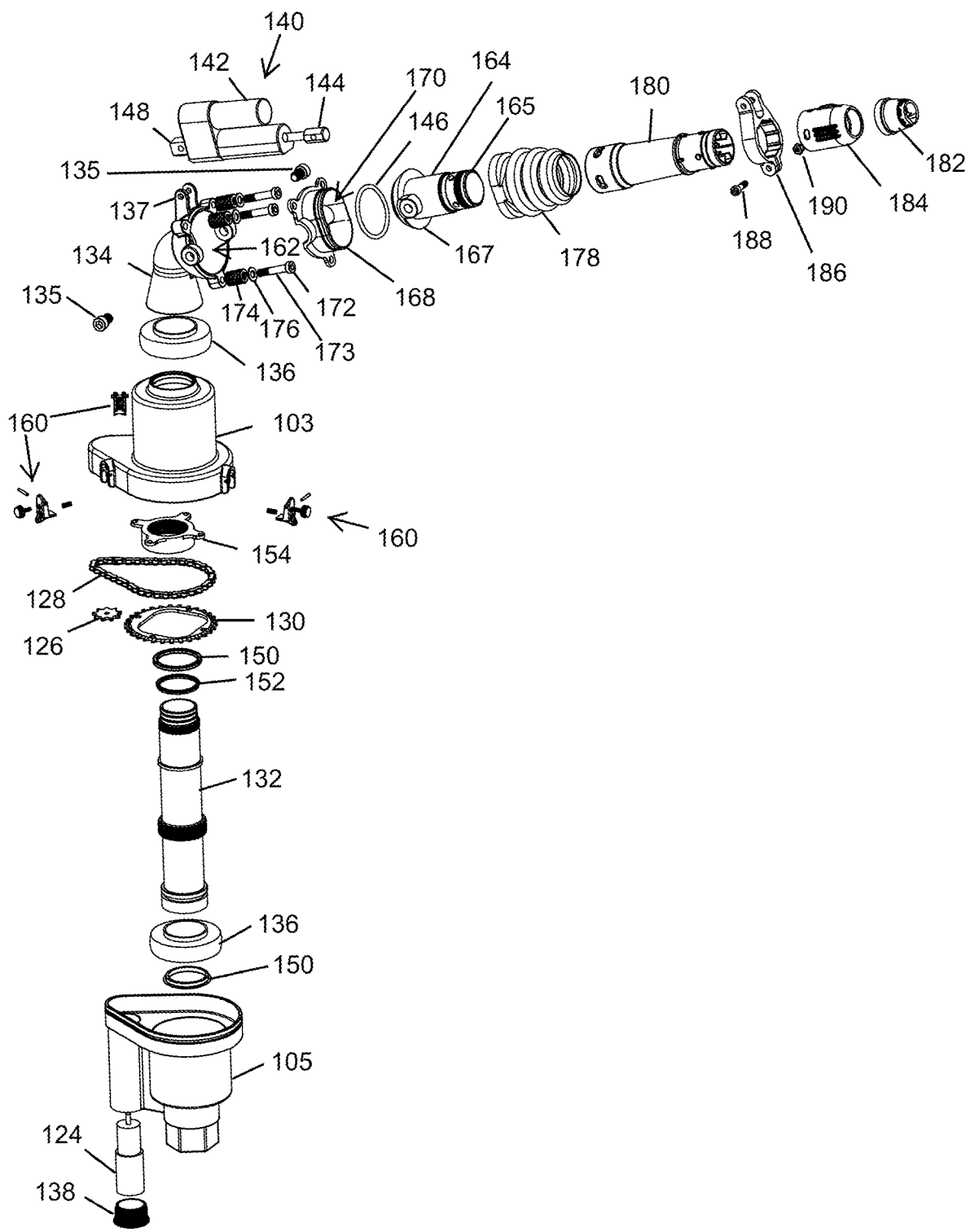
FIG. 5 is an exploded view of the sprinkler of FIG. 1 showing, for example, a nozzle assembly of the turret.

In the illustrated embodiment, the first end of the pitch actuator 110 is connected to the elbow 134 while the second end (e.g., the push rod 144) is coupled to the nozzle assembly 140. In certain embodiments, the first end of the pitch actuator 110 is sized and shaped as a tang 148 for receiving a stock 137 of the elbow 134 (FIG. 5). In certain embodiments, the connection between the tang 148 and the stock 137 allows slight rotation of the tang 148 within the stock 137 as the nozzle assembly 140 is raised or lowered by the pitch actuator 110.

FIG. 5 is an exploded view of the sprinkler 100 of FIG. 1. In certain embodiments, the outer body 102 of the radial aiming portion 107 comprises an upper outer body 103 and a lower outer body 105 together housing at least portions of the radial actuator 108 and of the torque tube 132. In certain embodiments, the radial aiming portion 107 comprises one or more latch assemblies 160. In certain embodiments, the one or more latch assemblies 160 releasably secure the upper outer body 103 to the lower outer body 105. In the illustrated embodiment, the sprinkler 100 comprises three latch assemblies 160 spaced about the outside of the upper outer body 103.

In certain embodiments, the radial aiming portion 107 comprises seal supports 150. In certain embodiments, the seal supports 150 are disposed between surfaces of the lower outer body 105 and the torque tube 132. For example, in certain embodiments, the seal supports 150 are disposed above and below seal 152. The seal 152 inhibits water from leaking into the outer body 102 from the flow passage 121. In certain embodiments, the seal supports 150 can maintain the integrity of the seal 152 when the radial aiming portion 107 is rotating the torque tube 132 within the outer body 102.

In certain embodiments, the radial aiming portion 107 comprises a chain ring mount 154. In the illustrated embodiment, the chain ring mount 154 supports the chain ring 130. For example, in certain embodiments, the chain ring mount 154 and the chain ring 130 are coupled together by one or more fasteners (e.g., screws, bolts, and the like). In other embodiments, the chain ring mount 154 and the chain ring 130 are manufactured as a single piece. In certain embodiments, the chain ring mount 154 is fixed to the torque tube 132 so as to prevent rotation of the chain ring 130 relative to the torque tube 132 when the motor 124 applies torque to the chain 128. For example, in certain embodiments, the chain ring mount 154 and the torque tube 132 comprise contact surfaces 156, 158, respectively (FIG. 4). In certain embodiments, the contact surfaces 156, 158 are interference threads. In certain embodiments, the contact surfaces 156, 158 are adhered together by, for example, adhesive, welding, and the like.

In certain embodiments, the elbow 134 comprises a socket 162. In certain embodiments, the socket 162 is sized and shaped to receive a portion of a ball joint 164 of the nozzle assembly 140. In certain embodiments, the ball joint 164 has a mushroom shape. In certain embodiments, the ball joint 164 comprises a stem 165 and a cap 167. In certain embodiments, an outer surface of the cap 167 abuts against an inner surface of the socket 162 at least when the sprinkler 100 is under pressure irrigating an area. In certain embodiments, a curvature of the inner surface of the socket 162 matches a curvature of the outer surface of the cap 167 so that the ball joint 164 can pivot about the axis 123 of the pivot screws 135 (FIG. 2) while being supported by the inner surface of the socket 162. In certain embodiments, the inner surface of the socket 162 is slightly offset from the outer surface of the cap 167 when the ball joint 164 and the socket 162 are assembled (FIG. 4). For example, in certain embodiments, the inner surface of the socket 162 is slightly offset from the outer surface of the cap 167 in the region of the seal 146 so that the seal 146 maintains contact with both the socket 162 and the ball joint 164 as the nozzle assembly 140 articulates relative to the elbow 134.

In certain embodiments, the flow passage 121 passes through both the inner surface of the socket 162 and the outer surface of the cap 167. As will be explained below, the cross-sectional flow area along the flow passage 121 between the elbow 134 and the ball joint 164 can be selectively changed so as to change a flow rate and pressure of the water exiting the outlet 122. For example, in certain embodiments, the sprinkler 100 can include a valve 166 or other structure that can increase and decrease the flow rate and pressure of the water exiting the sprinkler 100. In certain embodiments, the valve 166 can have a variable flow cross-sectional shape.

In certain embodiments, changing the flow rate through the valve 166 is achieved independent of other components of the sprinkler 100. In certain other embodiments, changing the flow rate through the valve 166 is driven by movement of other components of the sprinkler 100. For example, FIGS. 8-10 illustrate an embodiment of the valve 166 that is configured as an adjustable orifice which is driven by movement of other components of the sprinkler 100. In the illustrated embodiment, movement of the sprinkler 100 in the pitch 118 direction controls the valve 166 to change the flow rate and the pressure of the water exiting the sprinkler 100. More specifically, in certain embodiments, movement of the ball joint 164 relative to the socket 162 not only changes the pitch of the outlet 122 relative to the mean angle but also changes the cross-sectional flow area of the orifice through the valve 166. In certain embodiments, changing the cross-sectional flow area of the orifice can change the flow rate and the pressure of the water exiting the outlet 122.

In certain embodiments, the nozzle assembly 140 comprises a ball retainer plate 168. In certain embodiments, the ball retainer plate 168 comprises an opening 170 sized and shaped to receive the stem 165 of the ball joint 164. In certain embodiments, at least a portion of the cap 167 of the ball joint 164 is captured between the ball retainer plate 168 and the elbow 134 when the sprinkler 100 is assembled. For example, in certain embodiments, the ball retainer plate 168 is assembled to the elbow 134 with one or more fasteners 172 (e.g., screw, bolt, or the like).

In certain embodiments, the one or more fasteners 172 allow slight movement of the ball retainer plate 168 relative to the elbow 134. For example, in certain embodiments, the one or more fasteners 172 secure to the elbow 134 so as allow an offset or gap between the inner surface of the socket 162 and the outer surface of the cap 167 to vary or adjust to operational conditions (e.g., slightly increase and decrease).

Allowing the offset or gap to vary may be advantageous by mitigating against binding or interference occurring between the inner surface of the socket 162 and the outer surface of the cap 167 as the ball joint 164 moves within the elbow 134.

In certain embodiments, the sprinkler 100 includes one or more springs 174. For example, in certain embodiments, one or more springs 174 are disposed relative to the one or more fasteners 172 to maintain a predefined level of tension between bolt heads of the fasteners 172 and the elbow 134. The level of tension allows slight movement of the ball retainer plate 168 relative to the elbow 134 when the ball retainer plate 168 is secured to the elbow 134 by the one or more fasteners 172. In some embodiments, the level of tension provides force to the ball joint 164 to keep the seal 146 engaged between the ball joint 164 and the socket 162. In certain embodiments, the one or more springs 174 have spring constants which maintain the predefined level of tension. In certain embodiments, a maximum depth of engagement of the one or more fasteners 172 into holes in the elbow 134 prevents the one or more fasteners 172 from exceeding the predefined level of tension. For example, in certain embodiments, the one or more fasteners 172 bottom out in the holes in the elbow 134 with the one or more springs 174 providing the tension between the bolt heads of the fasteners 172 and the elbow 134. In some embodiments, the fastener 172 can have an unthreaded portion 173. In some embodiments, the fastener 172 can be threaded into the elbow 134 until the unthreaded portion 173 contacts the threaded hole in the elbow 134 to limit the fastener 172 from exceeding the predefined level of tension. In certain embodiments, one or more washers 176 are disposed between the heads of the one or more fasteners 172 and the one or more springs 174.

In certain embodiments, the nozzle assembly 140 comprises one or more nozzle tubes 180. In certain embodiments, an inlet of the nozzle tube 180 is sized and shaped to connect with the stem 165 of the ball joint 164. In certain embodiments, the connection between the nozzle tube 180 and the stem 165 is watertight. In certain embodiments, the stem 165 comprises a key and the nozzle tube 180 comprises a corresponding keyway for receiving the key to secure the nozzle tube 180 to the stem 165. In certain embodiments, water flows in the flow passage 121 to exit the stem 165 of the ball joint 164 and then enter the nozzle tube 180.

The nozzle assembly 140 can be configured to hold a removable nozzle 182. In certain embodiments, the nozzle assembly 140 comprises a nozzle retainer 184. The nozzle retainer 184 can be configured to releasably connect with the nozzle tube 180. In certain embodiments, the nozzle tube 180 comprises a threaded portion and the nozzle retainer 184 comprises a corresponding threaded portion to rotationally secure the nozzle retainer 184 to the nozzle tube 180. In certain embodiments, the nozzle tube 180 comprises a key and the nozzle retainer 184 comprises a corresponding keyway for receiving the key to secure the nozzle retainer 184 to the nozzle tube 180. In certain embodiments, the nozzle 182 can be configured to fit at least partially within the nozzle retainer 184 when the nozzle retainer 184 is connected to the nozzle tube 180. In certain embodiments, the nozzle retainer 184 and the nozzle 182 are sized so that the nozzle 182 is captured between a distal end of the nozzle tube 180 and an opposing surface of the nozzle retainer 184 when the nozzle retainer 184 is connected to the nozzle tube 180.

In some embodiments, nozzles of various spray ranges and/or spray patterns can be used in the same nozzle retainer 184. For example, the nozzle retainer 184 can include a short-range nozzle 182 configured to output water within a first range from the sprinkler 100. In certain embodiments, the nozzle retainer 184 can include a mid-range nozzle 182 configure to output water within or in a second range greater further from the sprinkler 100 than the first range. In certain embodiments, the nozzle retainer 184 includes a long range nozzle 182 configured to output water within a third range further from the sprinkler 100 than the second range. In some embodiments, the nozzle 182 can comprise two or more orifices to provide irrigation at different ranges from each orifice.

The flow passage 121 through the nozzle 182 can be selected to have any size or shape. For example, the flow passage 121 can have a circular, square, rectangular, or any other shape. In certain embodiments, the size and/or shape can be selected depending on the desired flow characteristics (e.g., spray range and/or spray pattern) for the sprinkler 100. Many variations are possible.

In some cases, multiple (e.g., 2, 3, 4, 5, 6, or more) nozzles 182 (e.g., having varying nozzle sizes and/or shapes) are packaged with a sprinkler 100 to facilitate installation of a nozzle 182 for a particular sprinkler 100. For example, the nozzle retainer 184 can be configured to couple with different nozzles 182 having differing spray patterns, output ranges, flow rates, trajectories, and/or other features. The nozzles 182 can have differences in port size, number of ports, and/or other features.

In certain embodiments, the nozzle assembly 140 comprises a boot 178. In certain embodiments, the boot 178 comprises a flexible material. In certain embodiments, the boot 178 flexibly couples the ball retainer plate 168 to the nozzle tube 180 so as to prevent debris from fouling the sprinkler 100. For example, in certain embodiments, the boot 178 prevents debris from entering the area between the ball retainer plate 168 and the ball joint 164.

In certain embodiments, the pitch actuator 110 couples to the nozzle assembly 140. For example, in certain embodiments, the nozzle assembly 140 comprises a bracket 186. In certain embodiments, the bracket 186 couples the nozzle tube 180 to the pitch actuator 110. In certain embodiments, the bracket 186 can couple to both the push rod 144 of the pitch actuator 110 and the nozzle tube 180. For example, in certain embodiments, the bracket 186 is sized and shaped to clamp around an outer circumference of the nozzle tube 180. In certain embodiments, a screw 188 and a nut 190 are employed to clamp the bracket 186 on the nozzle tube 180.

In certain embodiments, the seal 146 is disposed between the socket 162 and the cap 167 of the ball joint 164 to inhibit water from leaking from the flow passage 121 through the joint while allowing the turret 106 to articulate relative to the elbow 134.

Figure 6:
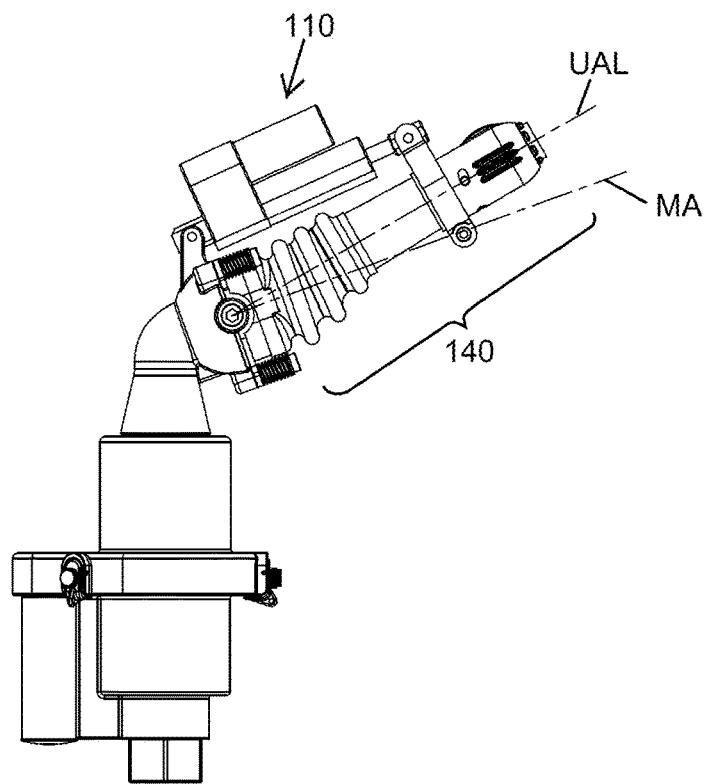
FIG. 6 is a view similar to FIG. 3 except the pitch actuator has elevated the nozzle assembly to an upper angle limit (UAL) above the mean angle (MA).

FIG. 6 is a view similar to FIG. 3 except the pitch actuator 110 has elevated the nozzle assembly 140 to an upper angle limit (UAL) above the mean angle (MA). In some embodiments, the upper angle limit (UAL) can be 10 degrees above the MA. Of course, the UAL need not be 10 degrees and can instead be any other number of degrees.

Figure 7:
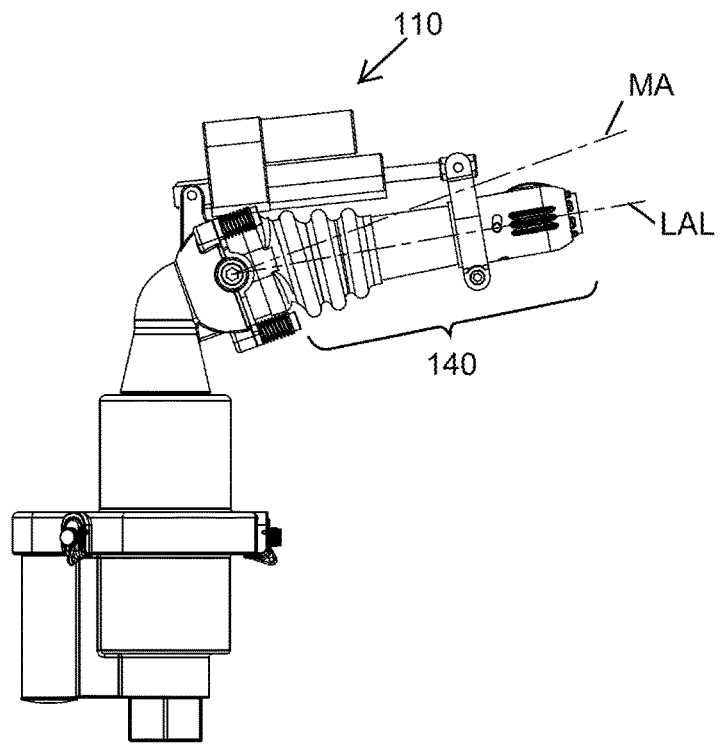
FIG. 7 is a view similar to FIG. 3 except the pitch actuator has lowered the nozzle assembly to a lower angle limit (LAL) below the MA.

FIG. 7 is a view similar to FIG. 6 except the pitch actuator 110 has lowered the nozzle assembly 140 to a lower angle limit (LAL) below the MA. In some embodiments, the lower angle limit (LAL) can be 10 degrees below the MA. Of course, the LAL need not be 10 degrees and can instead be any other number of degrees. As shown in FIGS. 6 and 7, the flexibility of the boot 178 allows the boot 178 to protect the area between the ball retainer plate 168 and the ball joint 164 from debris when the nozzle assembly 140 is in both positions.

FIG. 8 is a section view through the elbow 134 and the turret 106 from the sprinkler 100 of FIG. 4 showing the nozzle assembly 140 positioned by the pitch actuator 110 to be aligned with the MA. The mean angle (MA) is measured from the horizontal plane 119. In some embodiments, the mean angle may be approximately 20 degrees. Of course, the mean angle need not be 20 degrees and can instead be any other number of degrees. FIG. 9 is a view similar to FIG. 8 except the pitch actuator 110 has elevated the nozzle assembly 140 to the UAL above the MA. In some embodiments, the upper angle limit (UAL) can be 10 degrees above the MA. Of course, the UAL need not be 10 degrees and can instead be any other number of degrees. FIG. 10 is a view similar to FIG. 8 except the pitch actuator 110 has lowered the nozzle assembly 140 to the LAL below the MA. In some embodiments, the lower angle limit (LAL) can be 10 degrees below the MA. Of course, the LAL need not be 10 degrees and can instead be any other number of degrees.

In the illustrated embodiment of FIGS. 8-10, the valve 166 is configured as an adjustable orifice 171 located in the flow passage 121. For example, as shown in FIG. 8, a size (e.g., cross sectional flow area) of the adjustable orifice 171 of the valve 166 formed by the overlap between the opening in the outer surface of the cap 167 of the ball joint 164 and the opening through the inner surface of the socket 162 of the elbow 134 is nominal. The nominal size of the orifice 171 correlates to a nominal water flow rate and pressure of water exiting the outlet 122.

As shown by a comparison between the three positions of the ball joint 164 in FIGS. 8-10, the different pitches of the nozzle assembly 140 (e.g., MA in FIG. 8, UAL in FIG. 9, and LAL in FIG. 10) change the size or cross-sectional flow area of the orifice 171. For example, as shown in FIG. 9, the size (e.g., cross sectional flow area) of the orifice 171 formed by the overlap between the opening in the outer surface of the cap 167 of the ball joint 164 and the opening through the inner surface of the socket 162 of the elbow 134 has increased from the nominal size shown in FIG. 8. The increased size of the orifice 171 correlates to an increase in water flow rate and pressure of water exiting the outlet 122. In this way, while changing the pitch of the nozzle assembly 140 can itself increase the throw distance of the sprinkler 100, increasing the size of the orifice 171 can further increase the throw distance beyond what can be achieved by changing only the pitch of the nozzle assembly 140.

Referring to FIG. 10, the size (e.g., cross sectional flow area) of the orifice 171 formed by the overlap between the opening in the outer surface of the cap 167 of the ball joint 164 and the opening through the inner surface of the socket 162 of the elbow 134 has decreased from the nominal size shown in FIG. 8. The decreased size of the orifice 171 correlates to a decrease in water flow rate and pressure of water exiting the outlet 122. In this way, movement of the sprinkler 100 in the pitch direction not only changes the trajectory of the water exiting the outlet 122 but also changes the flow rate and the pressure of the water exiting the sprinkler 100. In this way, while changing the pitch of the nozzle assembly 140 can itself decrease the throw distance of the sprinkler 100, decreasing the size of the orifice 171 can further decrease the throw distance below what can be achieved by changing only the pitch of the nozzle assembly 140.

A rate of change in the size (e.g., cross sectional flow area) of the orifice 171 as the pitch of the nozzle assembly 140 changes can be selected depending on the desired water exit profile at different pitch angles. For example, in certain embodiments, varying a width of the opening in the outer surface of the cap 167 (e.g., circular v. square) of the ball joint 164 can increase or decrease the rate of change in the size of the orifice as the nozzle assembly 140 moves within a range between the LAL and UAL. Any geometric shape and corresponding rate is possible.

Figure 11:
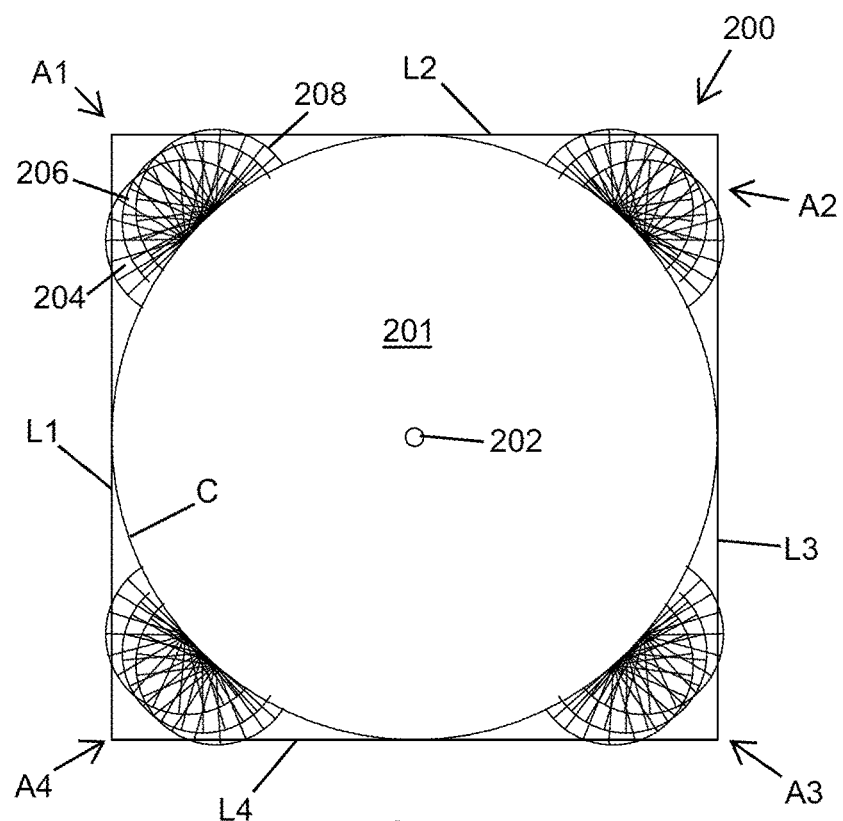
FIG. 11 is an illustration of an undesirable corner watering pattern obtained with a prior art impact sprinkler located on an end of a traveling sprinkler system rotating about a center pivot tower.
Figure 12:
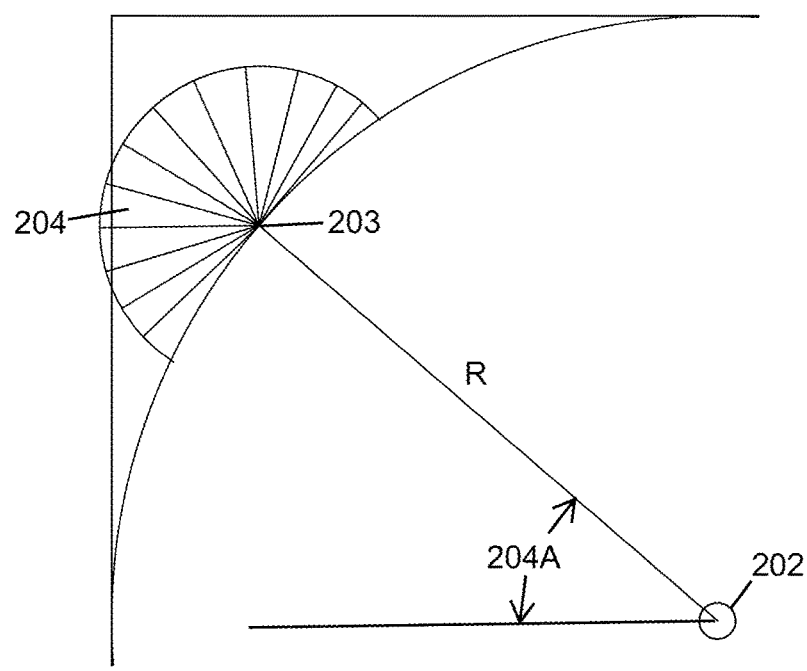
FIG. 12 is an illustration of the watering pattern when the traveling sprinkler system initially reaches the corner and turns on the prior art impact sprinkler.

FIG. 11 is an illustration of an undesirable corner watering pattern 200 obtained with a prior art impact sprinkler. The prior art impact sprinkler is located on a radial end 203 of a traveling sprinkler system rotating about a center pivot tower 202 as shown in FIG. 12. The irrigation area 201 has an exemplary square shape with multiple areas A1, A2, A3, and A4 in the irrigation area 201, corresponding to corners of the square formed by adjoining borders L1, L2, L3, and L4 and circumference C of the rotating traveling sprinkler system, that are difficult to reach and water evenly. Of course, the irrigation shape is only exemplary but is used to illustrate the advantages of the sprinkler 100 over prior art impact sprinklers when situated on radial end 203 of a traveling sprinkler system that is irrigating an irrigation area 201 that includes one or more hard to reach areas or corners.

Watering patterns 204, 206, 208, illustrated by radial lines extending from the radial end 203 of the traveling sprinkler system, created by the prior art impact sprinkler are shown for three different sequential positions of the impact sprinkler as the impact sprinkler moves along an outer circumference C of the end of the traveling sprinkler system. As illustrated, the watering patterns 204, 206, 208 not only do not reach the entire irrigation area 201, but also the amount of water deposited in the areas covered by the watering patterns 204, 206, 208 is uneven with a greater concentration of water where radial lines overlap the most and a lesser concentration of water where the radial lines overlap the least or do not extend through any of the irrigation area 201.

While three positions corresponding to the watering patterns 204, 206, 208 are shown for clarity, it is understood that the impact sprinkler need not be turned off and back on as the impact sprinkler moves between position 204 and position 208. In certain embodiments, the impact sprinkler is on continuously between positions 204 and 208 while the traveling sprinkler system is still moving. In certain embodiments, the impact sprinkler is turned off after passing position 208 (e.g., clockwise direction of rotation) and turned back on once the impact sprinkler travels further along the outer circumference and reaches the next corner of the irrigation area 201.

FIG. 12 is an illustration of the watering pattern 204 from FIG. 11 when the traveling sprinkler system initially reaches first corner A1 (moving clockwise) and turns on the prior art impact sprinkler. The watering pattern 204 illustrates an approximation of the water pattern achieved by the prior art impact sprinkler as the sprinkler system rotates about the center pivot 202 and the prior art impact sprinkler rotates about the radial end 203. Because of the fixed circular shape of the watering pattern 204, the impact sprinkler is turned on at angle 204A to reduce the amount of water that would be wasted by watering outside the irrigation area 201 if the impact sprinkler was turned on before reaching angle 204A. In certain embodiments, the angle 204A is 40 degrees. Of course, the angle need not be 40 degrees and can instead be any other angle. As is illustrated in FIG. 12, only a small portion of the watering pattern 204 falls outside the irrigation area 201. An improved water pattern would evenly distribute water in the irrigation area 201 without watering outside the irrigation area 201.

Figure 13:
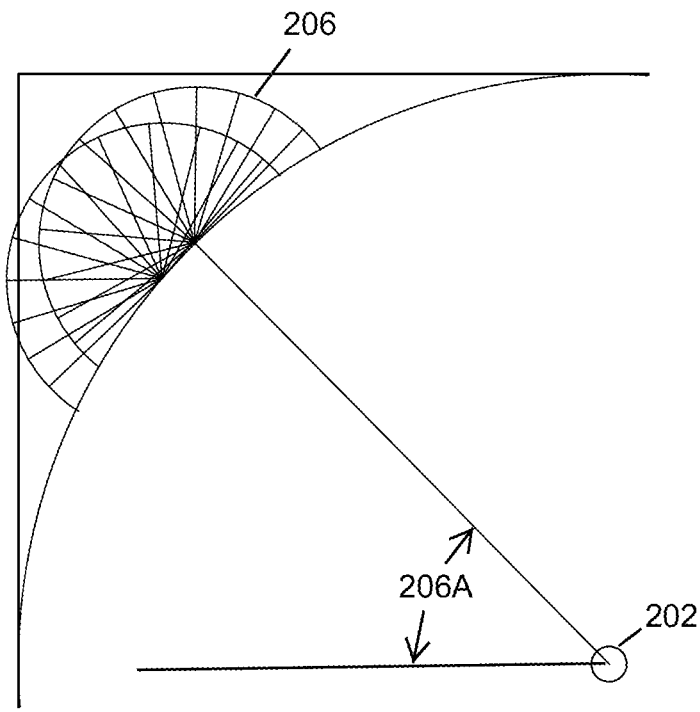
FIG. 13 is similar to FIG. 12 except it adds the watering pattern of the prior art impact sprinkler after the traveling sprinkler system has further rotated to a mid-point of the corner.

FIG. 13 is similar to FIG. 12 except it adds the watering pattern 206 of the prior art impact sprinkler after the traveling sprinkler system has further rotated to a mid-point of the corner corresponding to an angle 206A. In certain embodiments, the angle 206A is 45 degrees. Of course, the angle need not be 45 degrees and can instead be any other angle. While the entire watering pattern 206 falls within the irrigation area 201, the watering pattern 206 is still undesirable because the combined watering patterns 204, 206 results in an uneven distribution of water. For example, the water distributed in overlapping areas of the two watering patterns 204, 206 is greater than in areas where the watering patterns 204, 206 do not overlap.

Figure 14:
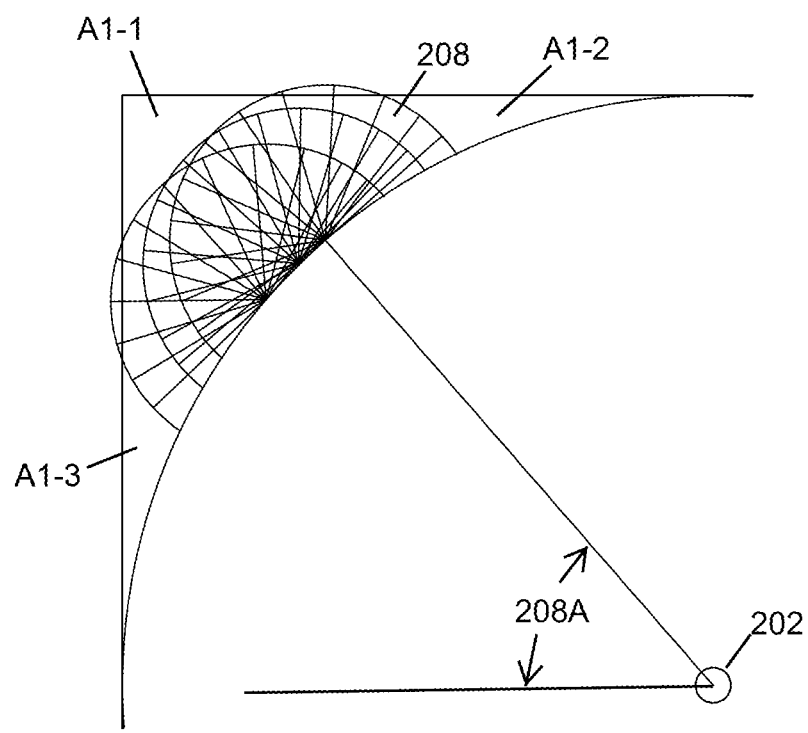
FIG. 14 is similar to FIG. 13 except it adds the watering pattern of the prior art impact sprinkler after the traveling sprinkler system has further rotated to an end of the corner.

FIG. 14 is similar to FIG. 13 except it adds the watering pattern 208 of the prior art impact sprinkler after the traveling sprinkler system has further rotated to an end of the corner corresponding to an angle 208A. In certain embodiments, the angle 208A is 50 degrees. A small portion of the watering pattern 208 falls outside the irrigation area 201. Further, the combined watering patterns 204, 206, 208 still results in an uneven distribution of water. For example, three areas (e.g., far corner A1-1, and both edges A1-2 and A1-3) of the corner A1 within the irrigation area 201 receive little to no water. The areas within the corner that are overlapped by only one of the watering patterns (e.g., 204 or 208) receive light water. The areas within the corner that are overlapped by exactly two of the watering patterns (204 and 206, 206 and 208) receive medium water. The areas within the corner that are overlapped by three of the watering patterns (204 and 206 and 208) receive heavy water. Thus, the combined watering patterns 204, 206, 208 results in an uneven (e.g., none, light, medium, and heavy) distribution of water. An improved water pattern would evenly distribute water in the irrigation area 201 without watering outside the irrigation area 201.

Figure 15:
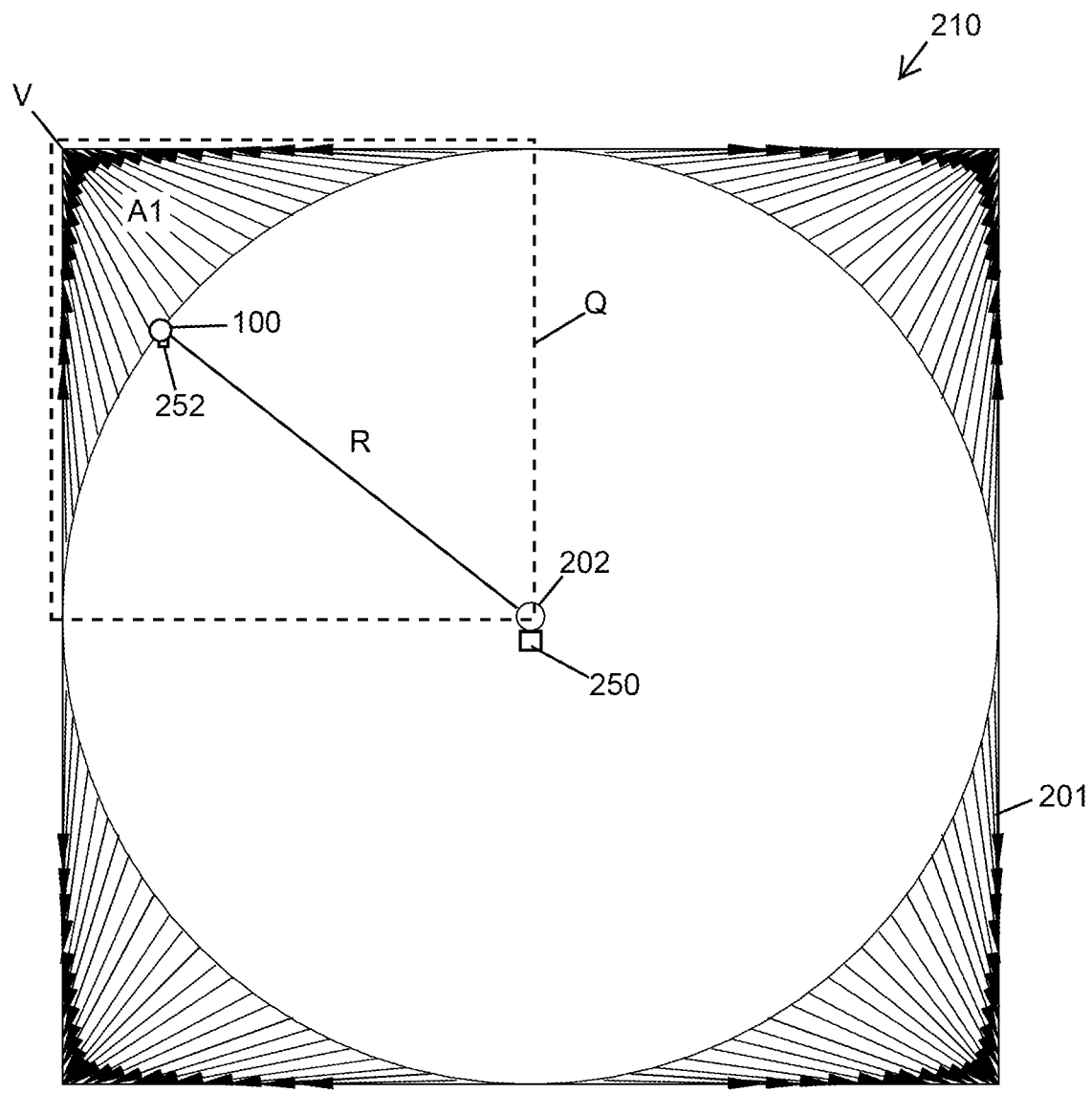
FIG. 15 is an illustration of a first corner watering pattern obtained by replacing the prior art impact sprinkler described in connection with the watering patterns of FIGS. 11-14 with the sprinkler of FIG. 1 set a maximum throw distance to reach the far corner of the irrigation plot.

FIG. 15 is an illustration of a first corner watering pattern 210 obtained by replacing the prior art impact sprinkler described in connection with the watering patterns of the traveling sprinkler system of FIGS. 11-14 with the sprinkler 100 of FIG. 1. For the first corner watering pattern 210, the sprinkler 100 was set to a maximum throw distance to reach the far corner A1-1 of the irrigation plot 201. A comparison between the watering patterns 200, 210 of FIGS. 11 and 15 shows the corning watering pattern 210 not only reaches the entire corner A1 but also evenly distributes water within the corner. Since the radial orientation and pitch angle of the sprinkler 100 can be continuously changed (e.g., by the yaw actuator 108 and the pitch actuator 110) unlike with the prior art impact sprinkler, the sprinkler 100 can be aimed at discrete locations within the irrigation area 201 to not only cover the entire irrigation area 201 but to also evenly distribute the water within the irrigation area 201.

Figure 16:
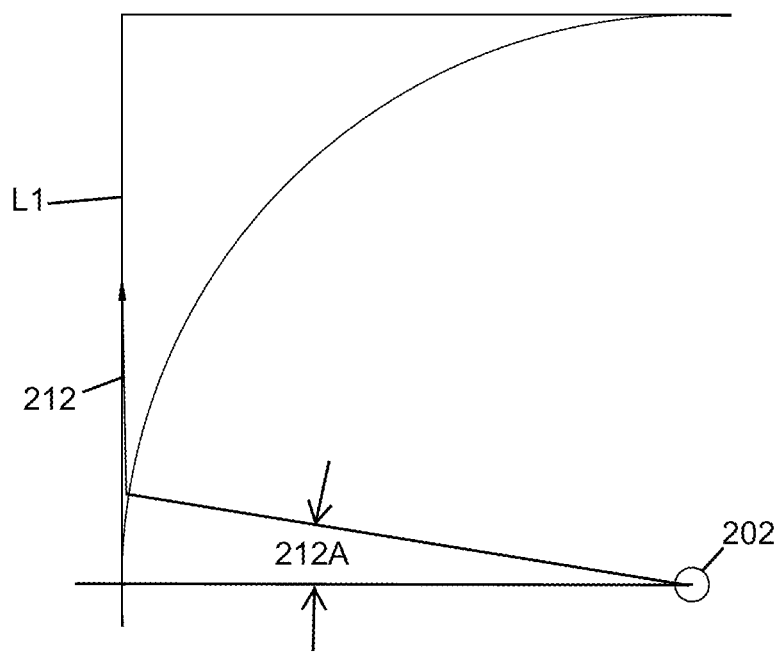
FIG. 16 is an illustration of a first position where the sprinkler of FIG. 1 can be turned on and aimed to begin following the corner watering pattern of FIG. 15.

FIG. 16 is an illustration of a first position corresponding to an angle 212A where the sprinkler 100 of FIG. 1 can be turned on and aimed so as to begin following the corner watering pattern 210 of FIG. 15. In certain embodiments, the angle 212A is 10 degrees. Of course, the angle need not be 10 degrees and can instead be any other angle. Because the sprinkler 100 can be initially aimed by the yaw actuator 108 to almost be parallel to the border L1 of the irrigation area 201, the pitch actuator 110 can increase the throw distance with the resulting distribution of the watering pattern 212 staying within the irrigation area 201. In certain embodiments, the yaw actuator 110 aims the sprinkler 100 at 92 degrees from a center line passing through the center pivot 202. Of course, the angle need not be 92 degrees and can instead be any other angle depending on, for example, the size and shape of the irrigation area 201.

Figure 17:
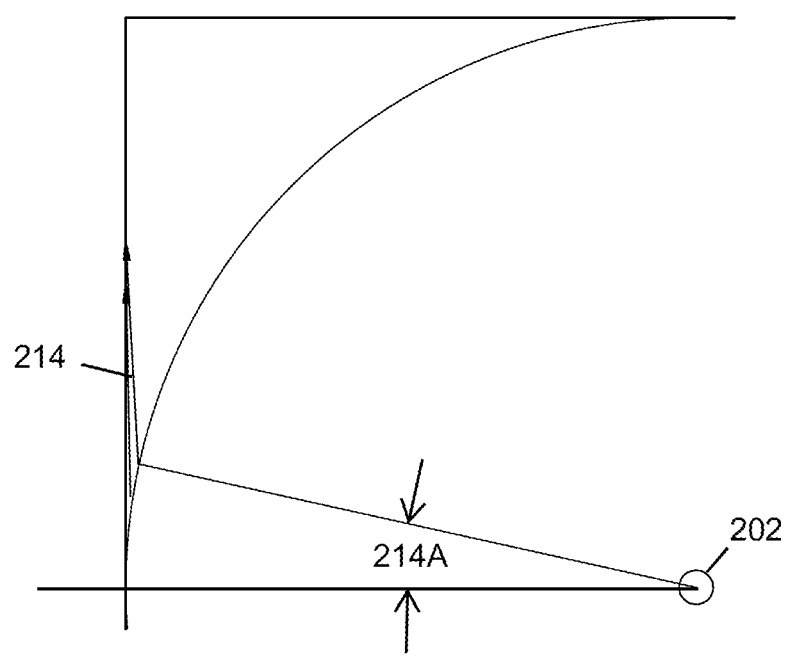
FIG. 17 is an illustration of a second position where the aim of the sprinkler of FIG. 1 has been adjusted to continue following the corner watering pattern of FIG. 15.

FIG. 17 is an illustration of a second position corresponding to an angle 214A where the aim of the sprinkler 100 of FIG. 1 has been adjusted to continue following the corner watering pattern 210 of FIG. 15. In certain embodiments, the angle 214A is 13 degrees. Of course, the angle need not be 13 degrees and can instead be any other angle. In FIG. 17, the yaw actuator 108 has further rotated the sprinkler 100 away from the center line passing through the center pivot 202 as compared to the position of the sprinkler 100 in FIG. 16. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. In certain embodiments, the sprinkler 100 can be turned off and on to improve coverage.

Figure 18:
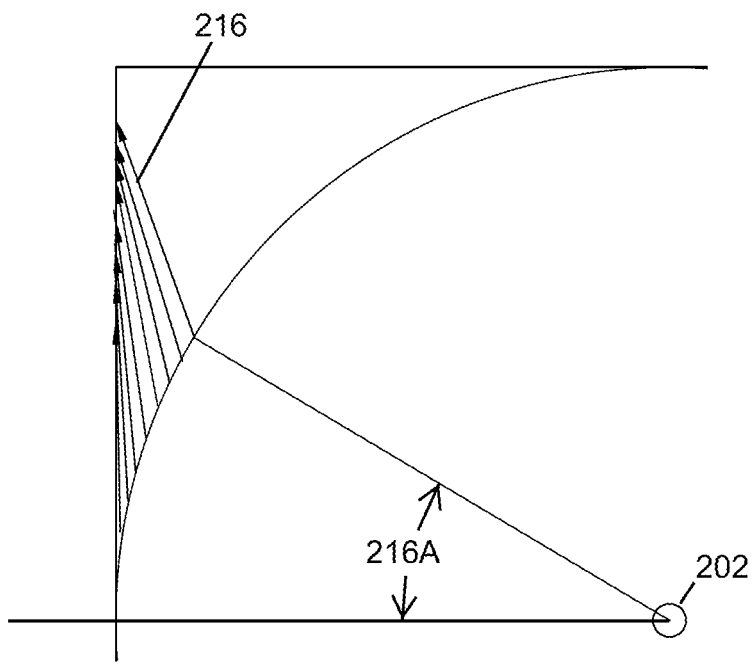
FIG. 18 is an illustration of a third position where the aim of the sprinkler of FIG. 1 has been further adjusted to continue following the corner watering pattern of FIG. 15.

FIG. 18 is an illustration of a third position corresponding to an angle 216A where the aim of the sprinkler 100 of FIG. 1 has been further adjusted to continue following the corner watering pattern 210 of FIG. 15. In certain embodiments, the angle 216A is 30 degrees. Of course, the angle need not be 30 degrees and can instead be any other angle. In FIG. 18, the yaw actuator 108 has further rotated the sprinkler 100 away from the center line passing through the center pivot 202 as compared to the position of the sprinkler 100 in FIG. 17. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. In certain embodiments, the sprinkler 100 can be turned off and on to improve coverage.

Figure 19:
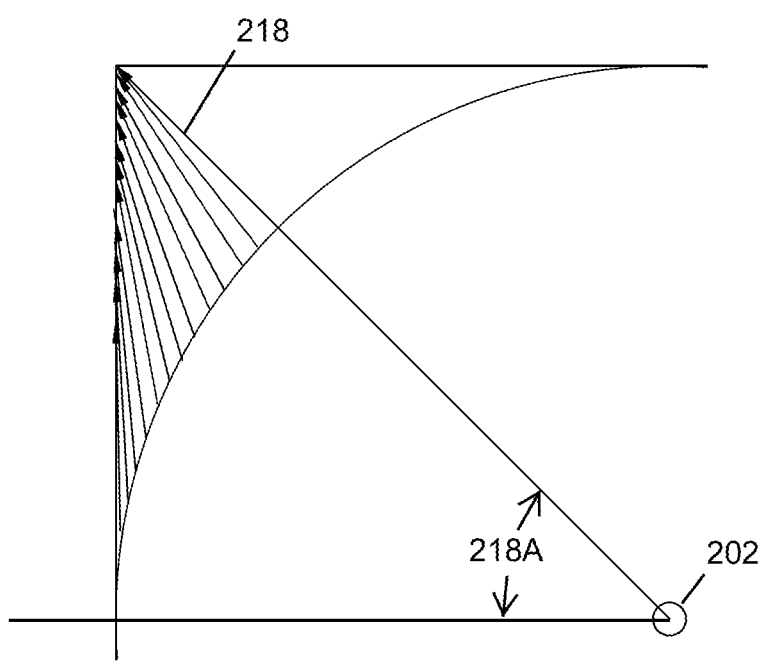
FIG. 19 is an illustration of a fourth position where the aim of the sprinkler of FIG. 1 has been further adjusted to continue following the corner watering pattern of FIG. 15.

FIG. 19 is an illustration of a fourth position corresponding to an angle 218A where the aim of the sprinkler 100 of FIG. 1 has been further adjusted to continue following the corner watering pattern 210 of FIG. 15. In certain embodiments, the angle 218A is 45 degrees. Of course, the angle need not be 45 degrees and can instead be any other angle. In FIG. 19, the yaw actuator 108 has further rotated the sprinkler 100 away from the center line passing through the center pivot 202 as compared to the position of the sprinkler 100 in FIG. 18. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. In certain embodiments, the sprinkler 100 can be turned off and on to improve coverage.

Figure 20:
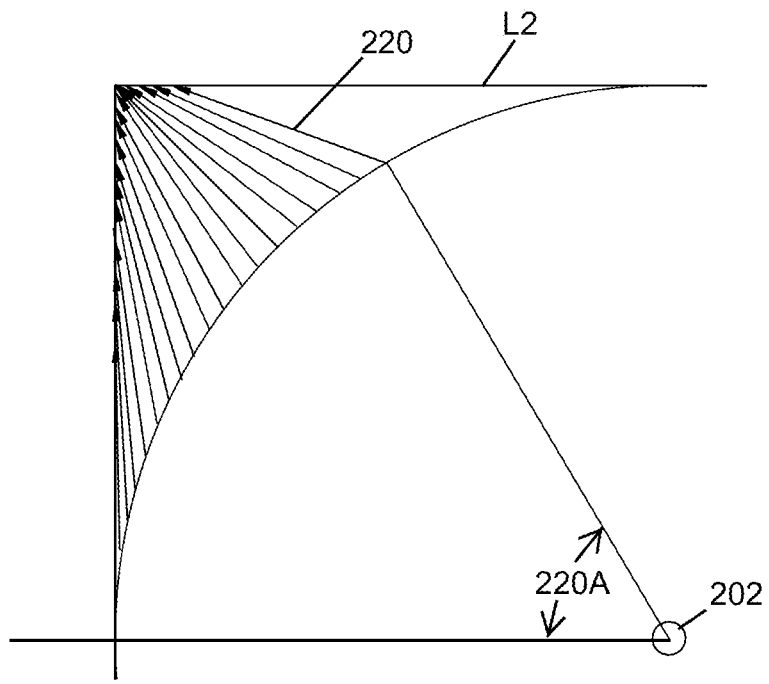
FIG. 20 is an illustration of a fifth position where the aim of the sprinkler of FIG. 1 has been further adjusted to continue following the corner watering pattern of FIG. 15.

FIG. 20 is an illustration of a fifth position corresponding to an angle 220A where the aim of the sprinkler of FIG. 1 has been further adjusted to continue following the corner watering pattern of FIG. 15. In certain embodiments, the angle 220A is 60 degrees. Of course, the angle need not be 60 degrees and can instead be any other angle. In FIG. 20, the yaw actuator 108 has further rotated the sprinkler 100 away from the center line passing through the center pivot 202 as compared to the position of the sprinkler 100 in FIG. 19. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. In certain embodiments, the sprinkler 100 can be turned off and on to improve coverage.

Figure 21:
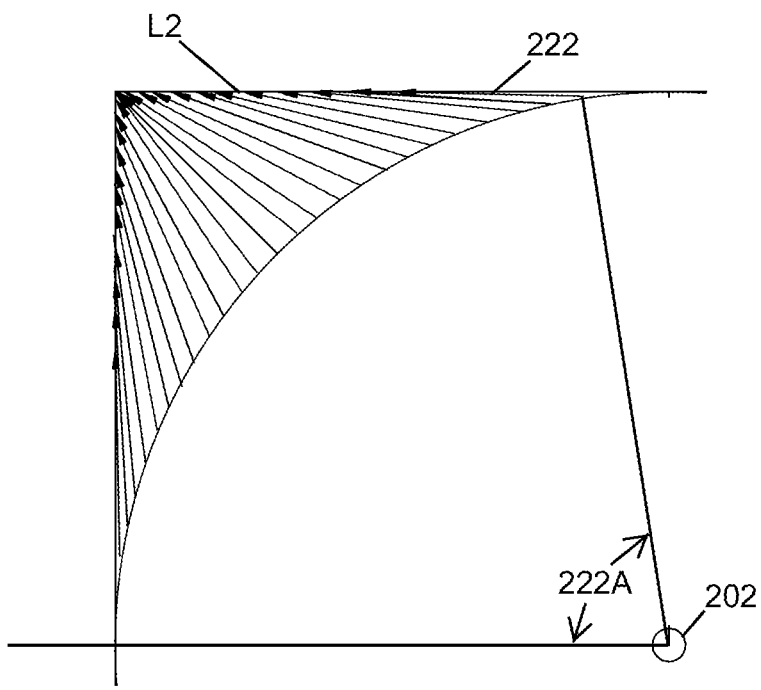
FIG. 21 is an illustration of a sixth position where the aim of the sprinkler of FIG. 1 has been further adjusted to continue following the corner watering pattern of FIG. 15.

FIG. 21 is an illustration of a sixth position corresponding to an angle 222A where the aim of the sprinkler of FIG. 1 has been further adjusted to continue following the corner watering pattern of FIG. 15. In certain embodiments, the angle 222A is 80 degrees. Of course, the angle need not be 80 degrees and can instead be any other angle. In FIG. 21, the yaw actuator 108 has further rotated the sprinkler 100 away from the center line passing through the center pivot 202 as compared to the position of the sprinkler 100 in FIG. 20. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. Because the sprinkler 100 can be initially aimed by the yaw actuator 108 to almost be parallel to the border L2 of the irrigation area 201, the pitch actuator 110 can increase the throw distance with the resulting distribution of the watering pattern 222 staying within the irrigation area 201. In certain embodiments, the sprinkler 100 can be turned off and on to improve coverage.

Figure 22:
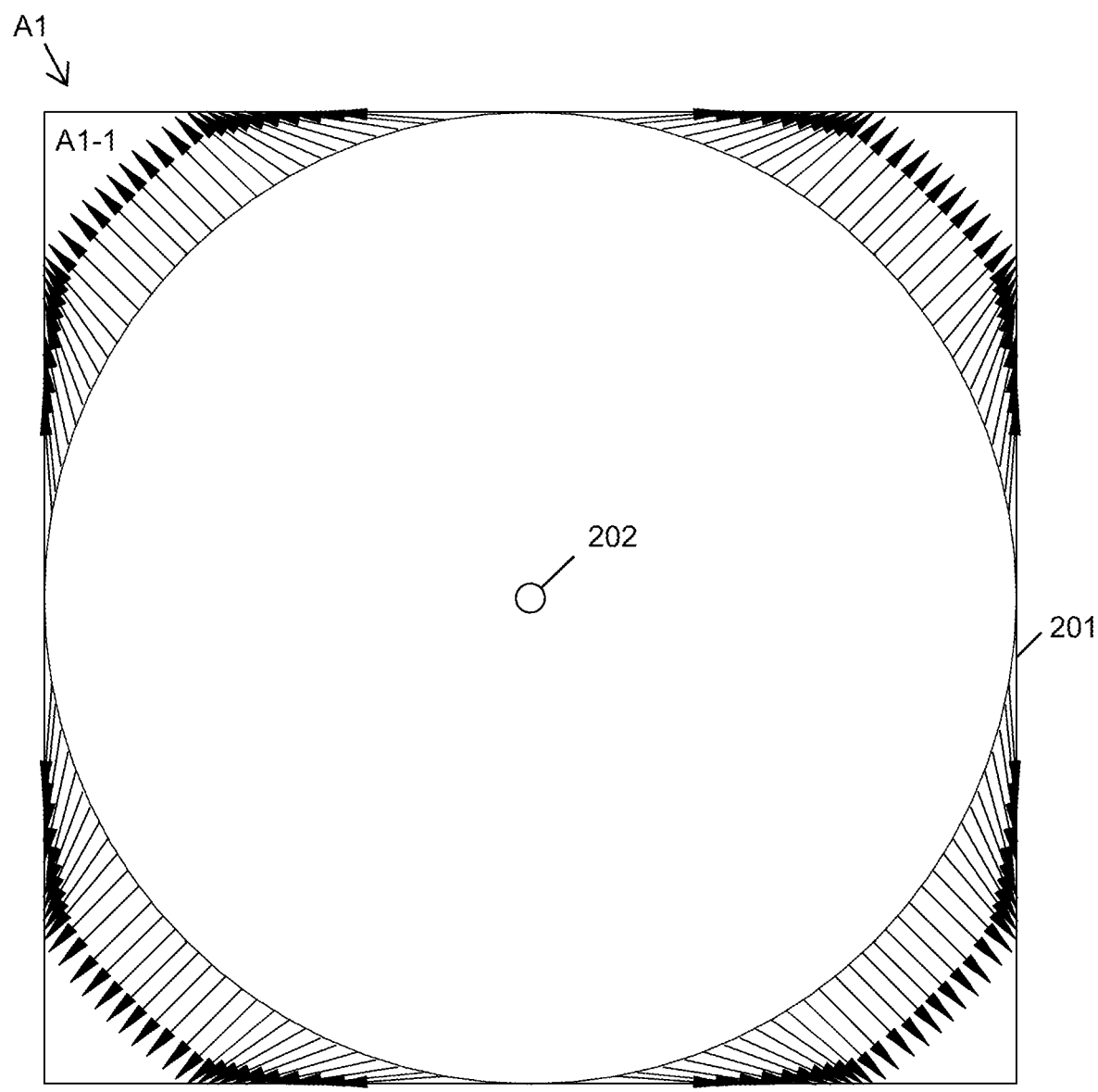
FIG. 22 is an illustration of a second corner watering pattern obtained by reducing the throw distance illustrated in FIGS. 15 to 21 so that the water does not reach the far corner of the irrigated plot.

FIG. 22 is an illustration of a second corner watering pattern 230 obtained by replacing the prior art impact sprinkler described in connection with the watering patterns of the traveling sprinkler system of FIGS. 11-14 with the sprinkler 100 of FIG. 1. For the second corner watering pattern 230, the sprinkler 100 was set to a shorter throw distance than the maximum throw distance of FIGS. 15-21. Even though the throw distance illustrated in FIG. 22 is about the same as the throw distance of the prior art impact sprinkler described in connection with the watering patterns of FIGS. 11-14, the sprinkler 100 still provides better coverage as well as a more even water distribution than the impact sprinkler. For example, while the watering pattern of FIG. 22 does not reach the far corner A1-1 of the irrigation area 201, the corner watering pattern 230 not only covers more of the corner A1 but also has a more even distribution of water within the covered areas of the corner than the watering patterns of FIGS. 11-14. Since the radial orientation and pitch angle of the sprinkler 100 can be continuously changed (e.g., yaw actuator 108 and pitch actuator 110) unlike with the prior art impact sprinkler, the sprinkler 100 can be aimed at discrete locations within the irrigation area 201 to not only cover more of the irrigation area 201 but to also evenly distribute the water within the covered areas in the irrigation area 201.

Figure 23:
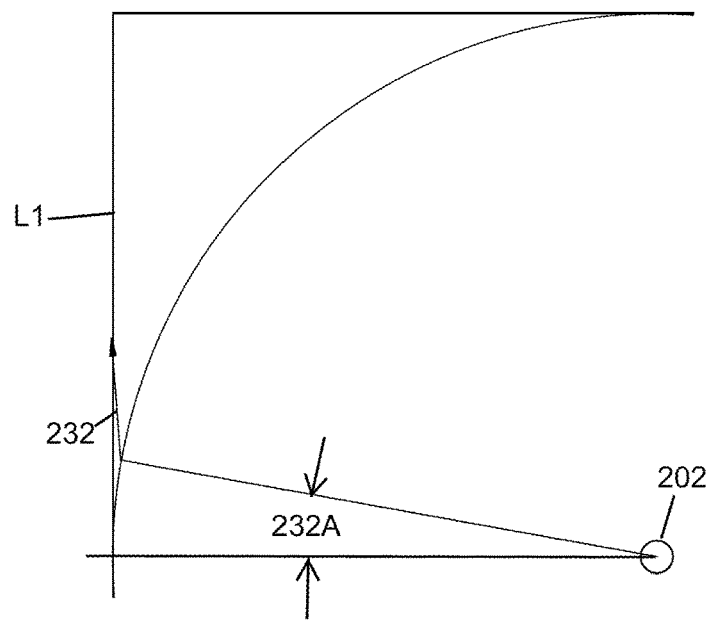
FIG. 23 is an illustration of a first position where the sprinkler of FIG. 1 can be turned on and aimed to begin following the corner watering pattern of FIG. 22.

FIG. 23 is an illustration of a first position corresponding to an angle 232A where the sprinkler 100 of FIG. 1 can be turned on and aimed so as to begin following the corner watering pattern 230 of FIG. 22. In certain embodiments, the angle 232A is 10 degrees. Of course, the angle need not be 10 degrees and can instead be any other angle. Because the sprinkler 100 can be initially aimed by the yaw actuator 108 to almost be parallel to the border L1 of the irrigation area 201, the sprinkler 100 can be turned on much earlier than the prior art impact sprinkler with the resulting distribution of the watering pattern 232 staying within the irrigation area 201.

Figure 24:
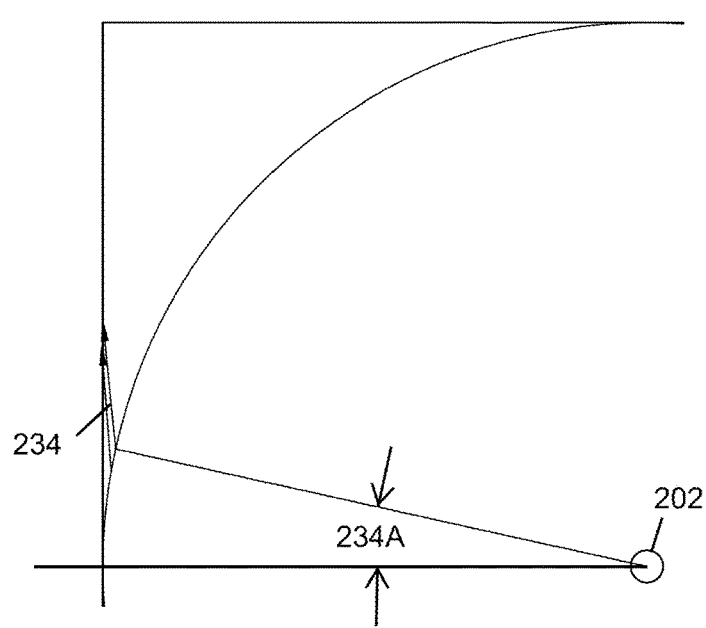
FIG. 24 is an illustration of a second position where the aim of the sprinkler of FIG. 1 has been adjusted to continue following the corner watering pattern of FIG. 22.

FIG. 24 is an illustration of a second position corresponding to an angle 234A where the aim of the sprinkler 100 of FIG. 1 has been adjusted to continue following the corner watering pattern 230 of FIG. 22. In certain embodiments, the angle 234A is 13 degrees. Of course, the angle need not be 13 degrees and can instead be any other angle. In FIG. 24, the yaw actuator 108 has further rotated the sprinkler 100 away from the center line passing through the center pivot 202 as compared to FIG. 23. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. In certain embodiments, the sprinkler 100 can be turned off and on to improve coverage.

Figure 25:
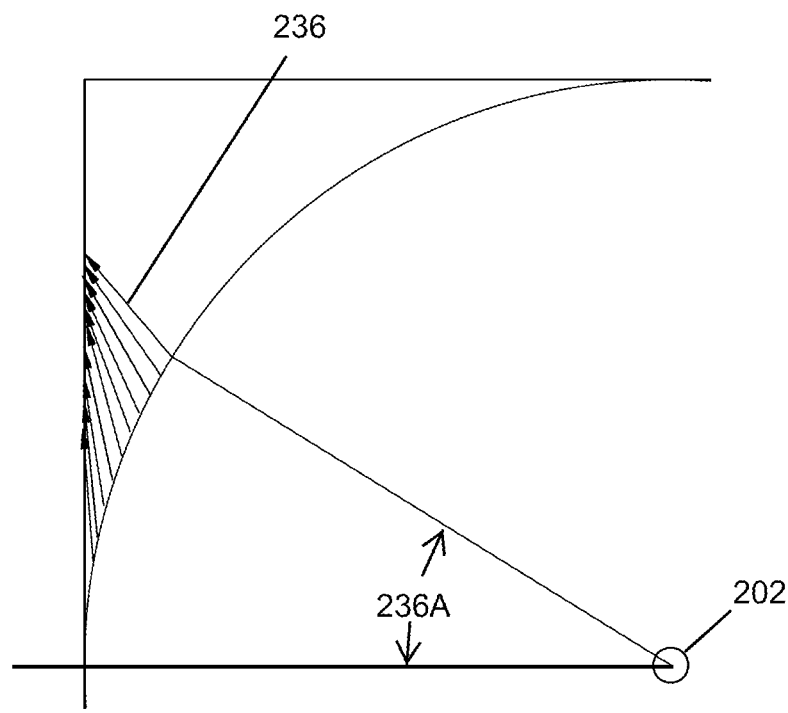
FIG. 25 is an illustration of a third position where the aim of the sprinkler of FIG. 1 has been further adjusted to continue following the corner watering pattern of FIG. 22.

FIG. 25 is an illustration of a third position corresponding to an angle 236A where the aim of the sprinkler 100 of FIG. 1 has been further adjusted to continue following the corner watering pattern 230 of FIG. 22. In certain embodiments, the angle 236A is 30 degrees. Of course, the angle need not be 30 degrees and can instead be any other angle. In FIG. 25, the yaw actuator 108 has further rotated the sprinkler 100 away from the center line passing through the center pivot 202 as compared to FIG. 24. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. In certain embodiments, the sprinkler 100 can be turned off and on to improve coverage.

Figure 26:
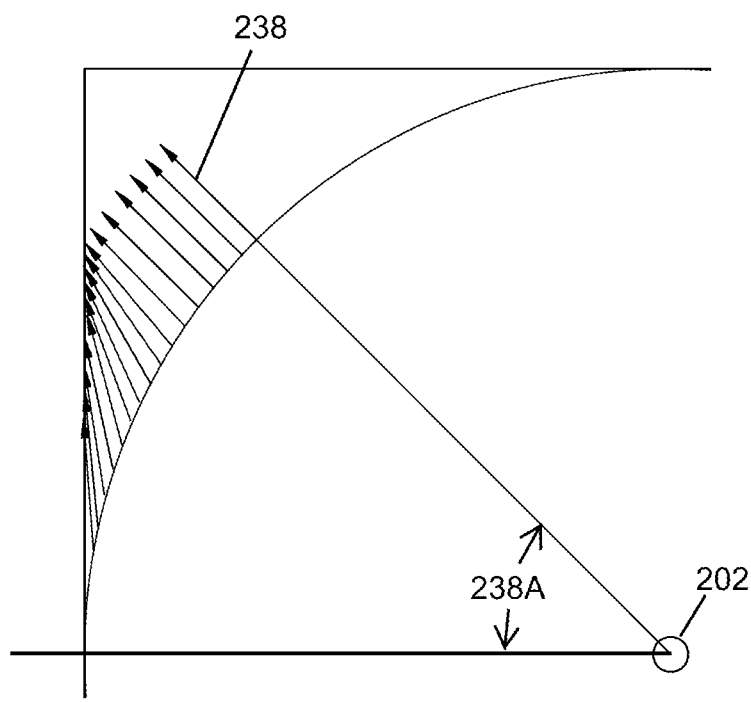
FIG. 26 is an illustration of a fourth position where the aim of the sprinkler of FIG. 1 has been further adjusted to continue following the corner watering pattern of FIG. 22.

FIG. 26 is an illustration of a fourth position corresponding to an angle 238A where the aim of the sprinkler 100 of FIG. 1 has been further adjusted to continue following the corner watering pattern 230 of FIG. 22. In certain embodiments, the angle 238A is 45 degrees. Of course, the angle need not be 45 degrees and can instead be any other angle. In FIG. 26, the yaw actuator 108 has further rotated the sprinkler 100 away from the center line passing through the center pivot 202 as compared to FIG. 25. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. In the illustrated embodiment, the throw distance does not reach the very tip of the corner but still provides improved coverage and water distribution as compared to the prior art impact sprinkler with a similar throw distance. In certain embodiments, the sprinkler 100 can be turned off and on to improve coverage.

Figure 27:
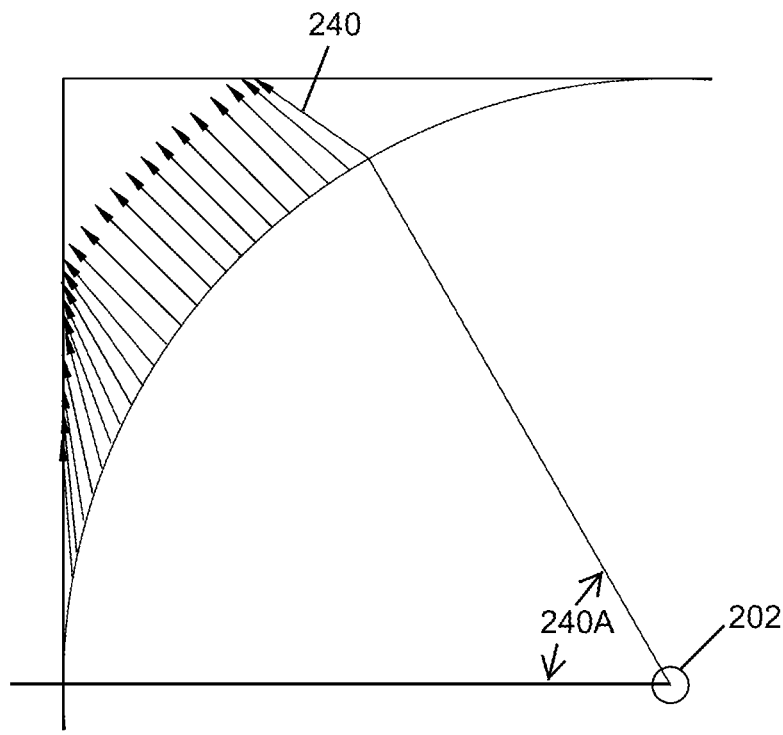
FIG. 27 is an illustration of a fifth position where the aim of the sprinkler of FIG. 1 has been further adjusted to continue following the corner watering pattern of FIG. 22.

FIG. 27 is an illustration of a fifth position corresponding to an angle 240A where the aim of the sprinkler 100 of FIG. 1 has been further adjusted to continue following the corner watering pattern of FIG. 22. In certain embodiments, the angle 240A is 60 degrees. Of course, the angle need not be 60 degrees and can instead be any other angle. In FIG. 27, the yaw actuator 108 has further rotated the sprinkler 100 away from the center line passing through the center pivot 202 as compared to FIG. 26. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. In the illustrated embodiment, the throw distance does reach the side of the corner as compared to FIG. 26. In certain embodiments, the sprinkler 100 can be turned off and on to improve coverage.

Figure 28:
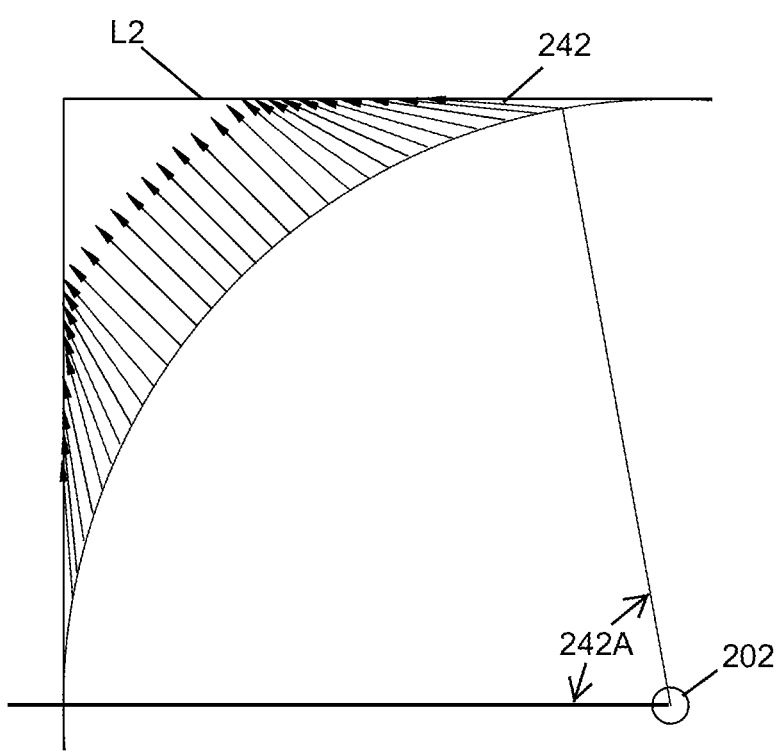
FIG. 28 is an illustration of a sixth position where the aim of the sprinkler of FIG. 1 has been further adjusted to continue following the corner watering pattern of FIG. 22.

FIG. 28 is an illustration of a sixth position corresponding to an angle 242A where the aim of the sprinkler 100 of FIG. 1 has been further adjusted to continue following the corner watering pattern of FIG. 22. In certain embodiments, the angle 242A is 80 degrees. Of course, the angle need not be 80 degrees and can instead be any other angle. In FIG. 28, the yaw actuator 108 has further rotated the sprinkler 100 away from the center line passing through the center pivot 202 as compared to FIG. 27. For example, in certain embodiments, as the sprinkler 100 moves along the outer circumference of the end of the traveling sprinkler system, the yaw actuator 108 slowly rotates the sprinkler 100 in a counterclockwise direction. Simultaneously, in certain embodiments, the pitch actuator 110 can change the pitch of the nozzle assembly 140 to provide coverage close to and far away from the sprinkler 100. Because the sprinkler 100 can be initially aimed by the yaw actuator 108 to almost be parallel to the border L2 of the irrigation area 201, the pitch actuator 110 can increase the throw distance with the resulting distribution of the watering pattern 242 staying within the irrigation area 201. In certain embodiments, the sprinkler 100 can be turned off and on to improve coverage.

In some embodiments, a valve can be positioned upstream of the sprinkler 100. In some embodiments a valve is directly coupled to the inlet of the sprinkler 100. In some cases, the valve is an on off valve for selectively supplying pressurized water to the sprinkler 100. In some cases, the valve can be a ball valve. In some embodiments, the valve can be tube valve similar to the valve disclosed in U.S. Pat. No. 7,665,713.

Adjusting the Aimable Sprinkler

Figure 29:
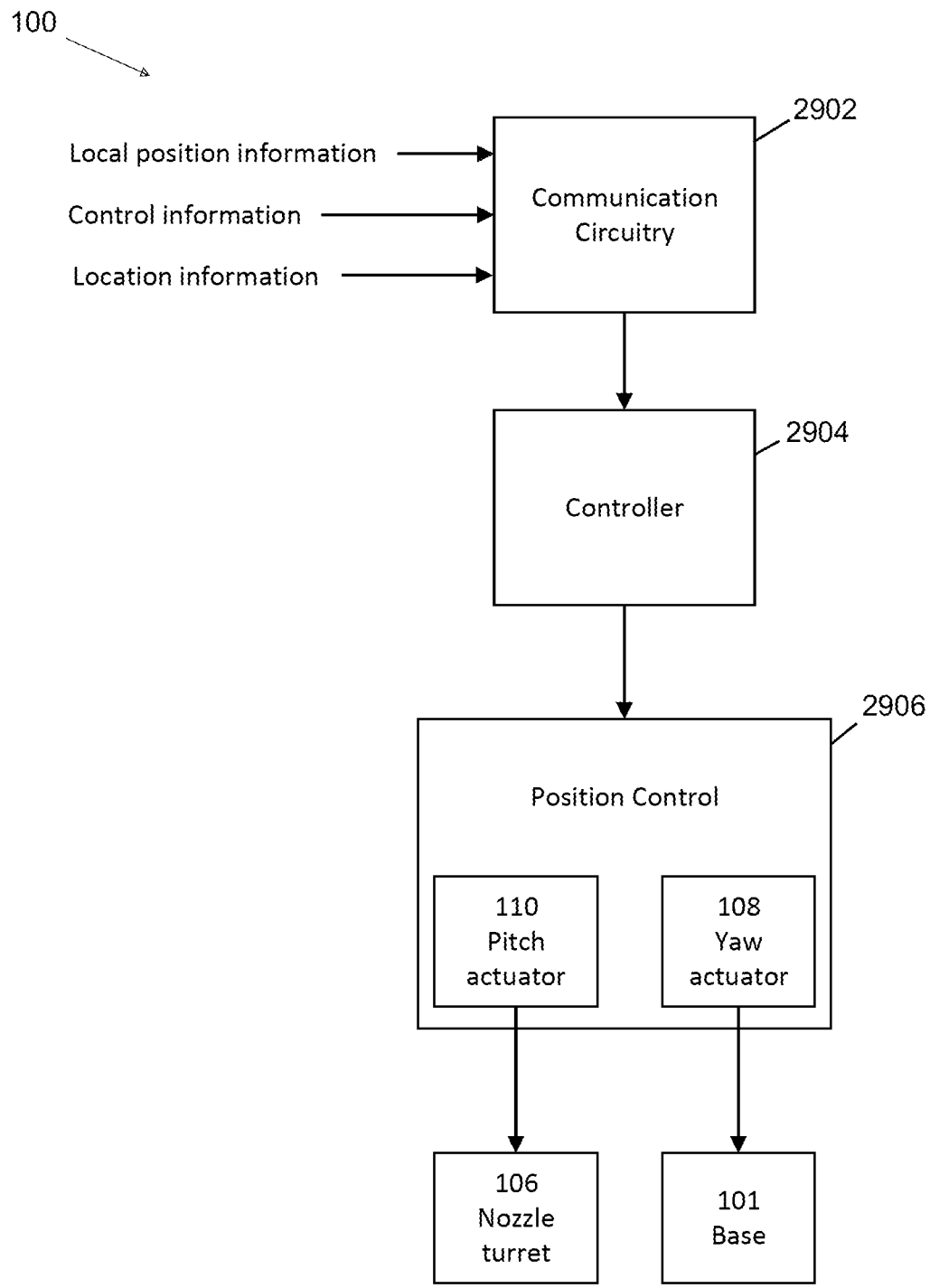
FIG. 29 is a block diagram of the aimable sprinkler of FIG. 1, according to an embodiment.

FIG. 29 is a block diagram of an aspect of the aimable sprinkler 100 of FIG. 1. As illustrated in FIG. 29, the aimable sprinkler 100 comprises communication circuitry 2902, one or more controllers 2904, position control 2906, the nozzle or turret 106, and the base 101.

The communication circuitry 2902 receives at least one of local position information, control information, and location information. The local position information is information or data that can be used to determine the position of the aimable sprinkler 100 within the irrigation area 201. In one aspect, the local position information can be used to determine the position of the aimable sprinkler with respect to the corners of the irrigation area 201. In another aspect, the local position information can be used to determine the position of the aimable sprinkler with respect to the border or perimeter of the irrigation area 201. Devices and/or circuitry that can provide the local position information are RFID readers and tags, other types of transponders, and associated circuitry, for example.

The location information is information or data that can be used to determine the position of the irrigation area 201 and the position of the aimable sprinkler 100 within the irrigation area 201. For example, the aimable sprinkler 100 can comprise devices and circuits to receive GPS information. In one aspect, the location information can be used to determine the position of the aimable sprinkler with respect to the corners of the irrigation area 201. In another aspect, the location information can be used to determine the position of the aimable sprinkler with respect to the border or perimeter of the irrigation area 201.

The control information can be information generated by a user to control the aimable sprinkler 100. The control information can be received over the Internet, an intranet. or other communication network, from a computer, smart mobile device, or a handheld device, associated with the user. For example, the user, locally or remotely, can control the timing, positioning, throw distance of the water from the aimable sprinkler 100, ON/OFF, water trajectory, or other attributes of the aimable sprinkler 100 to provide watering of an irrigation area. The communication circuitry 2902 can comprise devices and circuitry to receive the local position information, the control information, and the control information over the one or more of the Internet, an intranet, or other communication network. Examples of communication protocols that can be used by the communication circuitry are a powerline communication protocol, an RS485/RS422 communication protocol, and the like. The communication circuitry 2902 further communicates the local position information, location information, and control information to the one or more controllers 2904.

The one or more controllers 2904, such as a center pivot controller, receive the local position information, the location information, and the control information from the communication circuitry 2902, generate commands to control one or more of the pitch actuator 110, the yaw actuator 108, and the throw, and transmit the commands to the position control 2906.

The position control 2906 comprises the pitch actuator 110, the yaw actuator 108, and associated circuitry. The position control 2906 receives the commands from the one or more controllers 2904, controls the pitch actuator 110 to adjust the nozzle or turret 106, and controls the yaw actuator 108 to adjust the base 101 to water the irrigation area 201 according to a watering pattern. Examples of watering patterns are an "aim towards corner" watering pattern and an "aim to perimeter border" watering pattern. The pitch actuator 110 and the yaw actuator 108 can comprise stepper motors, for example, and the position control 2906 can comprise devices and circuitry for angular or linear control of the actuators.

Aim Towards Corner

In some embodiments, the user can identify a position of the center point 202 about which a traveling center pivot irrigation system rotates. The user can also identify one or more corners (e.g., A1, A2, A3, A4) of the irrigation area 201 to be irrigated by the aimable sprinkler 100. In some cases the center point 202 and the one or more corners A1, A2, A3, and A4 can be identified using GPS coordinates. In some cases the center position 202 and a first corner position A1 can be used along with a known length or radius R of the moving irrigation system to define a quadrant Q where the aimable sprinkler is in a position to be aimed towards the first corner position. For example, a quadrant of a square irrigation area 201 may be formed by one-half of side L1 and one-half of side and the length R of the moving irrigation system forming the other two sides. In this example, R may be one-half the size of L1.

In an embodiment, a position sensor 250 at the center position 202, as shown in FIG. 15, can measure the angle of the moving irrigation system relative to a first corner A1 position. Then the controller 2904 can determine one or more of a desired yaw angle and pitch angle to distribute water evenly throughout the first corner A1. The radial aiming portion 107 of the aimable sprinkler 100 can adjust the yaw angle to point towards a vertex V of the first corner A1. The horizontal aiming portion 109 of the aimable sprinkler 100 can adjust the pitch angle to provide proper water coverage from the end 203 of the traveling irrigation system to the vertex V of the first corner A1, or as close to the vertex V as possible considering the pressure and flow limitations of the sprinkler system. The yaw angle of the aimable sprinkler 100 relative to the traveling irrigation system can be constantly changed, or periodically changed, as the irrigation system rotates around the center point 202 to keep the aimable sprinkler pointed towards the vertex V of the first corner A1 position. This can continue while the amiable sprinkler is in the quadrant defined by the first corner position. The process can be repeated for any additional corners of the property (e.g., A2, A3, A4).

In some embodiments, a GPS sensor 252 mounted near the aimable sprinkler 100 can monitor the position of the sprinkler 100 relative to the center position 202 and the vertex V of the first corner A1 position. In this case, the information from position sensor 250 at the center pivot 202 of the traveling irrigation system may not be necessary. With the GPS sensor 252 positioned near the aimable sprinkler, the controller 2904 can calculate the angle from the center pivot to the corner position and determine the desired yaw angle to set the aimable sprinkler 100. In the case where a GPS sensor is used, the controller 2904 for the aimable sprinkler 100 may not need to obtain radial position information from the control system of the moving center pivot system.

Figure 30:
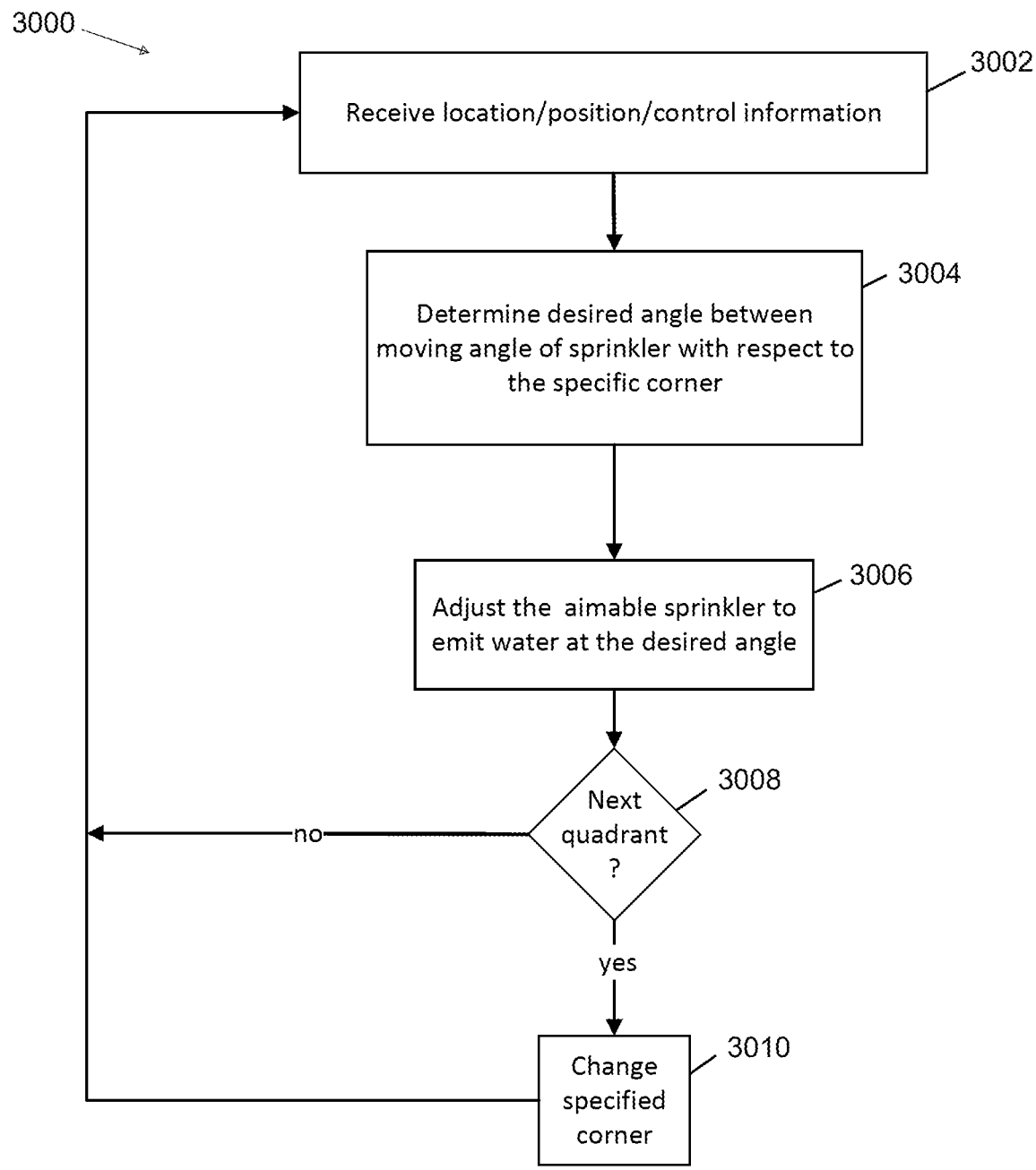
FIG. 30 is a flow chart illustrating process to implement a watering pattern using an aim to corner approach, according to an embodiment.

FIG. 30 is a flow chart illustrating process 3000 to implement a watering pattern using an aim towards corner approach, according to an embodiment. At block 3002, the aimable sprinkler 100 receives one or more of a local position information (such as data provided by position sensor 250), a location information (such as data provided by GPS sensor 252), or control information (such as data calculated based on user input, data provided by position sensor 250, and/or data provided by GPS sensor 252). The aimable sprinkler 100 can determine geometry (such as borders L1, L2, L3, and L4 and vertices V) forming each corner (A1, A2, A3, and A4) of each quadrant of the irrigation area 201 based at least in part on the local position information and/or the location information.

For a specific corner (such as A1) of the irrigation area 201, at block 3004, the process 3000 monitors the angular position of the aimable sprinkler 100 (at an end of the moving irrigation system) to the specific corner position of the irrigation area 201. In an aspect, the aimable sprinkler 100 monitors this angle. In another aspect, a sensor 250 at the center pivot 202 monitors this angle and sends the monitored angle information to the aimable sprinkler 100. The aimable sprinkler 100 then determines a desired angle between the angle of the moving irrigation system and the specific corner of the irrigation area 201. The desired angle is the angle that points the aimable sprinkler towards a vertex V of the specific corner.

At block 3006, the aimable sprinkler 100 adjusts the nozzle 106 and base 101 to emit water at the desired angle. In an aspect, the aimable sprinkler 100 adjusts the pitch actuator 110 and the yaw actuator 108 to adjust the pitch angle and yaw angle of the aimable sprinkler 100, respectively.

At decision block 3008, the aimable sprinkler 100 determines whether it has traveled beyond the specific corner of the selected quadrant of the irrigation area 201. In an aspect, the aimable sprinkler 100 determines whether the traveling sprinkler system rotating about the center pivot tower 202 has rotated the aimable sprinkler 100 past the selected quadrant of the irrigation area 201. If not, then the process 3000 moves to block 3002 to receive the location/position/control information for its current location. By continuously or periodically adjusting the desired pitch angle and yaw angle, the aimable sprinkler 100 aims the water toward the vertex V of the corner and provides uniform watering of the corner area.

If the aimable sprinkler 100 has moved past the selected quadrant, the process 3000 moves to block 3010 to change the specified corner to the corner of the next quadrant of the irrigation area 201 to be irrigated. From block 3010, the process 3000 moves to block 3002 to receive the location/position/control information for its current location.

Figure 31:
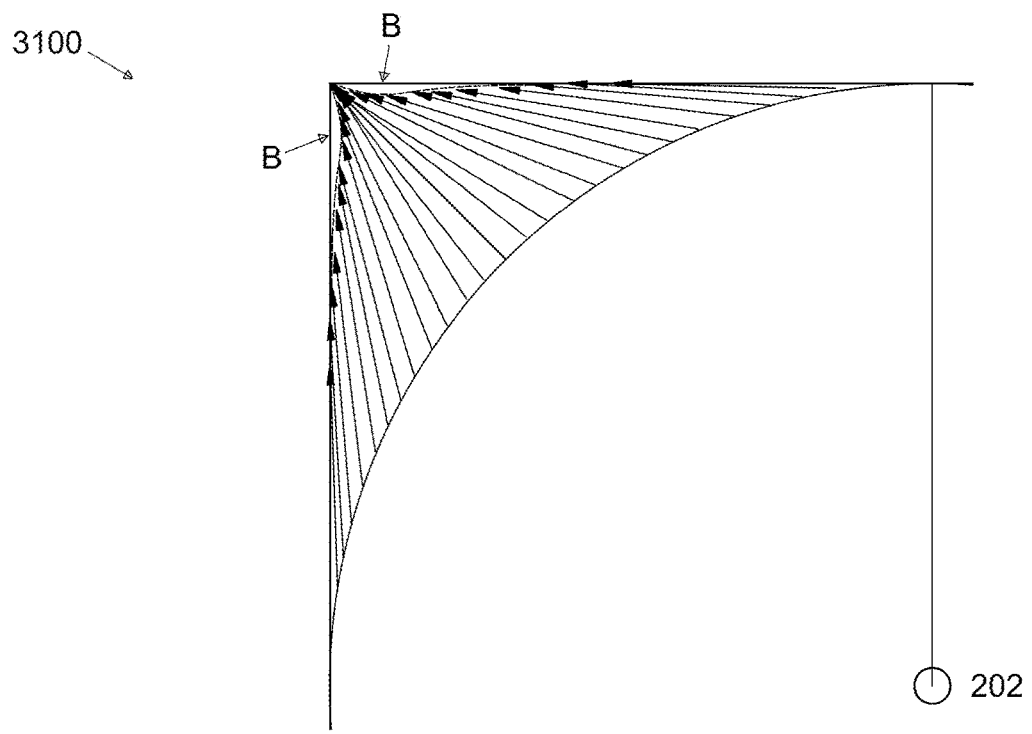
FIG. 31 is an illustration of an exemplary watering pattern obtained by the process of FIG. 30 when the water from the aimable sprinkler can reach to the corner.

FIG. 31 is an illustration of an exemplary watering pattern 3100 obtained by the process 3000 of FIG. 30 when the water from the aimable sprinkler 100 can reach to the corner. As illustrated in FIG. 31, aiming to the corner mostly fills the corner of the selected quadrant with a slight reduction of the coverage areas B near the far corner A1-1.

Figure 32:
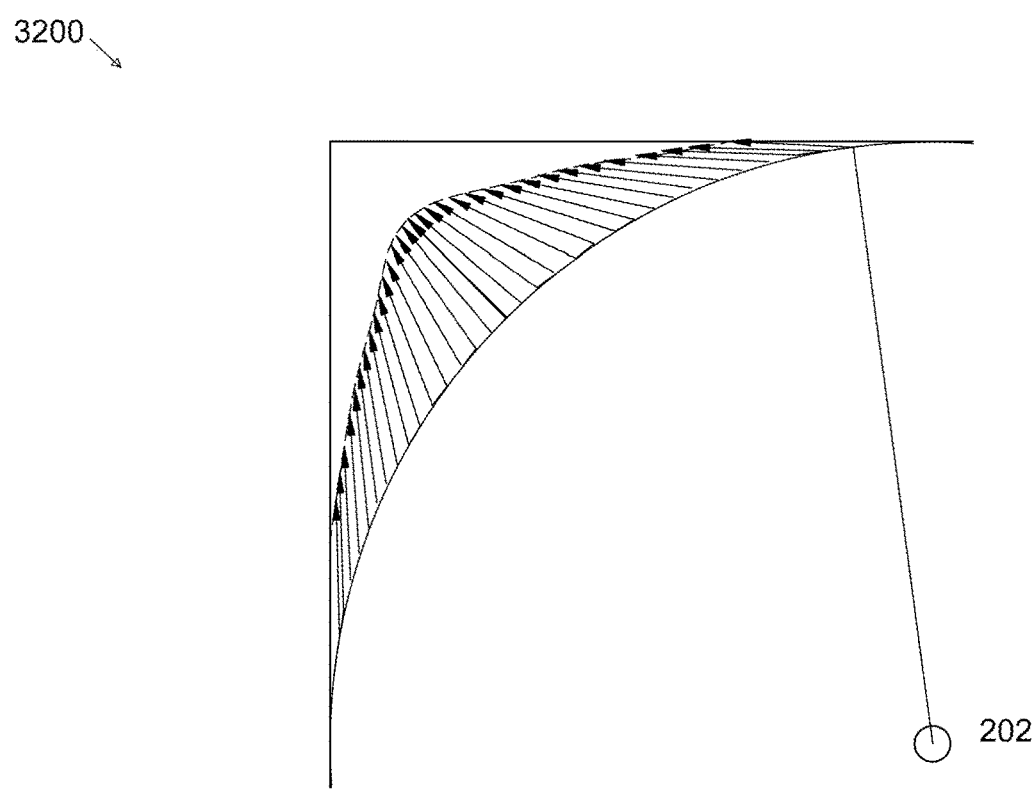
FIG. 32 is an illustration of another exemplary watering pattern obtained by the process of FIG. 30 when the water from the aimable sprinkler cannot reach to the corner.

FIG. 32 is an illustration of another exemplary watering pattern 3200 obtained by the process 3000 of FIG. 30 when the water from the aimable sprinkler 100 cannot reach to the corner. As illustrated in FIG. 31, aiming to the vertex V of the corner A1 when the water from the aimable sprinkler 100 cannot reach the vertex V produces a reduced irrigation pattern when compared to the irrigation pattern of FIG. 31 and produces a larger and more uniform irrigation pattern when compared to the irrigation pattern of FIG. 11.

Aim to Perimeter Border

In some embodiments, the user can identify a position of the center point 202 about which a traveling center pivot irrigation system rotates. The user can also identify one or more features of the corners (such as borders L1-L4 and/or vertices V) of the irrigation area 201. In some cases the center point 202 and the one or more features of the corners can be identified as GPS coordinates. In some cases the center position 202 and a first vertex V of a corner position can be used along with a known length R of the moving irrigation system to define a quadrant Q where the aimable sprinkler 100 is in a position to be aimed to irrigate a portion of that quadrant Q. In some embodiments, the user can enter four corners of the property to define four quadrants. In some embodiments, the aimable sprinkler controller 2904 can use this information to determine the border of an irrigation area 201 such as that formed by borders L1-L4. As shown in FIGS. 15-28, the aimable sprinkler controller 2904 can utilize this data along with flow characteristics (pressure, flow rate, nozzle size) of the amiable sprinkler 100 to determine an intersection between maximum throw of the water from the aimable sprinkler 100 to the calculated borders L1-L of the irrigation area 201. In this scenario the aimable sprinkler 100 is constantly, or intermittently aimed to the theoretical intersection of the water sprayed from the aimable sprinkler 100 to where it intersects with the calculated location of the border of the irrigation area 201.

In an embodiment, a position sensor 250 at the center position 202, as shown in FIG. 15, can measure the relative angle of the moving irrigation system relative to a first corner A1 position. Then the controller 2904 can determine one or more of a desired yaw angle and pitch angle to direct the water emitting from the aimable sprinkler 100 to a point on the border L1 of the irrigated area. In some embodiments, the point on the border L1 is calculated using 1) calculated border information, 2) the position of the aimable sprinkler 100 based on the angle at the center position 202 and the distance R the aimable sprinkler 100 is mounted away from the center position 202, and 3) the distance of throw of the water emitting from the aimable sprinkler to determine the theoretical point where the end of the furthermost distance of the throw of the water will intersect the border. This point on the border can be a different point on the border when the aimable sprinkler 100 moves to a different position and can continue to change as the aimable sprinkler 100 moves. The aimable sprinkler 100 can be adjusted to an angle that will point towards the border. The horizontal aiming portion 109 of the aimable sprinkler 100 can adjust the pitch angle to provide proper water coverage from the end 203 of the traveling irrigation system to the border L1, or as close to the border as possible considering the pressure and flow limitations of the sprinkler system. The yaw angle of the aimable sprinkler 100 relative to the traveling irrigation system can be constantly changed, or periodically changed, as the irrigation system rotates around the center point 202 to keep the aimable sprinkler pointed towards the border L1. This can continue while the amiable sprinkler is in the quadrant defined by the first corner position. The process can be repeated for any additional corners of the property (e.g., A2, A3, A4).

In some embodiments, a GPS sensor 252 mounted near the aimable sprinkler 100 can monitor the position of the sprinkler 100 relative to the center position 202 and the vertex V of the first corner A1 position. In this case, the information from a position sensor 250 at the center pivot 202 of the traveling irrigation system may not be necessary. With the GPS sensor 250 positioned near the aimable sprinkler, the controller 2904 can calculate the angle from the center pivot to the border and determine the desired yaw angle to set the aimable sprinkler 100 based on the distance of the throw of the water from the aimable sprinkler 100 to where the furthermost distance of the throw of the water will intersect the calculated border. In the case where a GPS sensor is used, the controller 2904 for the aimable sprinkler 100 may not need to obtain radial position information from the control system of the moving center pivot system.

Figure 33:
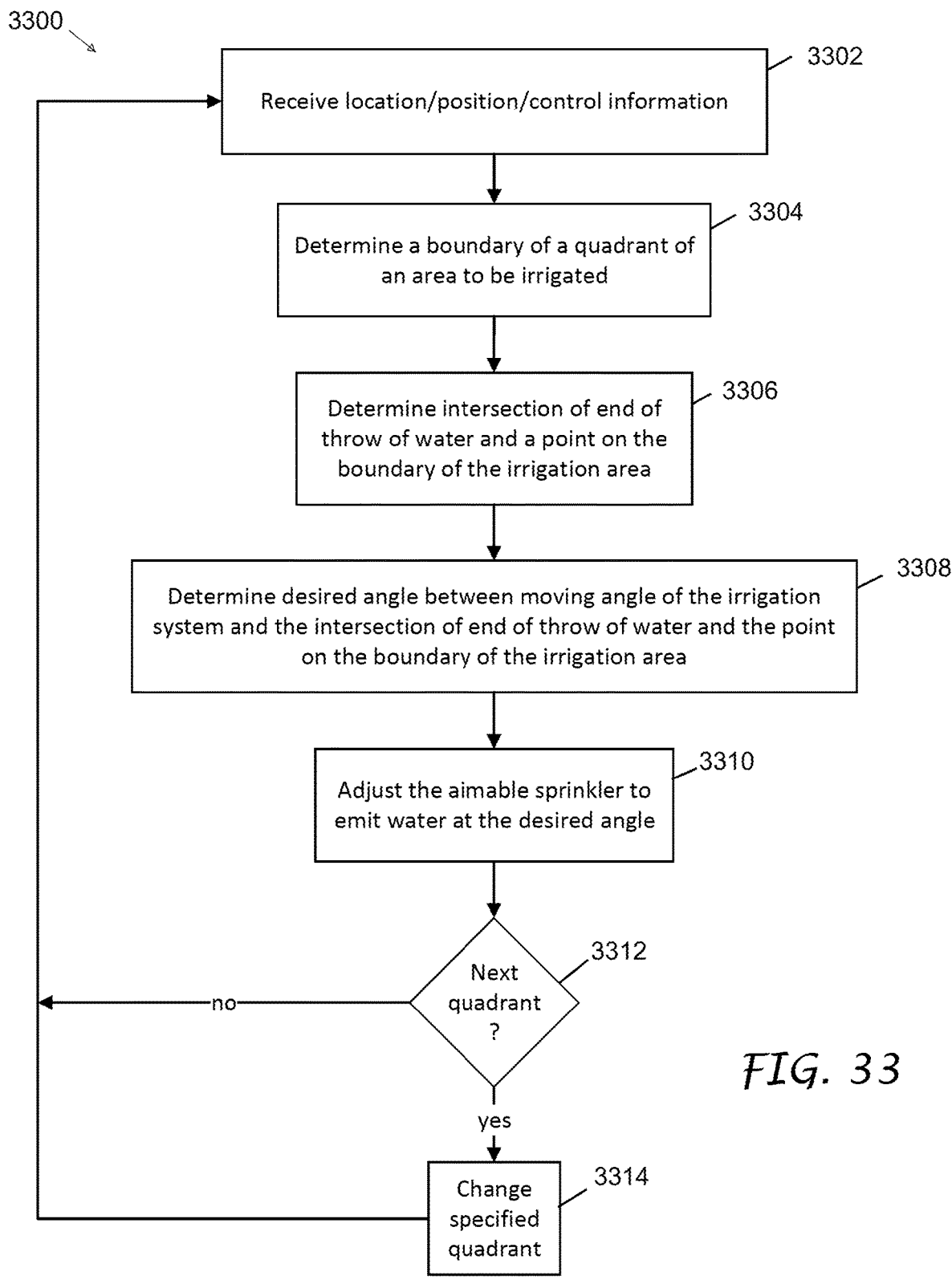
FIG. 33 is a flow chart illustrating a process to implement a watering pattern using an aim to border approach, according to an embodiment.

FIG. 33 is a flow chart illustrating a process 3300 to implement a watering pattern using an aim towards border approach, according to an embodiment. At block 3302, the aimable sprinkler 100 receives one or more of local position information (such as data provided by the position sensor 250), location information (such as data provided via GPS sensor 252), or control information (such as data calculated based on user input, data provided by position sensor 250, and/or data provided by GPS sensor 252). At block 3304, the aimable sprinkler 100 determines a border of the quadrant of an irrigation area 201, based at least in part on the local position information and/or the location information.

For a specific quadrant (such as Q) of the irrigation area 201, at block 3306, the aimable sprinkler 100 determines, based at least in part on the determined border and the flow characteristics of the aimable sprinkler 100, an intersection between the end of the throw of the water from the aimable sprinkler 100 to the border of the specific quadrant of the irrigation area 201. The process 3300 monitors the angle between the aimable sprinkler 100 (at an end 203 of the moving irrigation system) to the corner position of the irrigation area 201 associated with the specific quadrant. In an aspect, the aimable sprinkler 100 monitors this changing angle. In another aspect, a sensor 250 at the center pivot 202 monitors this angle and sends the monitored angle information to the aimable sprinkler 100.

At block 3308, the aimable sprinkler 100 determines a desired angle between the angle of the moving irrigation system and the intersection of the end of the throw of water and the point on the border of the specific quadrant of the irrigation area 201. The desired angle is the angle that points the aimable sprinkler towards the intersection of the water sprayed from the aimable sprinkler 100 to the point on the border or perimeter of the irrigation area 201. In an aspect, the point of the border is within the selected quadrant to be irrigated.

At block 3310, the aimable sprinkler 100 adjusts the nozzle 106 and base 101 to emit water at the desired angle. In an aspect, the aimable sprinkler 100 adjusts, continuous or periodically, the pitch actuator 110 and the yaw actuator 108 to adjust the pitch angle and yaw angle of the aimable sprinkler 100, respectively, to emit water at the desired angle.

At decision block 3312, the aimable sprinkler 100 determines whether it has traveled beyond the selected quadrant of the irrigation area 201. In an aspect, the aimable sprinkler 100 determines whether the traveling sprinkler system rotating about the center pivot tower 202 has rotated the aimable sprinkler 100 past the selected quadrant of the irrigation area 201. If not, then the process 3300 moves to block 3302 to receive the location/position/control information for its current location. If the aimable sprinkler 100 has moved past the selected quadrant, the process 3300 moves to block 3314 to change the specified quadrant to the next quadrant of the irrigation area 201 to be irrigated. From block 3314, the process 3300 moves to block 3302 to receive the location/position/control information for its current location.

Figure 34:
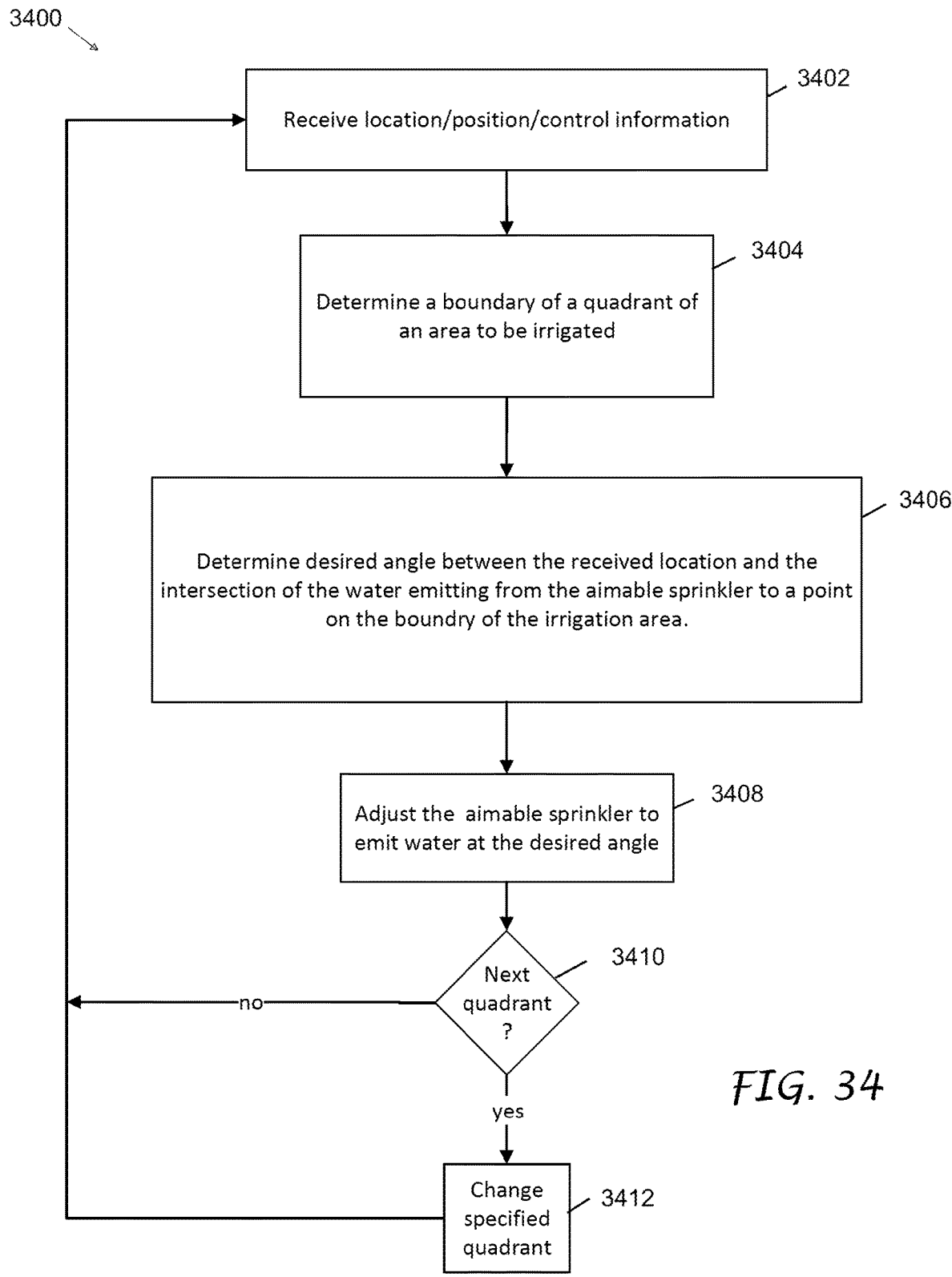
FIG. 34 is a flow chart illustrating another process to implement a watering pattern using an aim to border approach, according to an embodiment.

FIG. 34 is a flow chart illustrating another process 3400 to implement a watering pattern using an aim towards border approach, according to an embodiment. At block 3402, the aimable sprinkler 100 receives one or more of the local position information, the location information, or the control information as in process 3300. At block 3404, the aimable sprinkler 100 determines a border of the quadrant of an irrigation area 201, based at least in part on the local position information and/or the location information. In an aspect, the aimable sprinkler 100 determines its location with respect to the border of the irrigation area 201, based at least in part on the received location information and/or the received local position information.

At block 3406, the aimable sprinkler 100 determines a desired angle between the determined location of the sprinkler 100 and the intersection of the water emitting from the aimable sprinkler 100 to a point on the border of the irrigation area 201. In an aspect, the point on the border is within the selected quadrant to be irrigated. At block 3408, the aimable sprinkler 100 adjusts the nozzle 106 and base 101 to emit water at the desired angle. In an aspect, the aimable sprinkler 100 adjusts the pitch actuator 110 and the yaw actuator 108 to adjust the pitch angle and yaw angle of the aimable sprinkler 100, respectively, to emit water at the desired angle.

At decision block 3410, the aimable sprinkler 100 determines whether it has traveled beyond the selected quadrant of the irrigation area 201. In an aspect, the aimable sprinkler 100 determines whether the traveling sprinkler system rotating about the center pivot tower 202 has rotated the aimable sprinkler 100 past the selected quadrant of the irrigation area 201. If not, then the process 3400 moves to block 3402 to receive the location/position/control information for its current location. If the aimable sprinkler 100 has moved past the selected quadrant, the process 3400 moves to block 3412 to change the specified quadrant to the next quadrant of the irrigation area 201 to be irrigated. From block 3412, the process 3400 moves to block 3402 to receive the location/position/control information for its current location.

Figure 35:
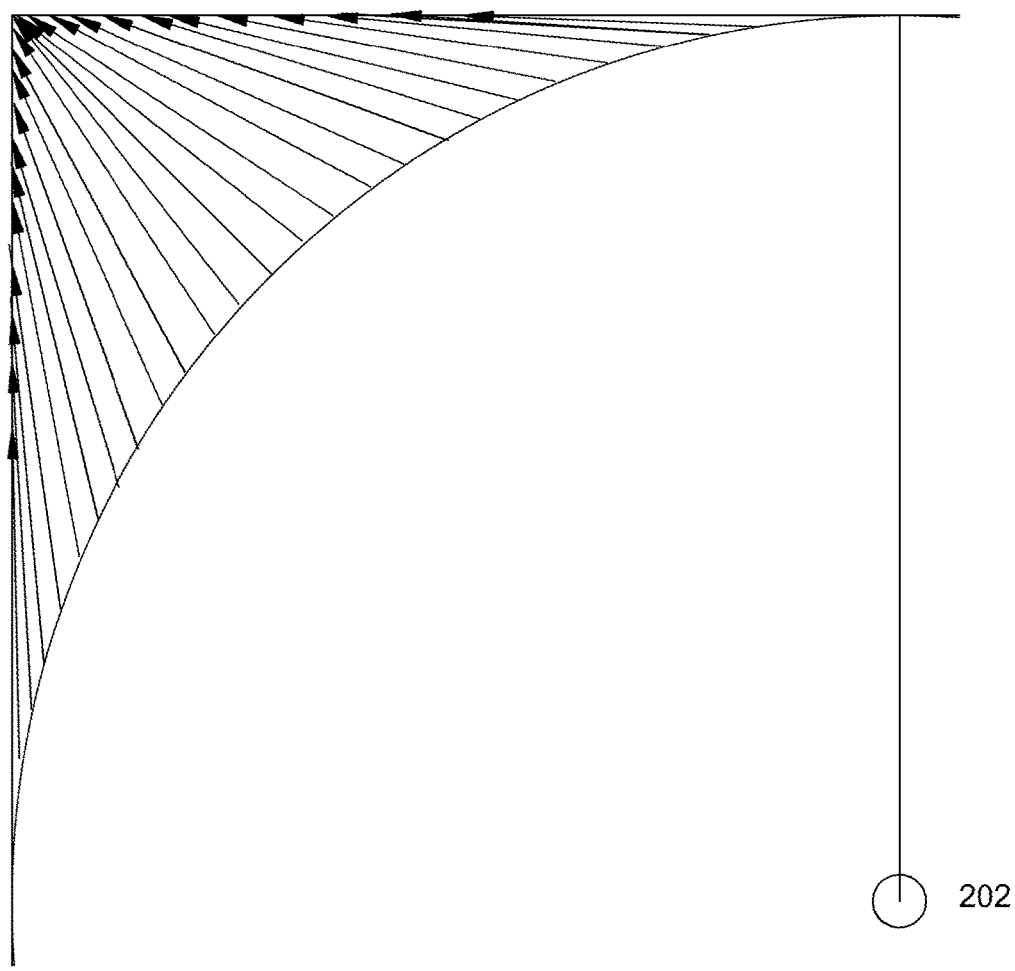
FIG. 35 is an illustration of an exemplary watering pattern obtained by the process of FIG. 33 or FIG. 34 when the water from the aimable sprinkler can reach to the corner.

FIG. 35 is an illustration of an exemplary watering pattern 3500 obtained by the process of FIG. 33 or FIG. 34 when the water from the aimable sprinkler 100 can reach to the corner.

As illustrated in FIG. 35, aiming to the intersection of the end of the spray of water to the border, when the water can reach to the corner, fills the corner of the quadrant.

Hybrid Aim to Border and Open Field Watering

In some cases, the amiable sprinkler 100 may not have enough throw to reach the far corner A1-1 of the irrigation area 201. In such cases, it may be desirable to irrigate the maximum amount of property as possible. In some cases the aimable sprinkler 100 may irrigate according to the aim to border principle until it reaches a certain position. At the certain position, the sprinkler may convert to an open field watering pattern where there is no border to reach and it irrigates the vegetation to a desired distance.

Figure 36A:
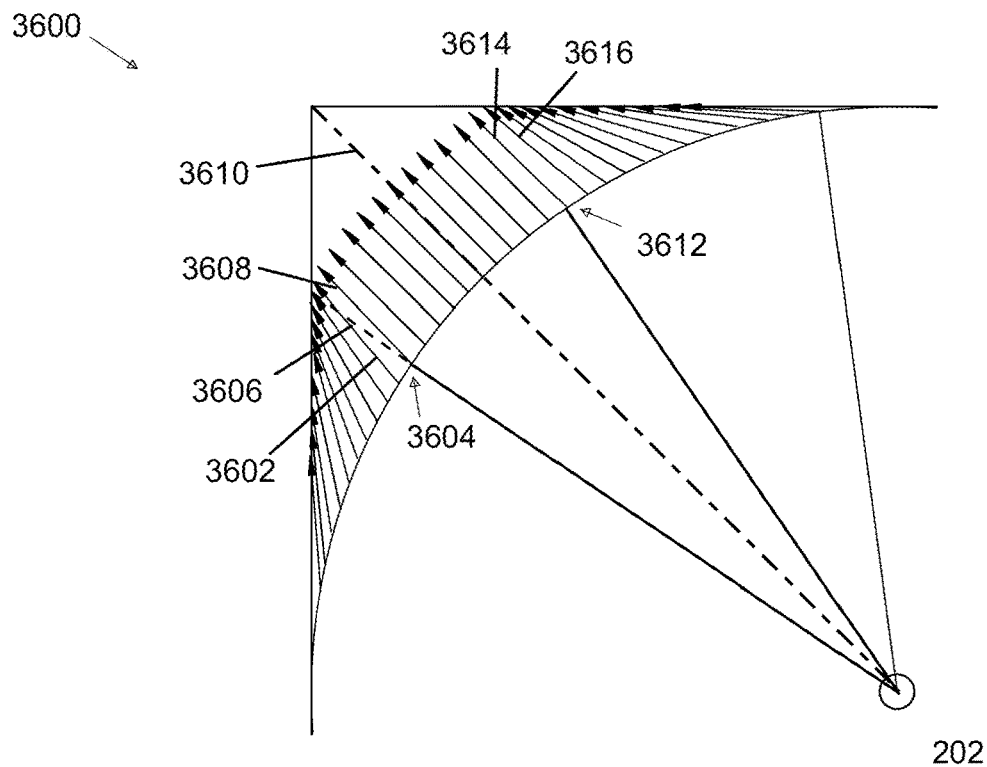
FIG. 36A is an illustration of an exemplary watering pattern obtained by using an aim to border approach for a portion of a corner and an open field watering approach for another portion of the corner when the water from the aimable sprinkler cannot reach to the corner.

FIG. 36A illustrates an irrigation pattern 3600 incorporating one possible hybrid scenario. In this illustration, the aimable sprinkler will irrigate according to the aim to border principle until it reaches position 3604. As shown by the dotted line 3606, if the sprinkler continues to irrigate to the border, the water will intersect the previous spray pattern 3602. Intersecting watering patterns can give less than satisfactory results. When the controller detects that a watering pattern will overlap another watering pattern, as shown in watering patterns 3602 and 3604, then it may change to an open field program. In this scenario, the controller can calculate an angle to set the yaw position to spray parallel with the theoretical straight line from the center of the pivot 202 to the corner of the irrigated area as illustrated by the dotted line 3610. As the traveling sprinkler system moves from position 3604 to 3612, the yaw is adjusted to spray the water parallel to the dotted line 3610. Position 3612 illustrates the last position where the spray 3614 is parallel to the dotted line 3610. When the traveling irrigation system reaches a position to spray according to the line 3616, it resumes irrigation according to the aim to border principle.

Figure 36B:
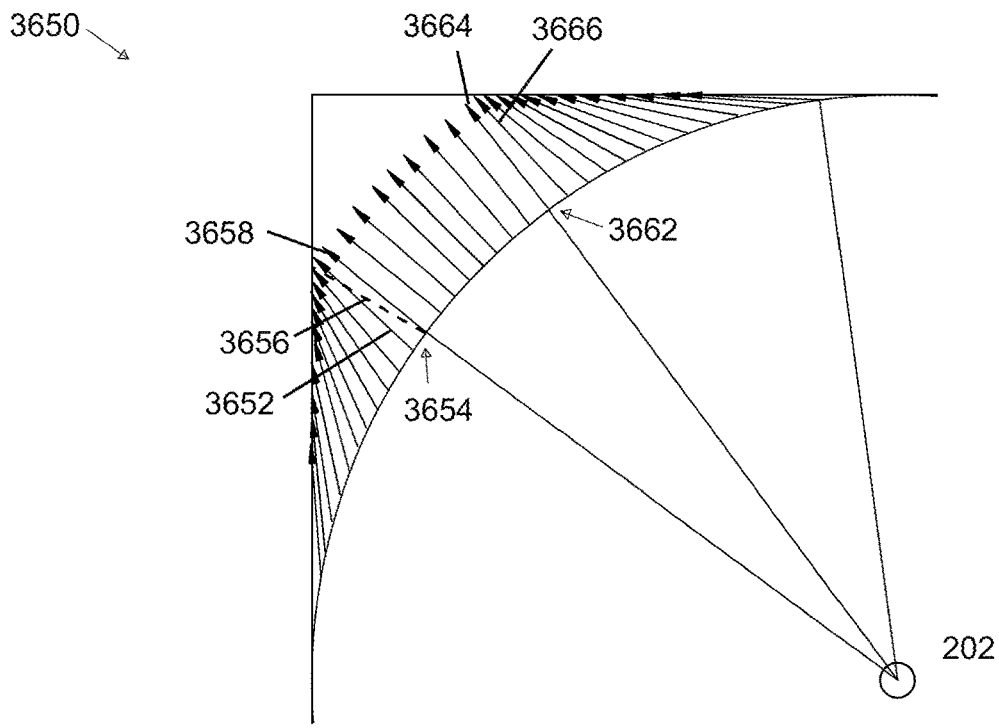
FIG. 36B is an illustration of another exemplary watering pattern obtained by using an aim to border approach for a portion of a corner and an open field watering approach for another portion of the corner when the water from the aimable sprinkler cannot reach to the corner.

FIG. 36B illustrates an irrigation pattern 3650 incorporating another possible hybrid scenario. In this illustration, the aimable sprinkler will irrigate according to the aim to border principle until it reaches position 3654. As shown by the dotted line 3656, if the sprinkler continues to irrigate to the border, the water will intersect the previous spray pattern 3652. Intersecting watering patterns can give less than satisfactory results. When the controller detects that a watering pattern will overlap another watering pattern, as shown in watering patterns 3652 and 3654, then it changes to an open field program. In this scenario, the controller can set the yaw position to spray approximately straight in line with the traveling irrigation system. As the traveling sprinkler system moves from position 3654 to 3662, the yaw is maintained in that position to produce a fan type pattern across the irrigated area. Position 3662 illustrates the last position where the spray 3664 in line with the centerline of the traveling irrigation system. When the traveling irrigation system reaches a position to spray according to the line 3666, it resumes irrigation according to the aim to border principle. This illustrates two of a number of different ways to effectively fill an open field area without aiming to the borders.

Hybrid Aim to Border and Linear Field Watering

Figure 37A:
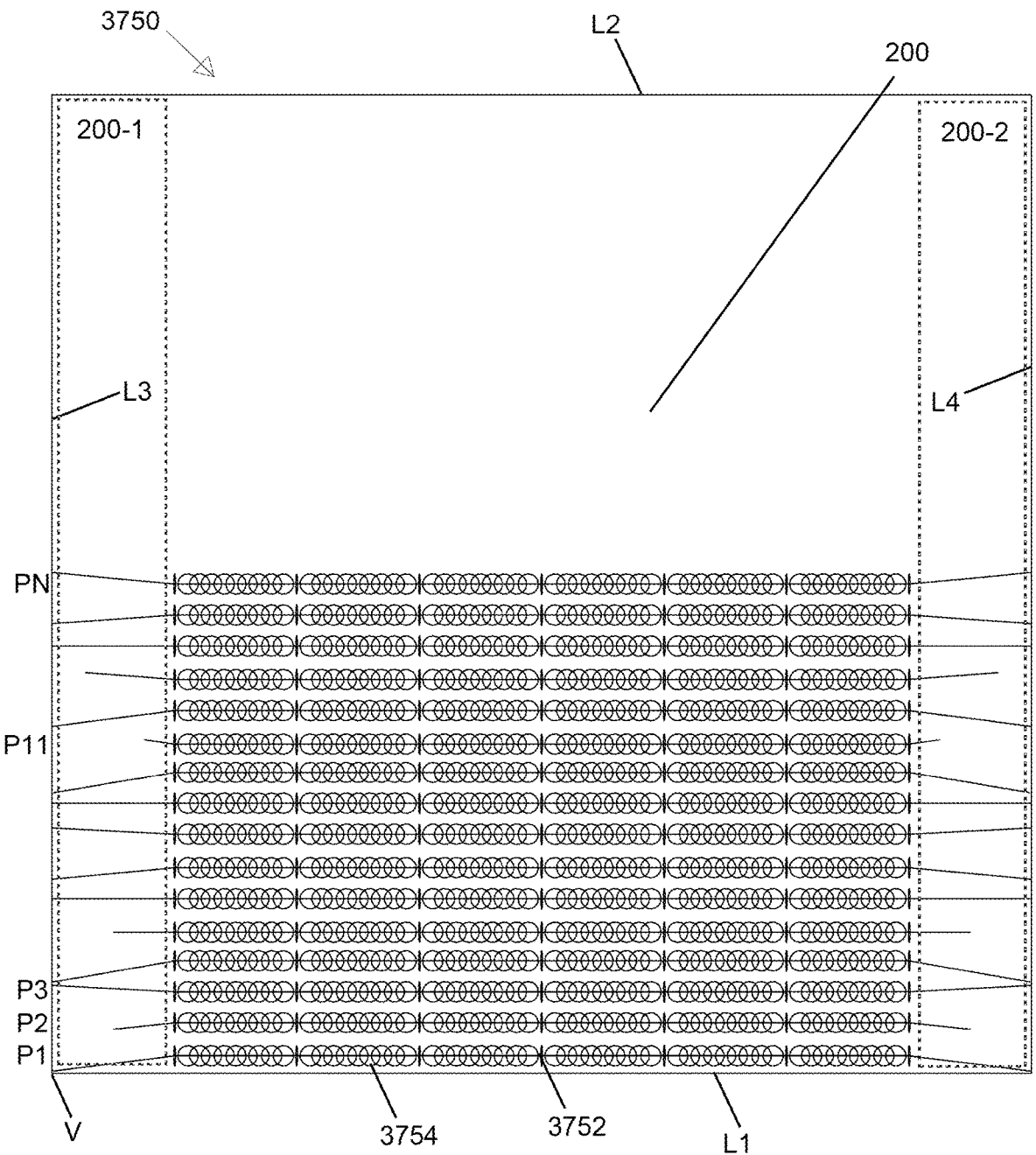
FIG. 37A is an illustration of another exemplary watering pattern for a linear irrigation system.
Figure 37B:
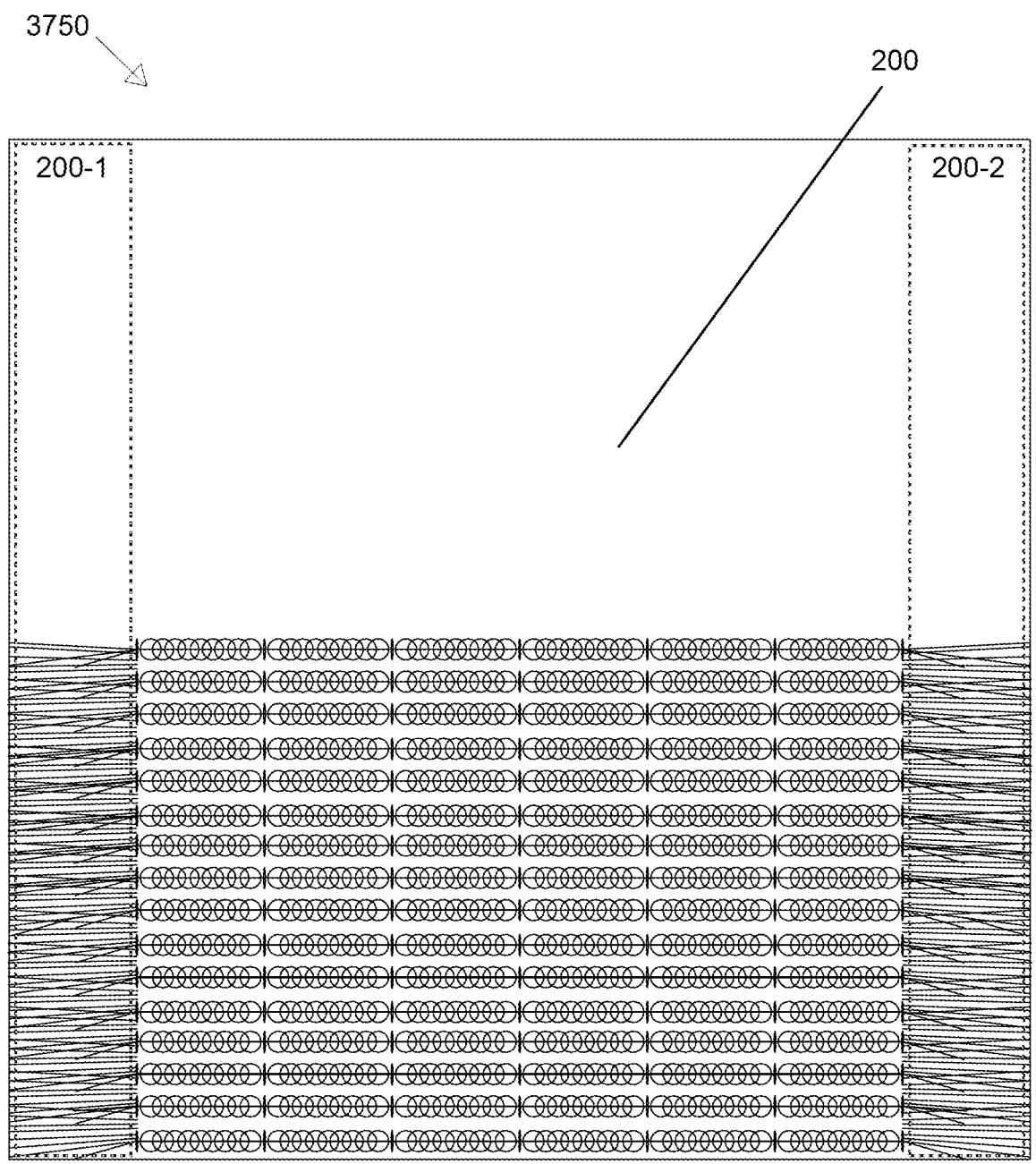
FIG. 37B is an illustration of another exemplary watering pattern for a linear irrigation system.

FIGS. 37A and 37B illustrate an irrigation pattern 3750 incorporating another possible scenario for a linear system of irrigation. In the linear system, the moving pipe 3752 may travel in a substantially straight path through the irrigation area 200. The moving pipe 3752 travels from a first border L1 to a second border L2. The moving pipe 3752 may move intermittently from row P1 to row PN and remain stationary for a period at each position until the entire irrigation area 200 has been watered.

FIG. 37A illustrates the linear system 100 at distinct times for each row, providing a "snapshot" of the moving pipe 3752 and aimable sprinkler. For example, rotary or nutating sprinklers 3754 along the length of the moving pipe 3752 may water the majority of the irrigation area 200 in rows at each row P1 to PN. However, side portions 200-1 and 200-2 of the irrigation area 200, lying between the ends of the moving pipe 3752 and slide borders L3 and L4 respectively may not be watered with the sprinklers 3754.

The aimable sprinkler 100 varies yaw angle 116 and pitch angle 118 to aim toward side borders L3 and L4 of the irrigation area 200 and to fill in the side portions 200-1 and 200-2. In this illustration, the aimable sprinkler 100 will irrigate according to the aim to border principle for a predetermined time while the moving pipe 3752 is stationary at position P1 or moving slowly between positions P1 to PN. For example, during the predetermined time, the aimable sprinkler 100 set the pitch angle to reach the side border L3 and continuously adjust the yaw angle 116 from the direction of the first border L2 to the direction of the second border L2 to evenly distribute water along the side border L3. The pitch angle 118 may also be continuously adjusted to reduce flow or pressure and thus reduce overspray beyond the side border L3. Once the area closes to the side border L3 has been watered, the aimable sprinkler will adjust the pitch angle 118 and repeat the pattern for another area closer to the end of the moving pipe 3752.

In FIG. 37A, row P1 illustrates a first position of the aimable sprinkler 100 in which the yaw angle 116 and pitch angle 118 are set to reach an area near vertex V of border L1 and side border L3. Row P2 illustrates a second position of the aimable sprinkler 100 in which the yaw angle 116 and pitch angle 118 are set to reach an area near the midline of area 200-1. Row P11 illustrates a third position of the aimable sprinkler 100 in which the yaw angle 116 and pitch angle 118 are set to reach an area nearest the end of the moving pipe 3752. As the traveling sprinkler system moves from position P1 to PN, both areas 200-1 and 200-2 are fully watered. FIG. 37B illustrates the resulting irrigation pattern 3750 after rows P1 to PN have been irrigated. Row PN+1 (not shown) may repeat the irrigation pattern of row P1 until the entire irrigation area 200 has been fully watered.

Examples of Devices and Circuits Usable to Adjust the Aimable Sprinkler

Various circuits and devices can be used to perform operations to cause the aimable sprinkler to adjust its aimable water spray. They are for example purposes and are not to be construed as limiting. Other circuits and devices can be used to implement the positioning, communication, locating, and power functionality of the aimable sprinkler.

Actuator Approaches

The function of an actuator/angular control system is to position an actuator at a known angular displacement from some reference point. In the context of this invention, angular control systems can be used in elevation and/or azimuth adjustment to aim the stream of water.

A stepper motor is a device that can be used to achieve a known amount of angular displacement. It is comprised of a permanent magnet(s) mounted to a rotating shaft, or "rotor" which is surrounded by a stator containing coils which can be electrically energized to form electromagnets. The rotor will typically have magnetic "teeth" which align with the coils during operation. These magnetic teeth alternate their magnetic pole N-S-N-S in a repeating pattern.

Typically, coils opposite each other are called "poles" so the stepper motor will have twice as many coils as poles. Depending on which coils are energized, the polarity of the current in the coil, and the position of the shaft, the attractive or repulsive magnetic force can cause the shaft to rotate. If the current in the coil is such that a north magnetic pole is created in the end of the coil facing the shaft, then the shaft will rotate until the nearest south pole tooth of the rotor's permanent magnet is aligned with the north pole created by the coil. At this point rotation will stop. It is therefore clear that to keep the rotor spinning, the coils must be energized in an orchestrated manor. It is also clear, that the number of poles and teeth in the motor, will determine the angular granularity with which the rotor can be controlled. Of course, the stepper motor can be connected to a gear box in order to increase torque and achieve finer granularity. An example of a commercially available stepper motor is PN PD57-2-1276-TMCL available from Trinamic Motion Control GmbH.

To achieve a known angular displacement, the stepper motor control must be capable of energizing, or driving the coils in an orchestrated manor, and also sensing the angular position of the rotor referenced to some know point. Regarding drive circuitry, there are typically two types of stepper motor coils—bipolar and unipolar.

A unipolar stepper motor has coils which are center tapped comprising a common wire. This significantly simplifies the drive circuitry since the common wire can be tied to one power supply rail, and the other rail can be connected to either of the two coil ends to energize the coil. Connecting it to one of the coil ends will result in an electromagnet with a north pole facing the rotor, while energizing the other coil end will result in a south pole. The reason this simplifies the drive circuitry is that it only needs to apply power to the coil using one polarity applied to either the first coil end or the second coil end.

A bipolar stepper motor has coils which are not center tapped. This complicates the drive circuitry since to create a north magnetic pole, the coil must be driven using one polarity, and to create a south pole, it must be driven with the opposite polarity. Therefore, the circuitry connected to the two coil ends, needs to be able to connect them either the first rail of the power supply, or the second rail.

As mentioned, bipolar stepper motor drive circuitry need only connect the coil ends to one side of the power supply rail. In practice this is typically the ground side rail. This is because semiconductor parts that sink current to ground, such as NPN transistors and N-channel MOSFETs, are less expensive, more robust, and easier to procure than those that source current. A bipolar stepper motor drive circuit may comprise N-channel MOSFETs. These devices could also have been bipolar junction transistors (BJTs), insulated-gate bipolar transistors (IGBTs) or various other semiconductor devices. Diodes and a transient voltage suppressor provide protection for the MOSFETs from high-voltage spikes typically encountered when disconnecting a power source from an inductor like the motor winding.

Unipolar Drive Circuitry

A suitable circuit known as an H-bridge allows either coil end (A+ or A−) of a unipolar stepper motor to be connected to either the positive voltage in signal or to ground. While this circuit may use four N-channel MOSFETs, other devices such as P-channel MOSFETs, BJTs or IGBT may be used. In practice only two of the four elements that make up the H-bridge are energized at any point in time.

Notes on Stepper Motor Drive Circuitry

It should be noted that the drive circuitry descriptions herein use discrete semiconductors. However, depending on the amount of power that needs to be supplied, many times these devices can be part of an integrated circuit (IC), which may save board space or be easier to interface with. It should also be noted that various current sensing approaches can be used to measure and limit the amount of current that is supplied to the coils. These include but are not limited to current sense resistors and hall effect sensors. Current sensing can provide many benefits. It can serve as a protection mechanism for the drive elements (MOSFETs, BJTs, etc.). If an overcurrent situation is detected, the circuit can be shut down before any damage occurs. Current sensing can also provide diagnostic benefits. For instance, if the coil is energized but no current flows, there is likely a broken wire and the user can be notified. It may also be possible to predict a coil failure prior to it happening by measuring the current draw over time and looking for changes. In short, the drawings herein are intended to show a few possible embodiments of the drive circuit, but many others are possible.

Motion/Position Sensing Circuitry

Stepper motors often have motion and/or position sensing circuitry either built into them or mounted external to the motor itself. Sensors mounted external to the motor can still be on the motor, or on a gearbox, or even on the final apparatus that the stepper motor is moving. Motion sensing is used for many purposes. For instance, a control circuit receiving motion sensing data can use the motion sensing data to determine the rotation of the rotor or final apparatus. While the control circuit normally controls the number of coil energization and can use this information as well, in some cases, not every energization results in the desired movement. Thus, a backup method is useful. Additionally, many stepper motor drive circuits are designed to use as little power as possible. To do this, they drive the coil with a marginally small current and verify movement via the sensor. If no movement is detected, they increase the current slightly. Aside from or in addition to motion sensing, position or homing sensing can be employed. The purpose of the position or homing sensor is to indicate the relative or absolute (homing) position of the rotor or apparatus that the rotor is moving. It is possible to combine motion and position sensing to determine absolute position based on a homing indication at some time in the past, and knowledge of how much movement, and in what direction has since occurred. One of the most common sensing methods is optical.

For example, a "slit" type sensor may be employed in which light from LEDs is allowed to pass through small slits cut into a disk that is mounted to the rotor or other apparatus. Photo transistors are mounted behind a mask with additional slits that detect the light, and the interruption thereof, as the disk spins. By using two such photo transistors, mounted in a particular position, two outputs are generated. Based on the phase of these two outputs relative to each other, the direction (CW or CCW) of rotation can be determined. If a single additional slit is cut at a different concentric radius (Phase Z slit in the figure), and an LED/Phototransistor pair is used to detect light passing through this slit, an absolute or homing signal can be generated since there is one such slit at that radius. It is common to use infrared light for this application to avoid contamination of visible light sources. A commercially available IR LED is PN HR5P-N1CB-00000 available from Broadcom Limited. A commercially available IR phototransistor is PN LTR-4206 available from Lite-On Inc.

While this example illustrates a slit type optical sensing approach, other optical sensing approaches can be used. For example, a reflective optical sensing approach may be employed in which the LED and phototransistor are mounted on the same side of the disk, and sometimes in the same electronic package. The disk is then painted with radial alternating reflective and non-reflective bands. When a reflective band is in front of the optical pair, the light from the LED is reflected back to the phototransistor. When the non-reflective band is in front of the optical pair, the light is not reflected back to the phototransistor.

The reflective approach can even be used on the "edge" of the disk, with the light source and phototransistor facing the center. A commercially available combined LED/Phototransistor is PN EE-SY310 available from Omron Electronics.

Other sensing approaches can be used. For instance, magnetic sensing can be used by employing a reed switch, or hall effect switch to detect the presence of a magnetic field—and thus detect the magnetic "teeth" of the rotor, or a magnet(s) mounted elsewhere on the apparatus. A simple mechanical limit switch may be employed to determine when a "home" position is reached. Still other sensing methods are possible.

Servo Motor

In some aspects, a servomotor may be employed. Operation of the servomotor is as follows: a desired setpoint (position) is achieved by comparing the present position, as sensed by the position sensor, to a desired position (setpoint) using a comparator and calculating an error signal. This signal can then be amplified and used to drive the motor in such a fashion that the error signal is minimized (actual position gets closer to the desired position).

The position sensor is typically a variable resistor configured as a potentiometer that is coupled to the apparatus at a point where the control is meant to be affected. This potentiometer will output a voltage, which is compared to a setpoint voltage using a difference amplifier which is constructed out of an operational amplifier such as an MCP6001 manufactured by Microchip Technology. The output of the operational amplifier can typically drive a few milliamperes and would need further amplification to actually drive the motor. This can come in the form of a discrete amplifier, constructed using MOSFET or BJT transistors. Or, it may come in the form of an integrated circuit such as the LM675 manufactured by Texas Instruments. Digital Servo Motor Control.

While the above description demonstrates an analog embodiment it should be noted that the same can be achieved digitally or in a hybrid analog/digital setting. For the digital solution, the comparator can be replaced by an analog to digital converter and a microcontroller. The error signal is then computed mathematically and an H-bridge drive circuit (like the one disclosed earlier) can be used to drive the motor. The motor itself can be AC, DC, or brushless DC. The position sensor can still be a potentiometer but could also be a digital magnetic sensor, such as a Hall Effect sensor, that can be used to sense the position of a magnet attached to the apparatus. The output of the Hall Effect sensor may be analog, just as the potentiometer, or it may have a digital interface such as a PWM, SPI, I2C, or other digital interface. These digital signals can interface directly to a microcontroller with no analog to digital converter. An example of a digital magnetic sensor with an SPI interface is the MLX90395KGO manufactured by Melexis Technologies.

While the embodiments disclosed are relatively simplistic in that they have a different amplifier (analog or computational), other approaches are possible to achieve faster control of the motor in a servo. For instance, PID or proportional, integral and differential control algorithms can be used. The embodiments disclosed show proportional control, but by adding integral and differential terms to the error signal, faster control loops can be created as well as those that employ critical dampening, a condition generally accepted as the best tradeoff between speed and overshoot of a control system.

Linear Control Approaches

Linear control offers an alternative to angular control when setting elevation or azimuth of the apparatus.

A motor-driven linear actuator translates the rotational motion of a motor to linear motion. In one embodiment, this is done by coupling a threaded shaft to a motor, then allowing a "nut" to move up and down the shaft as it spins. The actuator linkage is mechanically connected to this nut.

It should be noted that the same concept occurs if the nut were rotated by the motor resulting in linear movement of the shaft. The motor in FIG. 47 can be any motor including stepper, DC, brushless DC, or AC, for example. If exact linear positioning were needed, the same approach as the servomotor described above could be used. Specifically, the present position is sensed using a sensor, compared to a desired position and the motor is driven to minimize the error. The system may be analog or digital.

Another very similar embodiment is a linear gear actuator. For this approach a pinion gear coupled to a motor shaft acts on an actuator that has a linear gear or rack. Again, positioning can be achieved by sensing current position, comparing to a setpoint and driving the motor to minimize the error.

Many other types of linear actuators are possible. For instance hydraulic and pneumatic actuators use the pressure of oil or air to achieve linear motion.

Communication

Communication in the context of the aimable sprinkler may consist of several paths and methods. In this section each of these paths is discussed. This is followed by a technical disclosure on each of the communication techniques that might be employed.

Communication to Center Pivot Controller

Many center pivot systems have their own controller and software that may benefit from communication with an aimable sprinkler. For instance, the setup and provisioning of the aimable sprinkler might be via the center pivot control. Diagnostic and sensor data from the aimable sprinkler can be shared with the center pivot control system for a consolidated user interface. Methods that are suitable for communication between the aimable sprinkler and the center pivot are RS485/422, CAN Bus, and Powerline Carrier, for example. While these methods lend themselves well to this application, many other methods may obviously be used.

Communication to the Internet or Intranet

Providing a method to allow the aimable sprinkler to have internet access would allow communication with any device connected to the internet. Examples of Internet connected devices are tablets, smartphones, and PCs. This communication channel could be used for setup/provisioning, diagnostics, feedback, etc. Methods suitable for internet connection are WiFi, LAN, LTE/cellular and satellite. While these methods lend themselves well to this application, many other methods may be used.

Once an internet connection is established, several methods of control are possible. The aimable sprinkler could connect to a server that also serves up a webpage that allows control and diagnostics of the aimable sprinkler from any device with a web browser. Alternatively, the aimable sprinkler could use MQTT, a lightweight, efficient IoT control approach based on a publish/subscribe model. For this scenario the aimable sprinkler would contain an MQTT client which would communicate to an MQTT broker on the Internet. End user devices (smartphones, etc.) can also contain MQTT clients allowing them to communicate to the aimable sprinkler through the broker.

Other internet-based control approaches are possible. Furthermore, these would also apply to an intranet implementation where the devices communicate on a closed network, but not connected to the world-wide-web.

Communication to Handheld Devices

Direct communication can also be established to a handheld device. This may be a tablet, smartphone, PC, or proprietary device. In this situation the operator of the device would typically be in the immediate proximity of the aimable sprinkler, but this is not a requirement. Communication methods suitable for this type of communication include RS485/422, RS232, CAN Bus, Optical, BLE, LoRa or other ISM-band wireless communication. While these methods lend themselves well to this application, many other methods may be used.

Powerline Communication

Power line communications can take on many forms. This section is intended to give background information on this subject and describes an embodiment of power line communications.

Most power line communication systems superimpose a low level (compared to the power signal) high frequency carrier onto a standard utility power signal. This signal may have a frequency ranging from 20-30 KHZ to over 1 MHZ, significantly higher than the power line frequency of 50 or 60 HZ. Many of the devices to be powered are expecting a sinusoidal power signal of 120 or 230 VAC at 50-60 HZ (depending on the geographic area). By superimposing this high frequency signal the power signal is essentially left intact, and the devices operate normally. The way the communication signal is coupled onto the AC power line is typically by capacitively coupling the output of a high-frequency isolation transformer to the AC line. The nature of the network is bi-directional. That is, it can just as effectively be used to detect the communication signal on the AC line, and it can apply it. In addition to providing isolation, the high frequency transformer also provides some selectivity, accepting signals in the frequency range of the carrier while rejecting others, especially the 50 or 60 HZ power signal.

Various modulation techniques can be used on the high frequency carrier signal. Some of the modulation techniques include Amplitude Modulation (AM), Amplitude Shift Keying (ASK), Frequency Modulation (FM), Frequency Shift Keying (FSK), Spread Frequency Shift Keying (SFSK), Binary Phase Shift Keying (BPSK), Quadrature Amplitude Modulation (QAM), Phase Shift Keying (PSK) and Orthogonal Frequency Division Multiplexing (OFDM) to name a few. Exactly which carrier frequency and modulation technique should be used, depends on the type of communication needed. In general, higher frequency carriers will allow faster data rates at the expense of not traveling as far on a pair of conductors. While low carrier frequencies travel much further but support slower data rates. Similarly, simple modulation techniques such as ASK and FSK are easier to implement since they do not require much computational effort, but do not perform as well in the presence of interference. More complex modulation schemes such as OFDM require greater processing power, but perform admirably in the presence of interference.

In one embodiment, a coupling capacitor and inductor provide a first stage of low frequency rejection, while assuring that any imbalances (direct current signals) on either side of the circuit are blocked. Next the signal is coupled to a transformer which has a 1.5:1 turns ratio. As stated earlier the transformer provides additional selectivity (filtering) and also provides isolation from the line for safety reasons. An example device for this transformer is PN 70P7282 available from Vitec Inc. The signal then enters an analog front end device (AFE). An example device for the AFE is PN AFE031 available from Texas Instruments. Note that the signal enters this part on a few pins. The carrier signal coming from the power line enters the receive chain on at least one of the pins. Note that there may be an additional band pass filter between the transformer and input pin of the AFE. The signal out of the transformer is also coupled to pins on a transmit path and two pins are used due to high current leaving the AFE to drive the carrier signal onto the power line. The receive chain provides additional low pass filtering and amplification before outputting the signal. The transmit chain generates the transmit signal via an integrated digital to analog converter (DAC) and provides filtering and power amplification of the signal. The AFE is then coupled to a microcontroller, which is where modulation and demodulation occur.

In this scenario the microcontroller is a TMS320F28X available from Texas Instruments. In other implementations, portions of the AFE may be integrated into the same IC as the microcontroller. In yet other implementations, the AFE device may be replaced by discrete circuitry.

RS485/422 Communication

RS485 communications uses a single differential pair to communicate asynchronously between multiple devices. Because a single pair is used for both transmission and reception, communication is half duplex (transmission or reception can occur at any moment in time, but not both).

RS422 is a full duplex version of RS485 and has two differential pairs. One is used to transmit while the other is used to receive. In practice the cable is normally twisted but this is not required. Differential communication has the advantage of being very noise immune. This is because any noise is typically induced equally on the "A" and "B" lines. During reception, the potential on line A is subtracted from the potential on line B. Therefore, any common voltage existing on both lines (like noise) is cancelled out. Many manufacturers make transceiver devices suitable for allowing a microcontroller with a UART to communicate via RS485 or RS422 to other microcontrollers. One such device is the MAX22500E from Analog Devices Inc./Maxim Integrated, which is used for RS485.

Location Determining Methods

For efficient irrigation, the location of the aimable sprinkler with reference to the plot of land being irrigated, and in particular, the corners is determined.

GPS

The Global Positioning System is a U.S. owned satellite constellation that uses triangulation (often with many more than just three satellites) and precise timing signals to allow devices with GPS receivers to determine their location on earth. Other countries and agencies have similar systems. For instance, Russia uses GLONASS, Europe uses Galileo, and China uses Beidou. All systems work anywhere on earth, not just in the regions that manage them. This disclosure describes GPS, but clearly any of the systems mentioned about, or others could be substituted. In fact most receivers are configured to receive signals from multiple systems.

Most GPS receivers or receiving modules (a module is an integrated device that can contain the receiver itself, crystal, support circuitry, and in some cases antenna) are configurable via industry standard interfaces such as SPI, I2C and UART. Most also have a default configuration, which many times satisfies the location determining requirements of a host system and need not be changed. These receivers typically output a serial data stream via UART that conforms to NMEA (National Marine Electronics Association) standards. These output data streams are known as sentences. These sentences begin with an ASCII "$" and their content and frequency of transmission are some of the parameters that are configurable. One of the most common sentences is the GPGAA message.

Upon receiving this sentence, a host device can determine its latitude, longitude, altitude, the time of day (UTC) and various information about the satellite constellation being used to arrive at this data. There are other NMEA sentences which contain other information such as those shown in Table 1.

GPS Sentences or NMEA Sentences

TABLE 1

| NMEA Sentence | Meaning |
| --- | --- |
| GPGGA | Global positioning system fix data (time, position, fix type data) |
| GPGLL | Geographic position, latitude, longitude |
| GPVTG | Course and speed information relative to the ground |
| GPRMC | Time, date, position, course and speed data |
| GPGSA | GPC receiver operating mode, satellites used in the position solution and DOP values. |
| GPGSV | The number of GPS satellites in view satellite ID numbers, elevation, azimuth and SNR values. |
| GPMSS | Signal to noise ratio, signal strength, frequency, and a bit rate from a radio beacon receiver. |
| GPTRF | Transit fix data |
| GPGSTN | Multiple data ID |
| GPXTE | Cross track error, measured |
| GPZDA | Date and time (PPS timing message, synchronized to PPS) |
| 150 | OK to send message. |

A commercially available GPS receiver is the MAX2769 manufactured by Analog Devices Inc/Maxim Integrated. An example of a commercially available GPS Module is the EVA-7M-0 manufactured by U-Blox.

It should be noted that the GPS receiver/module need not be a standalone device. For instance, most LTE/Cellular modules contain a GPS receiver. Therefore, if the aimable sprinkler was using an LTE module to communicate, it could also get geolocation information from that module.

Transponder

A transponder approach to position determination involves installing an active or passive transponder device at a particular location(s). The aimable sprinkler would contain the companion device (sometimes call the "interrogator"). When the aimable sprinkler comes in proximity to the transponder, the transponder replies to the interrogate signal, at which point the aimable sprinkler would know it has reached a particular location. Different transponders can replay with different "signatures" thus several can be positioned at critical point when the aimable sprinkler needs to adjust its settings. Transponders can also be used in conjunction with inertial or speed sensors to determine position. One common type of transponder is an RFID tag. The description below describes this technology.

RFID is an acronym for Radio Frequency Identification. In general, an RFID system consists of at least two devices, an interrogator and a transponder. The interrogator is sometimes referred to as the reader, and the transponder is sometimes referred to as the tag. The simplest system operation is for the reader to send out a signal, and then detect a response from a tag in its proximity. In general, the nature of the response is a short digital message identifying the tag. In more complex scenarios, moderate amounts of data can be exchanged between the reader and the tag. In addition, this exchange of data can be bi-directional.

There are various frequencies that can be used by RFID systems. Some common frequencies are shown in Table 2.

TABLE 2

| Frequency | Operating Distance |
| --- | --- |
| 120-150 KHZ | 10 cm |
| 13.56 MHZ | 1 m |
| 433 MHZ | 1-100 m |
| 865-866 MHZ(Europe) 902-928 MHZ (US) | 1-12 m |
| 2.45 GHZ, 5.8 GHZ | 200 m |
| 120-150 KHZ | 10 cm |

The distances in the table are approximations based on the exact nature (active vs. passive) of the tags, their antenna sizes, and other factors. One observation is that range seems to generally increase with frequency. This is not typically the case for RF links. However, the nature RFID tags is that they are relatively small and inexpensive, and at lower frequencies, it is difficult to make an efficient, inexpensive antenna that is also small.

There are two general categories of RFID tags—active and passive. Passive RFID tags contain no power source. This means that they must derive power from the RF energy emitted by the reader. Because of this, readers that operate with passive tags typically generate strong RF signals to power the tags. Additionally, because the tags can only harvest limited amounts of energy from the reader's RF signal, the range of these systems is limited. Passive RFID tags can also only operate while in the presence of the reader.

Some passive RFID tags contain no electronics at all, but are merely patterns of some metallic material printed on a base material such as paper. The geometry of this pattern is such that it has certain resonance frequencies. When interrogating this type of tag, the reader will generate a signal rich in all the possible frequencies of resonance in the tag, such as a pulse or chirp signal. It will then listen for the minute response which will occur only at the resonance frequencies dictated by the tag's pattern. The encoding of the data in the tag, is determined by which set of frequencies are returned.

Another method used to communicate with tags that have no electronics is known as time domain reflectometry. The reader sends out a pulse of energy, and based on the pattern in the tag, a series of reflections are returned. The data is encoded by the timing of those reflections.

Active RFID tags are typically any tag that has a power source on the tag. These tags require very low power levels from the reader (since they do not need to harvest energy), and can operate over a further range than passive tags. Because active tags have a power source they can be tasked with some simple operations while not being interrogated. These may include logging sensor data, etc. Active tags also contain electronic circuits. These may consist of microcontrollers, memory, and RF circuits. They also have the ability to initiate communications if warranted. It is also possible to have the tag respond with a different frequency than the one used to interrogate the tag.

As mentioned above, active RFID tags can contain significant amounts of circuitry. In some cases this is memory which can be written to and read by the reader. In other cases the tag may contain a microcontroller allowing the tag to write to the memory, and even interface with other circuitry that can be connected to the tag.

There are numerous types of RFID systems in existence. Furthermore, it seems inevitable that newer, higher frequency systems will be developed as time goes on. The embodiment discussed here is one example of how an RFID system could be combined with an aimable sprinkler. The reader can be connected to the aimable sprinkler's controller's microcontroller via a Serial Peripheral Interface (or SPI) connection. In SPI communications one of the devices is a master, and the other a slave. The master supplies the clock signal for the connection, and therefore controls the timing. The SPI connections require a minimum of three discrete wires. The first is the aforementioned clock signal. The second is the serial data from the slave device to the master device (MISO or Master In Slave Out). The third is the serial data from the master device to the slave device (MOSI or Master Out Slave In). In this embodiment, the microcontroller communicates with the RFID reader to periodically search for an RFID tag within its range. Depending on the type of tag found, and the data returned, the location of the aimable sprinkler can be determined.

The processor can be a PIC18F86K90 available from Microchip Technology. The RFID reader can be a TRF7963A available from Texas Instruments. The RFID tag can be a RI-I16-114A-01 available from Texas Instruments. The TRF7963A RFID Reader can be powered by a 3.3V logic supply. The reader can use a 13.56 MHZ crystal as a time-base for the 13.56 MHZ RF signals used by this system. Decoupling and bypass capacitors assure the TRF7963A has a clean power supply. Matching components can match the 50 ohm antenna to the input and output of the reader IC. A parallel tuned circuit can add some selectivity. This can decrease spurious outputs in transmit mode, and can filter spurious inputs in receive mode. This is one embodiment but many others using different devices are possible.

Angular Sensor

In some cases, the center pivot control system knows the angular position of the pivot, and can use one of the previously mentioned communication techniques (for instance, RS485) to communicate this information to the aimable sprinkler. Using this information, the aimable sprinkler can determine when it is approaching a corner and adjust its settings according.

Power Supply

The aimable sprinkler will require power for the digital circuitry as well as any actuator power. Digital power is typically 3.3 VDC or 5 VDC, and common actuator power requirements are 12 and 24 VDC.

Mains Available Power

Most center pivot systems have 120 VAC and 480 VAC available at the aimable sprinkler. In this embodiment, a high voltage "mains" power source is connected to a switch mode power supply (SMPS) which converts it to 12 VDC. This output is used to power any actuators such as stepper motors, and also fed to a 3.3 VDC voltage regulator. The output of this regulator is used to power the logic circuitry. A suitable SMPS would be PN LD20-26B 12 available from Mornsun America, LLC. This power supply will accept anywhere from 90 VAC-528 VAC and output approximately 12 VDC at 1.66 Amps. A suitable 3.3V voltage regulator would be PN MIC29151-3.3WT available from Microchip Technology.

No Mains Available Power

In the event there is no power source at the end of the center pivot, the aimable sprinkler can derive power from either the sun, or the flow of water. For this embodiment, power generated by either a solar panel or a water turbine generator is used to charge a battery pack. The output of this battery pack is regulated/transformed to the appropriate power for the logic circuitry and actuators of the aimable sprinkler. Due to the large number of charge/discharge cycles (1 per day) associated with the device, Lithium Iron Phosphate would be an appropriate batter chemistry to use. One example of a commercially available Lithium Iron Phosphate battery is PN PCLFP30-12.8M6 available from Zeus Battery Products. This battery outputs 12.8 VDC and could be used to directly power a 12 VDC actuator, or stepped up or down if another actuator voltage is needed. In this example, the battery pack would be charged from solar panel or water turbine generator. Due to the nature of a lithium chemistry battery, specific and precise charging algorithms and voltages must be used in order to maintain the health and safety of the battery. This function is normally performed by a dedicated charging IC. An example of a commercially available charging IC suitable for Lithium Iron Phosphate chemistries is PN BQ24630 available from Texas Instruments.

Terminology

Although certain embodiments and examples are disclosed herein, inventive subject matter extends beyond the examples in the specifically disclosed embodiments to other alternative embodiments and/or uses, and to modifications and equivalents thereof. While we have described and illustrated in detail embodiments of a sprinkler with an aimable nozzle, it should be understood that our inventions can be modified in both arrangement and detail. Thus, the scope of the claims appended hereto is not limited by any of the particular embodiments described above. For example, the sprinkler 100 could be 102 fitted to a linear moving irrigation system. The ability to aim the sprinkler 100 can allow the user to increase the range of the irrigated area. The user can program the amiable nozzle to avoid buildings, ponds, or other areas of the landscape that require less or no water. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term "horizontal" as used herein is defined as a plane parallel to the plane or surface of the floor or ground of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Although the sprinkler has been disclosed in the context of certain embodiments and examples, it will be understood by those skilled in the art that the sprinkler and subassemblies extend beyond the specifically disclosed embodiments to other alternative embodiments and/or uses of the embodiments and certain modifications and equivalents thereof. Accordingly, it is intended that the scope of the sprinkler herein-disclosed should not be limited by the particular disclosed embodiments described above but should be determined only by a fair reading of the claims that follow.

What is claimed is:

1. An aimable sprinkler for mounting on an end of a traveling sprinkler system that rotates about a center pivot tower, the sprinkler comprising:
   a nozzle assembly comprising a ball joint;
   a pitch actuator configured to articulate the nozzle assembly in a pitch direction;
   a yaw actuator configured to move the nozzle assembly in a yaw direction; and
   a controller comprising a processor and memory storing instructions, that when executed by the processor, cause the processor to:
      receive GPS coordinates;
      determine, based at least in part on the GPS coordinates, a border of an irrigation area;
      determine, based at least in part on flow characteristics of the nozzle assembly, an intersection of an end of throw of water from the nozzle assembly to the border;
      determine, based at least in part on the GPS coordinates, a relative angle of the traveling sprinkler system relative to a first corner position of the irrigation area;
      determine, based at least in part on the relative angle and the intersection of the end of the throw of water to a point on the border, a desired angle; and
      control the yaw actuator and the pitch actuator to adjust the pitch direction and the yaw direction of the nozzle assembly to emit water at the desired angle.

2. The aimable sprinkler of claim 1 further comprising a valve including an orifice that is adjustable, wherein the pitch actuator is further configured to adjust the orifice when the pitch actuator articulates the nozzle assembly.

3. The aimable sprinkler of claim 1 wherein the instructions further cause the processor to constantly determine the desired angle of the aimable sprinkler relative to the traveling sprinkler system, as the traveling sprinkler system rotates around a center point to keep the aimable sprinkler pointed towards the first corner position.

4. The aimable sprinkler of claim 1 wherein the instructions further cause to processor to periodically determine the desired angle of the aimable sprinkler relative to the traveling sprinkler system, as the traveling sprinkler system rotates around a center point to keep the aimable sprinkler pointed towards the first corner position.

5. The aimable sprinkler of claim 1 further comprising a communication circuitry configured to transmit and receive messages via the Internet.

6. The aimable sprinkler of claim 5, wherein the controller is configured to receive user-generated control information from the communication circuitry.

7. The aimable sprinkler of claim 6, wherein the user-generated control information comprises commands to control one or more of timing, positioning, throw distance, ON/OFF, or water trajectory.

8. A method of aiming an aimable sprinkler comprising:
   receiving GPS coordinates;
   determining, based at least in part on the GPS coordinates, a border of an irrigation area;
   determining, based at least in part on flow characteristics of the aimable sprinkler, an intersection of an end of throw of water from a turret to the border;
   determining, based at least in part on the GPS coordinates, a relative angle of a traveling sprinkler system on which the aimable sprinkler is mounted relative to a first corner position of the irrigation area;
   determining, based at least in part on the relative angle and the intersection of the end of the throw of water to a point on the border, a desired angle; and
   controlling pitch and yaw of the turret to emit water at the desired angle,
   wherein the method is performed under control of a controller of the aimable sprinkler.

9. The method of claim 8, wherein the GPS coordinates identify corners of the irrigation area.

10. The method of claim 8 further comprising receiving user-generated control information.

11. The method of claim 10, wherein the user-generated control information includes commands to control one or more of timing, positioning, throw distance, ON/OFF, or water trajectory.

12. The method of claim 8 further comprising receiving, via the Internet, control information from a mobile device.

13. The method of claim 8 further comprising transmitting, via the Internet, diagnostic information.

14. The method of claim 8 further comprising determining that the traveling sprinkler system has rotated the aimable sprinkler past a quadrant of the irrigation area associated with the first corner position.

15. The method of claim 8 further comprising determining, based at least in part on the GPS coordinates, the relative angle of the traveling sprinkler system relative to a second corner position of the irrigation area when the traveling sprinkler system has rotated the aimable sprinkler past a quadrant of the irrigation area associated with the first corner position.

16. An aimable sprinkler for mounting on an end of a traveling sprinkler system that rotates about a center pivot tower, the aimable sprinkler comprising:
   a base configured to connect to the end of the traveling sprinkler system;
   a turret coupled to the base so as to move in both yaw and pitch directions relative to the base;
   a pitch actuator configured to drive the turret in the pitch direction relative to the base;
   a yaw actuator configured to drive the turret in the yaw direction relative to the base; and
   a controller comprising a processor and memory storing instructions, that when executed by the processor, cause the processor to control the pitch actuator and the yaw actuator by:
   receiving location information;
   determining, based at least in part on the location information, an angle of the traveling sprinkler system relative to a corner on a border of an irrigation area;
   determining, based at least in part on flow characteristics, an intersection of an end of throw of water from the turret to the border of the irrigation area;
   determining, based at least in part on the angle and the intersection of the end of the throw of water to a point on the border, a desired angle; and
   adjusting the pitch direction of the pitch actuator and the yaw direction of the yaw actuator to emit water from the turret at the desired angle.

17. The aimable sprinkler of claim 16, wherein the location information includes GPS coordinates associated with the irrigation area.

18. The aimable sprinkler of claim 16, wherein the location information includes data from a transponder located within the irrigation area.

19. The aimable sprinkler of claim 16 further comprising an RFID reader that is configured to receive the location information from an RFID tag located within the irrigation area.

20. The aimable sprinkler of claim 16, wherein the controller is further configured to receive user-generated control information via the Internet.

* * * * *